US011884550B2

(12) United States Patent
Humpal et al.

(10) Patent No.: US 11,884,550 B2
(45) Date of Patent: Jan. 30, 2024

(54) SHAPED GEL ARTICLES AND SINTERED ARTICLES PREPARED THEREFROM

(71) Applicant: 3M INNOVATIVE PROPERTIES COMPANY, St. Paul, MN (US)

(72) Inventors: Kathleen M. Humpal, Stillwater, MN (US); Melissa A. Lackey, Woodbury, MN (US); Brant U. Kolb, Afton, MN (US); Paul D. Pennington, Farmington, MN (US); Mark J. Hendrickson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1367 days.

(21) Appl. No.: 16/326,307

(22) PCT Filed: Aug. 16, 2017

(86) PCT No.: PCT/US2017/047064
§ 371 (c)(1),
(2) Date: Feb. 18, 2019

(87) PCT Pub. No.: WO2018/044565
PCT Pub. Date: Mar. 8, 2018

(65) Prior Publication Data
US 2019/0185328 A1 Jun. 20, 2019

Related U.S. Application Data

(60) Provisional application No. 62/382,944, filed on Sep. 2, 2016.

(51) Int. Cl.
| | |
|---|---|
| *C01B 33/158* | (2006.01) |
| *C08F 220/28* | (2006.01) |
| *C08K 3/36* | (2006.01) |
| *C08K 9/06* | (2006.01) |
| *B29C 39/00* | (2006.01) |
| *B29C 39/02* | (2006.01) |
| *C04B 35/626* | (2006.01) |
| *C04B 35/624* | (2006.01) |
| *C04B 35/14* | (2006.01) |
| *C04B 38/00* | (2006.01) |
| *C08J 9/28* | (2006.01) |
| *B29K 33/00* | (2006.01) |
| *B29K 105/00* | (2006.01) |
| *B29K 509/00* | (2006.01) |
| *B29L 28/00* | (2006.01) |

(52) U.S. Cl.
CPC ........ *C01B 33/1585* (2013.01); *B29C 39/006* (2013.01); *B29C 39/02* (2013.01); *C01B 33/158* (2013.01); *C04B 35/14* (2013.01); *C04B 35/624* (2013.01); *C04B 35/6265* (2013.01); *C04B 35/62655* (2013.01); *C04B 38/0045* (2013.01); *C08J 9/286* (2013.01); *C08K 3/36* (2013.01); *C08K 9/06* (2013.01); *B29K 2033/08* (2013.01); *B29K 2105/0061* (2013.01); *B29K 2509/00* (2013.01); *B29K 2995/0027* (2013.01); *B29L 2028/00* (2013.01); *C04B 2235/9653* (2013.01); *C08F 220/285* (2020.02); *C08F 2800/20* (2013.01); *C08J 2201/042* (2013.01); *C08J 2205/026* (2013.01); *C08J 2333/14* (2013.01); *C08K 2201/011* (2013.01)

(58) Field of Classification Search
CPC ....... C01B 33/158; C08F 220/28; C08K 3/36; C08K 9/06; B29C 39/00; B29C 39/02
USPC ........................................................ 523/203
See application file for complete search history.

(56) References Cited

U.S. PATENT DOCUMENTS

| | | | |
|---|---|---|---|
| 5,125,917 A | 6/1992 | Whealin |
| 5,240,488 A | 8/1993 | Chandross |
| 5,435,816 A | 7/1995 | Spurgeon |
| 5,672,097 A | 9/1997 | Hoopman |
| 5,912,433 A | 6/1999 | Pulido |
| 5,946,991 A | 9/1999 | Hoopman |
| 5,975,987 A | 11/1999 | Hoopman |
| 6,129,540 A | 10/2000 | Hoopman |
| 7,264,410 B1 | 9/2007 | Doss |

(Continued)

FOREIGN PATENT DOCUMENTS

| | | |
|---|---|---|
| WO | WO 2001-030307 | 5/2001 |
| WO | WO 2008-145182 | 12/2008 |

(Continued)

OTHER PUBLICATIONS

"Ceramic Injection Molding—Tight Tolerance Near Net Shape Production of Advanced Ceramics", Morgan Advanced Materials, [retrieved from the internet on Dec. 23, 2006], URL <http://www.azom.com/article.aspx?ArticleID=3618>, pp. 1-9.

(Continued)

*Primary Examiner* — Deve V Hall

(57) ABSTRACT

Shaped gel articles that are formed within a mold cavity and that retain the size and shape of the mold cavity upon removal from the mold cavity, sintered articles prepared from the shaped gel articles, and methods of making the sintered articles are provided. The shaped gel articles are formed from a casting sol that contains colloidal silica particles that are treated with a surface modification composition that includes a silane surface modification agent having a radically polymerizable group. The sintered article has a shape identical to the mold cavity (except in regions where the mold cavity was overfilled) and to the shaped gel article but reduced in size proportional to the amount of isotropic shrinkage.

15 Claims, 11 Drawing Sheets

(56) References Cited

U.S. PATENT DOCUMENTS

| | | | |
|---|---|---|---|
| 2002/0156152 A1* | 10/2002 | Zhang | A61K 6/30 524/492 |
| 2003/0091493 A1 | 5/2003 | Costa | |
| 2008/0223078 A1 | 9/2008 | Boara | |
| 2009/0297099 A1 | 12/2009 | Benjamin | |
| 2009/0303660 A1 | 12/2009 | Nair | |
| 2014/0170350 A1 | 6/2014 | Sakamoto | |

FOREIGN PATENT DOCUMENTS

| | | |
|---|---|---|
| WO | WO 2010-003455 | 1/2010 |
| WO | WO 2013-009984 | 1/2013 |
| WO | WO 2013-055432 A1 | 4/2013 |
| WO | WO 2013/176279 | 11/2013 |
| WO | WO 2014-151179 | 9/2014 |
| WO | WO 2016-140840 | 9/2016 |

OTHER PUBLICATIONS

Bommel, "Drying of Silica Gels With Supercritical Carbon Dioxide", Journal of Materials Science, 1994, vol. 29, pp. 943-948, XP000867159.

Francis, "Ternary Systems of Liquid Carbon Dioxide", Journal of Physical Chemistry, 1954, vol. 58, pp. 1099-1114.

Klein, "Sol-Gel Optical Materials", Annual Review of Materials Science, 1993, vol. 23, No. 01, pp. 437-452, XP055426388.

Kotz, "Liquid Glass: A Facile Soft Replication Method for Structuring Glass", Advanced Materials, 2016, vol. 28, pp. 4646-4650.

Poco, "A Rapid Supercritical Extraction Process for the Production of Silica Aerogels", Materials Research Society Proceedings, 1996, vol. 431, pp. 297-302, XP055426386.

International Search Report for PCT International Application No. PCT/US2017/047064, dated Nov. 27, 2017, 5 pages.

\* cited by examiner

SHAPED GEL ARTICLES AND SINTERED ARTICLES PREPARED THEREFROM

CROSS REFERENCE TO RELATED APPLICATIONS

This application is a national stage filing under 35 U.S.C. 371 of PCT/US2017/047064, filed Aug. 16, 2017, which claims the benefit of U.S. Provisional Application No. 62/382944, filed Sep. 2, 2016, the disclosure of which is incorporated by reference in its/their entirety herein.

TECHNICAL FIELD

Shaped gel articles, sintered articles formed from the shaped gel articles, and methods of making sintered articles are provided.

BACKGROUND

Net shaped processing of ceramic materials is advantageous because it can be difficult and/or expensive to machine ceramic materials into complex shapes. The term "net shaped process" refers to a process of producing an initial item that is very close to the desired final (net) shape. This reduces the need for traditional and costly finishing methods such as machining or grinding.

Various methods have been used to prepare net shaped ceramic materials. These include processes such as gel casting, slip casting, sol-gel casting, and injection molding. Each of these techniques has limitations. For example, gel casting involves casting a ceramic powder slurry into a mold. The ceramic powder often has a size in a range of about 0.5 to 5 microns. To prevent non-uniform shrinkage during processing, the slurry used for gel casting often contains about 50 volume percent solids. Because such slurries typically have a high viscosity, there are limitations on how well they can replicate small, complex features on a mold surface. Slip casting often results in green bodies with a non-uniform density resulting from powder packing during casting. Injection molding methods typically use large amounts of thermoplastic materials that can be difficult to remove from the green body without causing distortion due to slumping when the thermoplastic material softens during the organic burnout process.

SUMMARY

Shaped gel articles, aerogels and sintered articles prepared from the shaped gel articles, and methods of making the aerogels and sintered articles are provided. The shaped gel articles are formed within a mold cavity from a casting sol that contains colloidal silica particles that are treated with a surface modification composition that includes a silane surface modification agent having a radically polymerizable group. The shaped gel articles, which are a polymerized product of the casting sol, retain the size and shape of the mold cavity upon removal from the mold cavity. The aerogel and the sintered article have a shape identical to the mold cavity (except in regions where the mold cavity was overfilled) and to the shaped gel article but reduced in size proportional to the amount of isotropic shrinkage.

In a first aspect, a shaped gel article is provided that comprises a polymerized product of a casting sol, wherein the casting sol is positioned within a mold cavity during polymerization and wherein the shaped gel article retains both a size and a shape identical to the mold cavity (except in a region where the mold cavity was overfilled) when removed from the mold cavity. The casting sol contains (a) 2 to 65 weight percent surface modified silica particles, (b) 0 to 40 weight percent polymerizable material that does not contain a silyl group, (c) 0.01 to 5 weight percent radical initiator, and (d) 30 to 90 weight percent organic solvent medium, wherein each weight percent is based on the total weight of the casting sol. The surface modified silica particles include a reaction product of silica particles having an average particle size no greater than 100 nanometers and a surface modification composition comprising a silane surface modification agent having a radically polymerizable group, wherein the surface modified silica particles are 50 to 99 weight percent silica and wherein the casting sol contain no more than 50 weight percent silica. The polymerizable material, the radical initiator, and the surface modification composition are soluble in the organic solvent medium.

In a second aspect, an aerogel is provided that is a product resulting from the removal of the organic solvent medium from the shaped gel article by supercritical extraction.

In a third aspect, a method of making an aerogel is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) removing the organic solvent medium from the shaped gel article by supercritical extraction to form the aerogel, wherein the aerogel has a shape identical to the mold cavity (except in regions where the mold cavity was overfilled) and to the shaped gel article but reduced in size proportional to an amount of isotropic shrinkage, and (e) removing either the shaped gel article or the aerogel from the mold cavity.

In a fourth aspect, a method of making a sintered article is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) forming a dried shaped gel article by removing the organic solvent medium, (e) removing either the shaped gel article or the dried shaped gel article from the mold cavity, and (f) heating the dried shaped gel article to form a sintered article. The sintered article has a shape identical to the mold cavity (except in regions where the mold cavity was overfilled) and to the shaped gel article but reduced in size proportional to an amount of isotropic shrinkage.

In a fifth aspect, a sintered article is provided that is prepared using the method described above for making a sintered article.

DETAILED DESCRIPTION

Figure 1:
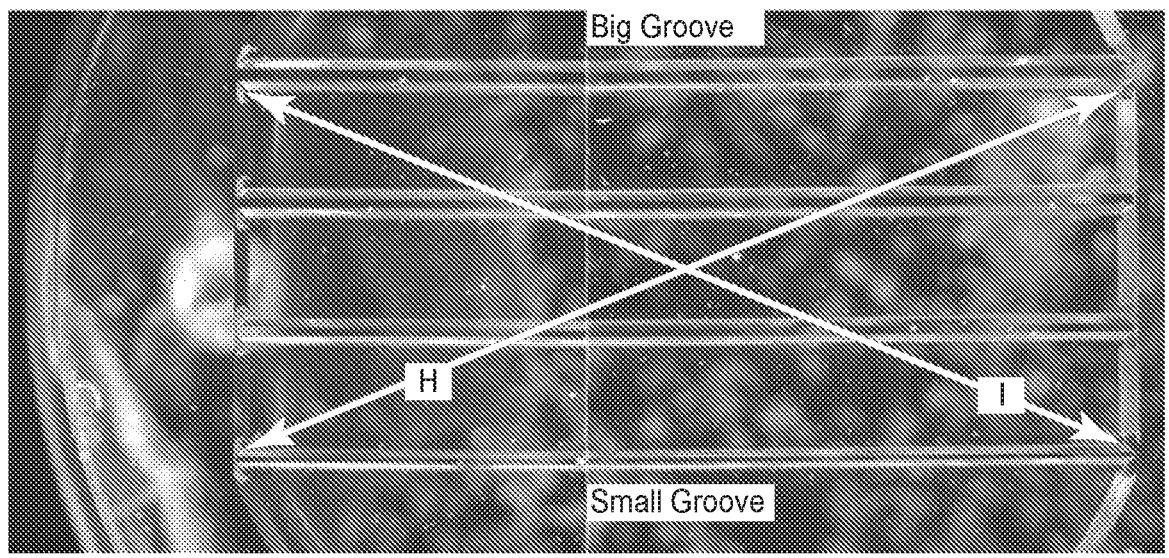
FIG. 1 shows the diagonal measurements (H and I) used for shrinkage determination in an example article (Example 1).

Shaped gel articles that are formed within a mold cavity and that retain the size and shape of the mold cavity upon removal from the mold cavity, sintered articles prepared from the shaped gel articles, and methods of making the sintered articles are provided. The shaped gel articles are formed from a casting sol that contains colloidal silica particles that are treated with a surface modification composition that includes a silane surface modification agent having a radically polymerizable group. The shaped gel article is dried to either an aerogel or xerogel. The sintered article is formed from the aerogel or xerogel. The sintered article has a shape identical to the mold cavity (except in regions where the mold cavity was overfilled) and to the shaped gel article but reduced in size proportional to the amount of isotropic shrinkage.

The shaped gel articles are formed within a mold cavity using a casting sol that includes (a) surface modified silica particles, the surface modified silica particles being a reaction product of silica particles having an average particle size no greater than 100 nanometers and a silane surface modification composition that includes a silane surface modification agent having a radically polymerizable group, (b) optional polymerizable material that does not include a silyl group, (c) a radical initiator for a radical polymerization reaction, and (d) an organic solvent medium that can solubilize the surface modification composition, the optional polymerizable material, and the radical initiator. The shaped gel article can be handled and processed to form a sintered article that can have a complex shape and/or features, that can be free of cracks, and that can have a uniform density throughout. Because the sintered articles typically are amorphous rather than crystalline silica, the sintered articles have a transmission comparable to fused quartz above 450 nanometers in the visible and near infrared regions of the electromagnetic spectrum. That is, the sintered articles can be translucent or transparent to the human eye.

As used herein, the term "a", "an", and "the" are used interchangeably with "at least one" to mean one or more of the components being described.

As used herein, the term "and/or" such as in A and/or B means A alone, B alone, or both A and B.

As used herein, the term "silica" refers to various stoichiometric formulas for silicon oxide. The most typical stoichiometric formula is $SiO_2$, which is generally referred to as either silicon oxide or silicon dioxide.

The term "silane surface modification agent" refers to a compound having a silyl group, which is a monovalent group of formula $—Si(R^a)_x(R^b)_{3-x}$ where $R^a$ is a non-hydrolyzable group, $R^b$ is hydroxyl or a hydrolyzable group, and the variable x is an integer equal to 0, 1, or 2.

As used herein, the term "hydrolyzable group" refers to a group that can react with water having a pH of 1 to 10 under ambient conditions. The hydrolyzable group is often converted to a hydroxyl group when it reacts. The hydroxyl group often undergoes further reactions. Typical hydrolyzable groups include, but are not limited to, alkoxy, alkoxyalkoxy, acyloxy, aryloxy, or halo. As used herein, the term is often used in reference to one or more groups bonded to a silicon atom in a silyl group.

The term "non-hydrolyzable group" refers to a group that cannot react with water having a pH of 1 to 10 under ambient conditions. Typical non-hydrolyzable groups include, but are not limited to alkyl, aryl, and aralkyl. As used herein, the term is often used in reference to one or more groups bonded to a silicon atom in a silyl group.

The term "radically polymerizable group" refers to a group that is capable of undergoing a radical polymerization reaction (e.g., free radical polymerization reaction). The radically polymerizable group is typically an ethylenically unsaturated group (for example, a vinyl group or a (meth)

acryloyl group) or a thiol group. In many embodiments herein, the radically polymerizable group is an ethylenically unsaturated group.

The term "(meth)acryloyl" refers to an acryloyl and/or methacryloyl group of formula $CH_2=CR^c-(CO)-$ where $R^c$ is hydrogen or methyl. When W is hydrogen, the group is an acryloyl group. When $R^c$ is methyl, the group is a methacryloyl group. The term "(meth)acryloyl" is sometime referred to as a "(meth)acryl" group. Similarly, the term "(meth)acrylate" refers to acrylate and/or methacrylate, the term "(meth)acrylic" refers to acrylic and/or methacrylic, and the term "(meth)acrylamide" refers to acrylamide and/or methacrylamide.

The term "alkyl" refers to a monovalent group that is a radical of an alkane and includes groups that are linear, branched, cyclic, bicyclic, or a combination thereof The alkyl group typically has 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms.

The term "alkylene" refers to a divalent group that is a radical of an alkane and includes groups that are linear, branched, cyclic, bicyclic, or a combination thereof The alkyl group typically has 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms.

The term "alkoxy" refers to a monovalent group of formula $-OR^d$ where $R^d$ isd alkyl.

The term "alkoxyalkoxy" refers to a monovalent group of formula $-OR^e-OR^f$ where $R^e$ is an alkylene and $R^f$ is an alkyl. The alkoxyalkoxy can be considered to be an alkoxy substituted alkoxy group.

The term "acyloxy" refers to a monovalent group of formula $-O(CO)R^d$ where $R^d$ is alkyl. Suitable alkyl groups often have 1 to 10 carbon atoms, 1 to 6 carbon atoms, 1 to 4 carbon atoms, or 1 to 2 carbon atoms. Acetoxy is an example acyloxy group.

The term "halo" refers to a halogen atom such as fluoro, bromo, iodo, or chloro. When part of a reactive silyl group, the halo group is often chloro.

The term "aryl" refers to a monovalent group that is aromatic and carbocyclic. The aryl has at least one aromatic ring and can have one or more additional carbocyclic rings that are fused to the aromatic ring. Any additional rings can be unsaturated, partially saturated, or saturated. Aryl groups often have 6 to 20 carbon atoms, 6 to 18 carbon atoms, 6 to 16 carbon atoms, 6 to 12 carbon atoms, or 6 to 10 carbon atoms. Phenyl is an example aryl group.

The term "aryloxy" refers to a monovalent group that is of formula —OAr where Ar is an aryl group. Phenoxy is an example aryloxy group.

The term "aralkyl" refers to a monovalent group that is an alkyl group substituted with an aryl group. Aralkyl groups often have an alkyl portion with 1 to 10 carbon atoms, 1 to 6 carbon atoms, or 1 to 4 carbon atoms and an aryl portion with 6 to 20 carbon atoms, 6 to 18 carbon atoms, 6 to 16 carbon atoms, 6 to 12 carbon atoms, or 6 to 10 carbon atoms. The aryl is often phenyl.

The term "in the range" includes the endpoints of the range and all numbers between the endpoints. For example, in the range of 1 to 10 includes the numbers 1, 10, and all numbers between 1 and 10.

The term "associated" refers to a grouping of two or more primary particles that are aggregated and/or agglomerated. Similarly, the term "non-associated" refers to two or more primary particles that are free or substantially free from aggregation and/or agglomeration.

The term "aggregation" refers to a strong association of two or more primary particles. For example, the primary particles may be chemically bound to one another. The breakdown of aggregates into smaller particles (e.g., primary particles) is generally difficult to achieve.

The term "agglomeration" refers to a weak association of two or more primary particles. For example, particles may be held together by charge or polarity. The breakdown of agglomerates into smaller particles (e.g., primary particles) is less difficult than the breakdown of aggregates into smaller particles.

The term "primary particle size" refers to the size of a non-associated single silica particle, which is considered to be a primary particle. Transmission electron microscopy (TEM) is typically used to measure the primary particle size.

The term "colloidal" refers to particles having an average diameter that is up to 100 nanometers. The particles can be either primary particles or associated primary particles but are preferably primary particles. The silica particles used herein are typically colloidal silica particles.

The term "sol" refers to a colloidal suspension of discrete particles in a liquid. The discrete particles often have an average size in a range of 1 to 100 nanometers.

The term "gel" or "gel composition" refers to a polymerized product of a casting sol. The term "casting sol" refers to a sol containing surface modified silica particles that have radically polymerizable groups, an organic solvent medium, optional polymerizable material dissolved in the organic solvent medium, and a radical initiator dissolved in the organic solvent medium.

The term "shaped gel" refers to a gel composition that has been formed within a mold cavity from a polymerizable casting sol. The shaped gel (i.e., shaped gel article) has a shape and size determined by the mold cavity. In particular, the polymerizable casting sol is polymerized to a gel composition within a mold cavity, wherein the gel composition (shaped gel article) retains the size and shape of the mold cavity when removed from the mold cavity. The gel articles are free standing and do not need auxiliary support after being removed from the mold cavity.

The term "molding" refers to forming a shaped gel article from a casting sol by a surface replication method.

The term "aerogel" refers to a three-dimensional porous solid that is derived from a gel composition, in which the liquid component of the gel has been replaced with a gas. The solvent removal is often done under supercritical conditions. During this process the network does not substantially shrink and a highly porous, low-density material can be obtained.

The term "xerogel" refers to a three-dimensional porous solid that is derived from a gel composition that has been further processed to remove the organic solvent medium by evaporation under ambient conditions or at an elevated temperature.

The term "isotropic shrinkage" refers to shrinkage that is essentially to the same extent in the x-direction, the y-direction, and the z-direction. It is calculated as a change in length divided by the original length and reported as a percentage. The extent of shrinkage in one direction is within 5 percent, within 2 percent, within 1 percent, within 0.5 percent, within 0.25 percent, within 0.1 percent, or within 0.05 percent or even lower of the shrinkage in the other two directions. For example, if the x-direction shrinkage is 55.0 percent and the y-direction shrinkage is 56.0 percent, then the shrinkage in these two directions is within 1 percent of each other.

The term "x-y shrinkage" refers to shrinkage in the x-direction and the y-direction. In some embodiments, the extent of shrinkage in the x-direction is within 2 percent, within 1 percent, within 0.5 percent, within 0.25 percent, within 0.1 percent, or within 0.05 or even lower of the extent of shrinkage in the y-direction. For example, if the x-direction shrinkage is 55.0 percent and the y-direction shrinkage is 56.0 percent, then the shrinkage in these two directions is within 1 percent of each other.

The term "crack" refers to a material segregation or partitioning (i.e., defect) that is a ratio equal to at least 5:1, at least 6:1, at least 7:1, at least 8:1, at least 10:1, at least 12:1, or at least 15:1 in any two dimensions.

The term "surface modified silica particles" refers to silica particles that have been surface treated with a surface modifying agent. The surface modified silica particles used herein are a reaction product of colloidal silica particles with one or more surface modifying agents. At least one of the surface modifying agents is a silane surface modifying agent having a radically polymerizable group.

The term "stable dispersion" refers to a dispersion in which the colloidal silica particles do not agglomerate after standing for a period of time, such as about 24 hours, under ambient conditions such as room temperature (in a range of 20 to 25° C. or in a range of 20 to 22° C). , atmospheric pressure, and normal electromagnetic forces).

The term "sintered article" refers to a shaped gel article that has been dried, heated to remove the organic matrix, and then further heated to reduce porosity and to densify. The density after sintering is at least 40 percent of the theoretical density, at least 50 percent of the theoretical density, at least 60 percent of the theoretical density, at least 70 percent of the theoretical density, at least 80 percent of the theoretical density, at least 90 percent of the theoretical density, at least 95 percent of the theoretical density, at least 98 percent of the theoretical density, at least 99 percent of the theoretical density, at least 99.5 percent of the theoretical density, at least 99.8 percent of the theoretical density, or at least 99.9 percent of the theoretical density. Articles having a density in a range of 40 to 93 percent of the theoretical density typically have open porosity (pores open to surface). Above 93 percent or 95 percent of the theoretical density, there are typically closed pores (no pores open to the surface).

The term "theoretical density" refers to the maximum possible density that would be obtained in a sintered article if all pores were removed. The percent of the theoretical density for a sintered article can be determined, for example, from electron micrographs of a cross-section of the sintered article. The percent of the area of the sintered article in the electron micrograph that is attributable to pores can be calculated. Stated differently, the percent of the theoretical density can be calculated by subtracting the percent voids from 100 percent. That is, if 1 percent of the area of the electron micrograph of the sintered article is attributable to pores, the sintered article is considered to have a density equal to 99 percent of the theoretical density. The density can also be determined by the Archimedes method.

The term "transparent" means that an object can be viewed with human eyes through the article or composition without distortion. It is typically clear but can be colored.

The term "translucent" means that an object can be viewed with human eyes through the article or composition and the appearance is cloudy or slightly cloudy and may be at least somewhat distorted.

A shaped gel article is provided that contains a polymerized product of a casting sol, wherein the casting sol is positioned within a mold cavity during polymerization and wherein the shaped gel article retains both a size and a shape identical to the mold cavity (except in a region where the mold cavity was overfilled) when removed from the mold cavity. The casting sol comprises (a) 2 to 65 weight percent surface modified silica particles, (b) 0 to 40 weight percent polymerizable material that does not contain a silyl group, (c) 0.01 to 5 weight percent radical initiator, and (d) 30 to 90 weight percent organic solvent medium, wherein each weight percent is based on the total weight of the casting sol.

The surface modified silica particles in the casting sol are typically a reaction product of silica particles and a surface modification composition containing a silane surface modification agent having a radically polymerizable group. The silica particles have an average particle size that is up to 100 nanometers. That is, the silica particles can be referred to as being "colloidal particles" and/or "nanoparticles" and/or "colloidal nanoparticles". The average particle size is often up to 90 nanometers, up to 80 nanometers, up to 70 nanometers, up to 60 nanometers, up to 50 nanometers, up to 40 nanometers, up to 30 nanometers, up to 20 nanometers, up to 10 nanometers, or up to 7 nanometers. The average size is typically at least 1 nanometer, at least 2 nanometers, at least 3 nanometers, at least 5 nanometers, or at least 10 nanometers. In some embodiments, the silica particles are in a range of 1 to 100 nanometers, 1 to 80 nanometers, 1 to 60 nanometers, 1 to 40 nanometers, 1 to 20 nanometers, 1 to 10 nanometers, 4 to 100 nanometers, 4 to 80 nanometers, 4 to 60 nanometers, 4 to 40 nanometers, 4 to 20 nanometers, 10 to 100 nanometers, 10 to 80 nanometers, 10 to 60 nanometers, or 10 to 40 nanometers. The average particle size can be determined using transmission electron microscopy (TEM). Typically, the size (e.g., longest dimension) of at least 300 particles in the transmission electron micrograph are measured and averaged.

The silica particles are amorphous. That is, an x-ray diffraction scan of the silica particles does not contain any of the characteristic peaks for crystalline silica. The amorphous character of the silica particles is preferably retained in the casting sol, in the gel composition, in the dried gel composition (e.g., xerogel or aerogel), and in the sintered article. The amorphous character of the silica contributes to the transparency or translucency of the final sintered articles.

In many embodiments, the silica particles are commercially available in the form of a colloidal dispersion in water. The colloidal dispersion can be referred to as a silica sol. Silica particles in a silica sol are advantageously used to prepare the surface modified silica particles rather than powdered silica particles or dispersions formed from powdered silica particles. Silica particles in silica sols tend to be less agglomerated and/or aggregated compared to dispersions prepared from powdered silica particles. Silica sols, which contain colloidal silica particles, are usually stable dispersions. Dispersions formed from powdered silica particles, on the other hand, often are not colloidal particles and/or are not stable dispersions.

The silica sol often has a basic pH (for example, 8 to 10) or an acidic pH (for example, 3 to 5). The silica particles in the silica sol are usually non-associated. That is, at least 70 percent, at least 80 percent, at least 90 percent, at least 95 percent, at least 98 percent, at least 99 percent, at least 99.5 percent, or at least 99.9 percent of the silica particles are primary particles that are not agglomerated and/or not aggregated. For example, the silica particles are not fumed silica.

The silica sol is typically clear or slightly cloudy. In contrast, dispersions that contain agglomerated or aggregated particles usually tend to have a milky or cloudy appearance except when index matched. The non-associated silica particles are well suited for formation of high density, sintered articles. Non-associated particles tend to result in the formation of casting sols that have low viscosity and high light transmission (e.g., high transmission in the visible and ultraviolet regions of the electromagnetic spectrum). Additionally, non-associated particles tend to result in the formation of gel compositions, aerogels, or xerogels with uniform pore structures and in the formation of homogeneous sintered articles.

The extent of association between the primary particles can be determined from the volume-average particle size. The volume-average particle size can be measured using Photon Correlation Spectroscopy. Briefly, the volume distribution (percentage of the total volume corresponding to a given size range) of the particles is measured. The volume of a particle is proportional to the third power of the diameter. The volume-average size is the size of a particle that corresponds to the mean of the volume distribution. If the silica particles are associated, the volume-average particle size provides a measure of the size of the aggregate and/or agglomerate of primary particles. If the silica particles are non-associated, the volume-average particle size provides a measure of the size of the primary particles. The silica particles typically have a volume-average size up to 100 nanometers. For example, the volume-average size can be up to 90 nanometers, up to 80 nanometers, up to 75 nanometers, up to 70 nanometers, up to 60 nanometers, up to 50 nanometers, up to 40 nanometers, up to 30 nanometers, up to 25 nanometers, up to 20 nanometers, up to 15 nanometers, or even up to 10 nanometers.

A quantitative measure of the degree of association between the primary particles in the sol is the dispersion index. As used herein, the "dispersion index" is defined as the volume-average particle size divided by the primary particle size. The primary particle size (e.g., the weighted average primary particle size) is determined using TEM techniques and the volume-average particle size is determined using Photon Correlation Spectroscopy. As the association between primary particles decreases, the dispersion index approaches a value of 1 but can be somewhat higher or lower. The silica particles typically have a dispersion index in a range of from 1 to 7. For example, the dispersion index is often in a range 1 to 5, 1 to 4, 1 to 3, 1 to 2.5, or even 1 to 2.

Photon Correlation Spectroscopy also can be used to calculate the Z-average primary particle size. The Z-average size is calculated from the fluctuations in the intensity of scattered light using a cumulative analysis and is proportional to the sixth power of the particle diameter. The volume-average size will typically be a smaller value than the Z-average size. The silica particles tend to have a Z-average size that is up to 100 nanometers. For example, the Z-average size can be up to 90 nanometers, up to 80 nanometers, up to 70 nanometers, up to 60 nanometers, up to 50 nanometers, up to 40 nanometers, up to 35 nanometers, up to 30 nanometers, up to 20 nanometers, or even up to 15 nanometers.

Various colloidal silica sols (dispersions of silica particles in water) are commercially available. The colloidal silica sols are often either base stabilized (for example, at a pH near 9) or acid stabilized (for example, at a pH near 4). Example colloidal silica sols include those commercially available from Nalco Chemical Company (Naperville, Ill.) under the trade designation NALCO (for example, NALCO 2326, NALCO 2327, NALCO 2329, NALCO 2329K, and NALCO 2329 PLUS) and from Nissan Chemical American Corporation (Houston, Tex.) under the trade designations SNOWTEX (for example, SNOWTEX ST-20L, SNOWTEX ST-O, SNOWTEX ST-OL, SNOWTEX ST-40, SNOWTEX ST-50, and SNOWTEX ST-ZL) and NISSAN (for example, NISSAN MP-1040).

The silica particles are surface modified. The surface modified silica particles are a reaction product of a surface of the silica particles with a surface modification composition. The surface modification composition contains one or more surface modifying agents that each have a silyl group. The silyl group of the surface modification agent can react with a silanol group on the surface of the silica particles. The surface modification composition contains at least one silane surface modifying agent having a radically polymerizable group. In some embodiments, the surface modification composition contains additional surface modification agents in addition to the silane surface modifying agent having a radically polymerizable group.

The silane surface modifying agent having a radically polymerizable group has two reactive groups: (1) a silyl group and (2) a radically polymerizable group. The silyl group can undergo a condensation reaction with a silanol on the surface of the silica particles resulting in the covalent attachment of the remaining portion of the silane surface modification agent that includes the radically polymerizable group. The silane surface modifying composition tends to improve compatibility of the silica particles with the other components of the casting sol and provides a radically polymerizable group that can participate in the curing reaction used to form the gel composition (e.g., the shaped gel article). The silane surface modifying composition additionally can reduce the viscosity of the casting sol and increase the transmission of the casting sol.

Some suitable silane surface modifying agents having a radically polymerizable group are (meth)acryloyl-containing compounds of Formula (I).

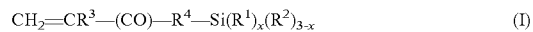

$$CH_2=CR^3-(CO)-R^4-Si(R^1)_x(R^2)_{3-x} \quad (I)$$

In Formula (I), $R^1$ is a non-hydrolyzable group, $R^2$ is hydroxyl or a hydrolyzable group, and the variable x is an integer equal to 0, 1, or 2. Group $R^3$ is hydrogen or methyl and group $R^4$ is an alkylene. In many embodiments, each $R^1$ is alkyl, aryl, or aralkyl and each $R^2$ is alkoxy, alkoxyalkoxy, acyloxy, aryloxy, or halo. In some more specific embodiments, each $R^1$ is alkyl and each $R^2$ is alkoxy.

Example compounds of Formula (I) include, but are not limited to, (meth)acryloxyalkyltrialkoxysilanes (for example, 3-(meth)acryloyloxypropyltrimethoxysilane, 3-(meth)acryloyloxypropyltriethoxysilane, and 3-(meth)acryloyloxypropyltriisopropoxysilane), (meth)acryloxyalkylalkyldialkoxysilanes (for example, 3-(meth)acryloyloxypropylmethyldimethoxysilane and 3-(meth)acryloyloxypropylmethyldiethoxysilane), (meth)acryloxyalkyldialkylalkoxysilanes (for example, 3-(meth)acryloyloxypropyldimethylmethoxysilane and 3-(meth)acryloyloxypropyldimethylethoxysilane), and 3-(meth)acryloylyamidoalkyltrialkoxysilanes (for example, 3-(meth)acryloyllamidopropyltrimethoxysilane).

Other suitable silane surface modifying agents having a radically polymerizable group are vinyl-containing compounds of Formula (II).

$$CH_2=CH-R^7-Si(R^5)_x(R^6)_{3-x} \quad (II)$$

In Formula (II), $R^7$ is single bond, alkylene, arylene, or combination thereof The combination group is usually an alkylene attached to an arylene. $R^5$ is a non-hydrolyzable group, $R^6$ is hydroxyl or a hydrolyzable group, and the variable x is an integer equal to 0, 1, or 2. In many embodiments, each $R^5$ is alkyl, aryl, or aralkyl and each $R^6$ is alkoxy, alkoxyalkoxy, acyloxy, aryloxy, or halo. In specific embodiments, $R^5$ is alkyl and $R^6$ is alkoxy, acyloxy, aryloxy, or alkoxyalkoxy.

Example compounds of Formula (II) include, but are not limited to, styrylalkyltrialkoxysilanes (for example, styrylethyltrimethoxysilane), vinyl trialkoxysilanes (for example, vinyltrimethoxysilane, vinyltriethoxysilane, and vinyltriisopropoxysilane), vinylalkyldialkoxysilanes (for example, vinylmethyldiethoxysilane), vinyldialkylalkoxysilanes (for example, vinyldimethylethoxysilane), vinyltriacyloxysilanes (for example, vinyltriacetoxysilane), vinylalkyldiacetoxysilanes (for example, vinylmethyldiacetoxysilane), and vinyltris(alkoxyalkoxy)silanes (for example, vinyltris(2-methoxyethoxy)silane).

Still other suitable silane surface modifying agents having a radically polymerizable group are thiol-containing compounds of Formula (III).

(III)

In Formula (III), $R^{10}$ is an alkylene. $R^9$ is a non-hydrolyzable group, $R^8$ is hydroxyl or a hydrolyzable group, and the variable x is an integer equal to 0, 1, or 2. In many embodiments, each $R^9$ is alkyl, aryl, or aralkyl and each $R^8$ is alkoxy, alkoxyalkoxy, acyloxy, aryloxy, or halo. In specific embodiments, $R^9$ is alkyl and $R^8$ is alkoxy, acyloxy, aryloxy, or alkoxyalkoxy.

Example compounds of Formula (III) include, but are not limited to, (3-mercaptopropyl) trimethoxysilane, (3-mercaptopropyl) triethoxysilane, (3-mercaptopropyOmethyldimethoxysilane, and (3 -mercaptopropyl)methyldiethoxysilane.

Some other suitable silane surface modifying agents having a radically polymerizable group are commercially available, for example, from Gelest (Morrisville, Pa., USA) and Shin-Etsu Silicones (Akron, Ohio, USA).

In addition to the silane surface modifying agent having the radically polymerizable group, the silica particles can be treated with other optional surface modifying agents. These optional surface modifying agents are often silane compounds that have a silyl group but not a radically polymerizable group. The silane compound can have another type of functional group (for example, an epoxy group, a cyano group, an amino group, or a carbamate group) or no other functional group. Another type of functional group can be used, for example, to react with another group of the polymeric material resulting in the formation of crosslinks. Example silane compounds that do not have a radically polymerizable group include, but are not limited to, propyltrimethoxysilane, propyltriethoxysilane, hexyltrimethoxysilane, hexyltriethoxysilane, isooctyltrimethoxysilane, n-octyltriethoxysilane, n-octyltrimethoxysilane, octadecyltrimethoxysilane, decyltrimethoxysilane, decyltriethoxysilane, dodecyltrimethoxysilane, phenyltrimethoxysilane, phenyltriethoxysilane, 3-glycidoxypropyltrimethoxysilane, cyanopropyltriethoxysilane, N-(3-triethoxysilylpropyl) methoxyethoxyethyl carbamate, and N-(3-triethoxysilylpropyl) methoxyethoxyethyl carbamate. Another example silane compound is available from Momentive Performance Materials, Wilton, Conn., under the trade designation SILQUEST A1230. Still other suitable silane compounds are commercially available, for example, from Gelest (Morrisville, Pa., USA) and Shin-Etsu Silicones (Akron, Ohio, USA).

The selection of the surface modification agent(s) can influence the shaped gel article that is formed from the casting sol. That is, the surface modification composition can influence the homogeneity of the shaped gel article. The surface modifier composition can be selected, for example, to adjust the compatibility of the silica particles with the polymerizable material and the organic solvent medium within the casting sol. This has been observed to affect, for example, the clarity and the viscosity of the casting sol. In addition, the selection of the surface modification composition can impact the strength of the gel composition (shaped gel article) that is formed.

In some embodiments, a combination of surface modifying agents can be useful. That is, the surface modification composition includes a plurality of surface modification agents. Any combination includes at least one silane surface modification agent having a radically polymerizable group. Some combinations can further include at least one optional surface modification agent such as those described above. In some embodiments, 100 weight percent of the surface modification agents added to the silica particles are silane surface modification agents having a radically polymerizable group. In other embodiments, up to 90 weight percent, up to 80 weight percent, up to 70 weight percent, up to 60 weight percent, or up to 50 weight percent and at least 2 weight percent, at least 5 weight percent, at least 10 weight percent, at least 20 weight percent, at least 30 weight percent, at least 40 weight percent, or at least 50 weight percent of the surface modification agents in the surface modification composition are silane surface modification agents having a radically polymerizable group. For example, the surface modification composition contains 2 to 100 weight percent, 5 to 100 weight percent, 10 to 100 weight percent, 20 to 100 weight percent, 30 to 100 weight percent, 40 to 100 weight percent, 50 to 100 weight percent, 5 to 90 weight percent, 10 to 90 weight percent, 20 to 90 weight percent, 40 to 90 weight percent, 50 to 90 weight percent, 10 to 80 weight percent, 20 to 80 weight percent, 40 to 80 weight percent, or 50 to 80 weight percent silane surface modification agents having a radically polymerizable group.

Although surface modification of the silica particles can be performed before or after mixing with the other components of the casting sol used to form the gel composition, the silica particles are usually treated with the surface modification composition prior to mixing with the other components of the casting sol. In many embodiments, the amount of the surface modification composition is in a range of 1 to 100 weight percent based on the weight of the silica particles. For example, the amount of surface modification composition can be at least 2 weight percent, at least 5 weight percent, or at least 10 weight percent, or at least 20 weight percent and can be up to 100 weight percent, up to 80 weight percent, up to 60 weight percent, up to 40 weight percent, up to 35 weight percent, up to 30 weight percent, up to 25 weight percent, or up to 20 weight percent. The percent amounts are based on the weight of the silica particles.

The silica content of the surface modified silica particles depends on the size of the silica particles and the molecular weight of the surface modification agent(s). In general, the amount of silica can range from 50 to 99 weight percent based on the total weight of the surface modified silica particles. That is, the surface modified silica particles can contain at least 50 weight percent, at least 55 weight percent, at least 60 weight percent, at least 65 weight percent, at least 70 weight percent, at least 75 weight percent, at least 80 weight percent, at least 85 weight percent, at least 90 weight percent, or at least 95 weight percent silica. The surface modified silica particles can contain up to 99 weight percent, up to 98 weight percent, up to 97 weight percent, up to 96 weight percent, up to 95 weight percent, up to 94 weight percent, up to 92 weight percent, up to 90 weight percent, up to 85 weight percent silica, or up to 80 weight percent. In some embodiments, the amount of silica in the surface modified silica particles is in a range of 60 to 99 weight percent, 70 to 99 weight percent, 80 to 99 weight percent, 90 to 99 weight percent, 50 to 98 weight percent, 60 to 98 weight percent, 70 to 98 weight percent, 80 to 98 weight percent, 90 to 98 weight percent, 50 to 95 weight percent, 60 to 95 weight percent, 70 to 95 weight percent, 80 to 95 weight percent, 90 to 95 weight percent, or 80 to 90 weight percent. The weight percent silica in the surface modified silica particles can be determined by heating the surface modified silica particles in air using thermal gravimetric analysis. The percent silica is equal to the (final weight at 900° C. divided by the weight at 200° C.) multiplied by 100 percent.

Because the specific surface area increases as the silica particle size decreases, smaller surface modified silica particles typically have a lower silica content compared to larger surface modified silica particles. For a given silica particle size, the silica content decreases as the molecular weight of the surface modification agent increases. It is surprising that the surface modified composition can be burned out without cracking the article, especially when small silica particles are used that have a high amount of surface modification.

Some example surface modified silica particles are prepared using silica particles having an average particle size close to 5 nanometers and the silica content of the surface modified silica particles is often in a range of 50 to 98 weight percent, 60 to 98 weight percent, 70 to 98 weight percent, 50 to 95 weight percent, 60 to 95 weight percent, 65 to 95 weight percent, 70 to 95 weight percent, 75 to 95 weight percent, 60 to 90 weight percent, 65 to 90 weight percent, 70 to 90 weight percent, or 75 to 90 weight percent. The weight percent values are based on the total weight of the surface modified silica particles.

Other example surface modified silica particles are prepared using silica particles having an average particle size close to 20 nanometers and the silica content of the surface modified silica particles is often in a range of 70 to 99 weight percent, 75 to 99 weight percent, 80 to 99 weight percent, 85 to 99 weight percent, 70 to 97 weight percent, 75 to 97 weight percent, 80 to 97 weight percent, 85 to 97 weight percent, 70 to 96 weight percent, 75 to 96 weight percent, 80 to 96 weight percent, 85 to 96 weight percent, 70 to 95 weight percent, 75 to 95 weight percent, 80 to 95 weight percent, or 85 to 95 weight percent. The weight percent values are based on the total weight of the surface modified silica particles.

Still other example surface modified silica particles are prepared using silica particles having an average particle size close to 75 nanometers and the silica content of the surface modified silica particles is often in a range of 90 to 99 weight percent, 92 to 99 weight percent, 94 to 99 weight percent, 95 to 99 weight percent, 90 to 98 weight percent, 92 to 98 weight percent, 94 to 98 weight percent, or 95 to 98 weight percent. The weight percent values are based on the total weight of the surface modified silica particles.

Any suitable attachment procedure or reaction conditions can be used to provide the attachment of surface modification agent(s) to the surface of the silica particles. In many embodiments, the silica particles are in the form of a silica sol. To surface modify the silica particles within the silica sol, an optional first organic solvent can be added. Suitable optional first organic solvents include, but are not limited to, 1-methoxy-2-propanol (i.e., methoxy propanol), ethanol, isopropanol, ethylene glycol, N,N-dimethylacetamide, and 1-methyl-2-pyrrolidinone. The optional first organic solvent is often added to enhance the solubility of the surface modifying agents as well as to enhance the dispersion of the surface modified silica particles. The first organic solvent is usually selected to be miscible with water and to have a boiling point that is close to that of water (e.g., within 20 degrees C.). This allows removal of the first organic solvent, if desired, with the water prior to formation of the casting sol and/or the gel composition.

The resulting mixture of the silica sol, optional first organic solvent, and the surface modification composition is reacted at room temperature or at an elevated temperature. In many embodiments, the mixture is heated at elevated temperatures (for example, above room temperature or at least 30° C., at least 40° C., or at least 50° C. and up to 120° C. or even higher, up to 100° C., up to 90° C., up to 80° C., up to 60° C., or up to 50° C.) for a period of at least 1 hour, at least 2 hours, at least 4 hours and up to 24 hours, up to 20 hours, up to 16 hours, up to 12 hours, or up to 8 hours.

The resulting dispersion of the surface modified silica particles can form stable and compatible casting sol compositions. That is, the surface modified silica particles are well dispersed resulting in a uniform and homogenous composition. The surface modified silica particles in the dispersion have a covalently attached surface modifying group that includes a radically polymerizable group. The radically polymerizable group can polymerize with another radically polymerizable group on another silica particle or with other optional polymerizable material added to the casting sol.

The casting sol is usually formed from the dispersion of surface modified silica particles. In many embodiments, a solvent exchange procedure is utilized to replace the water and any other optional first organic solvents with a second organic solvent having a boiling point equal to at least 150° C. In this procedure, the second organic solvent (along with any optional additional polymerizable material) can be added to the dispersion of surface modified silica particles. Water and any optional first organic solvent can be removed by evaporation resulting in the formation of the casting sol. The evaporation step can be accomplished, for example, by distillation, rotary evaporation, or oven drying. The evaporation step typically does not remove the second organic solvent.

In a less preferred alternative, the casting sol can be prepared by extracting the surface modified silica particles from the dispersion of surface modified silica particles into a water immiscible solvent. This can be followed by solvent exchange, if desired, as described above if the water immiscible solvent has a lower boiling point than that of the second organic solvent (discussed below) with a boiling point equal to at least 150° C. Any optional polymerizable material can be added after the extraction step or after the solvent exchange step.

In another less preferred alternative, the dispersion of surface modified silica particles can be dried. The second organic solvent and any optional polymerizable material can then be combined with the dried surface modified silica particles. The drying step can be accomplished by any conventional process such as, for example, oven drying, rotary evaporation, or spray drying. The dried surface modified silica particles can be combined with the other components of the casting sol (for example, the second organic solvent (discussed below) having a boiling point equal to at least 150° C. and any optional polymerizable material) using any suitable procedure such as, for example, mixing, sonication, milling, or micro fluidization.

The amount of surface modified silica particles in the casting sol is in a range of 2 to 65 weight percent based on a total weight of the casting sol. For example, the casting sol contains at least 2 weight percent, at least 3 weight percent, at least 4 weight percent, at least 5 weight percent, at least 6 weight percent, at least 8 weight percent, at least 10 weight percent, at least 12 weight percent, at least 14 weight percent, at least 16 weight percent, at least 18 weight percent, or at least 20 weight percent surface modified silica particles. The amount can be up to 65 weight percent, up to 60 weight percent, up to 55 weight percent, up to 50 weight percent, up to 45 weight percent, up to 40 weight percent, up to 36 weight percent, up to 35 weight percent, up to 32 weight percent, or up to 30 weight percent. In some embodiments, the amount of surface modified silica particles can be in the range of 2 to 60 weight percent, 2 to 55 weight percent, 2 to 50 weight percent, 2 to 45 weight percent, 2 to 40 weight percent, 2 to 35 weight percent, 4 to 65 weight percent, 4 to 60 weight percent, 4 to 55 weight percent, 4 to 50 weight percent, 4 to 45 weight percent, 4 to 40 weight percent, 4 to 35 weight percent, 10 to 65 weight percent, 10 to 60 weight percent, 10 to 55 weight percent, 10 to 50 weight percent, 10 to 45 weight percent, 10 to 40 weight percent, or 10 to 35 weight percent.

The amount of silica particles (which is part of the surface modified silica particles) included in the casting sol does not exceed 50 weight percent based on a total weight of the casting sol. If the amount is greater than 50 weight percent, the casting sol tends to be too viscous to completely fill the intricate features that may be present in a mold cavity. Organic material removal from parts having a high silica content can result in cracking during drying and burnout (the organic material can get trapped without a path for removal). The amount of silica is often in a range of 2 to 50 weight percent based on the weight of the casting sol. In some examples, the amount of silica is at least 2 weight percent, at least 4 weight percent, at least 6 weight percent, at least 8 weight percent, at least 10 weight percent, at least 12 weight percent, at least 14 weight percent, at least 16 weight percent, at least 18 weight percent, or at least 20 weight percent. The amount can be up to 45 weight percent, up to 40 weight percent, up to 36 weight percent, up to 35 weight percent, up to 32 weight percent, up to 30 weight percent, up to 28 weight percent, or up to 25 weight percent. In some embodiments, the amount of silica in the casting sol is in a range of 2 to 45 weight percent, 2 to 40 weight percent, 2 to 35 weight percent, 2 to 30 weight percent, 4 to 50 weight percent, 4 to 40 weight percent, 4 to 30 weight percent, 6 to 50 weight percent, 6 to 40 weight percent, 6 to 30 weight percent, 10 to 50 weight percent, 10 to 40 weight percent, or 10 to 30 weight percent.

Stated differently, the amount of silica particles (which is part of the surface modified silica particles) included in the casting sol does not exceed 30 volume percent based on a total volume of the casting sol. The amount of silica is often in a range of 1 to 30 volume percent based on the volume of the casting sol. In some examples, the volume of silica is at least 2 volume percent, at least 3 volume percent, at least 4 volume percent, or at least 5 volume percent. The amount can be up to 25 volume percent, up to 20 volume percent, up to 15 volume percent, or up to 10 volume percent. In some embodiments, the amount of silica in the casting sol is in a range of 1 to 30 volume percent, 1 to 25 volume percent, 1 to 20 volume percent, 1 to 15 volume percent, 2 to 30 volume percent, 2 to 25 volume percent, 2 to 20 volume percent, 2 to 15 volume percent, 5 to 30 volume percent, 5 to 25 volume percent, 5 to 20 volume percent, or 5 to 15 volume percent.

In addition to the surface modified silica particles, the casting sol includes an organic solvent medium. The organic solvent medium can include any organic solvent that is miscible with the surface modification composition, any optional polymerizable materials included in the casting sol, and the radical initiator. The organic solvent medium is selected to provide a casting sol that is a stable dispersion. The organic solvent medium typically contains less than 15 weight percent water, less than 10 percent water, less than 5 percent water, less than 3 percent water, less than 2 percent water, less than 1 weight percent, or even less than 0.5 weight percent water after the solvent exchange (e.g., distillation) process.

The casting sol often includes at least 30 to 90 weight percent organic solvent medium. In some embodiments, the casting sol contains at least 35 weight percent, at least 40 weight percent, at least 45 weight percent, or at least 50 weight percent organic solvent medium. The casting sol can contain up to 85 weight percent, up to 80 weight percent, up to 75 weight percent, up to 70 weight percent, up to 65 weight percent, up to 60 weight percent, up to 55 weight percent, up to 50 weight percent, or up to 45 weight percent organic solvent medium. For example, the casting sol can contain 30 to 80 weight percent, 30 to 75 weight percent, 30 to 70 weight percent, 30 to 60 weight percent, 30 to 50 weight percent, 30 to 45 weight percent, 40 to 90 weight percent, 40 to 80 weight percent, 40 to 70 weight percent, 40 to 60 weight percent, 50 to 90 weight percent, 50 to 80 weight percent, 50 to 70 weight percent, 60 to 90 weight percent, or 60 to 80 weight percent organic solvent medium. The weight percent values are based on the total weight of the casting sol.

The organic solvent medium often contains at least 30 weight percent of an organic solvent (a second organic solvent) having a boiling point equal to at least 150° C. In some embodiments, the organic solvent medium contains at least 40 weight percent, at least 50 weight percent, at least 60 weight percent, at least 70 weight percent, at least 80 weight percent, at least 90 weight percent, at least 95 weight percent, at least 97 weight percent, at least 98 weight percent, or at least 99 weight percent of the second organic solvent having a boiling point equal to at least 150° C. The boiling point is often at least 160° C., at least 170° C., at least 180° C., or at least 190° C.

Suitable second organic solvents that have a boiling point equal to at least 150° C. are typically selected to be miscible with water. Further, these second organic solvents are often selected to be soluble in supercritical carbon dioxide or liquid carbon dioxide. The molecular weight of the second organic solvent is usually at least 25 grams/mole, at least 30 grams/mole, at least 40 grams/mole, at least 45 grams/mole, at least 50 grams/mole, at least 75 grams/mole, or at least 100 grams/mole. The molecular weight can be up to 300 grams/mole or higher, up to 250 grams/mole, up to 225 grams/mole, up to 200 grams/mole, up to 175 grams/mole, or up to 150 grams/mole. The molecular weight is often in a range of 25 to 300 grams/mole, 40 to 300 grams/mole, 50 to 200 grams/mole, or 75 to 175 grams/mole.

The second organic solvent is often a glycol or polyglycol, mono-ether glycol or mono-ether polyglycol, di-ether glycol or di-ether polyglycol, ether ester glycol or ether ester polyglycol, carbonate, amide, or sulfoxide (e.g., dimethyl sulfoxide). The second organic solvents usually have one or more polar groups. The second organic solvent does not have a polymerizable group; that is, the organic solvent is free of a group that can undergo free radical polymerization. Further, no component of the organic solvent medium has a polymerizable group that can undergo free radical polymerization.

Suitable glycols or polyglycols, mono-ether glycols or mono-ether polyglycols, di-ether glycols or di-ether polyglycols, and ether ester glycols or ether ester polyglycols are often of Formula (IV).

In Formula (IV), each $R^{11}$ independently is hydrogen, alkyl, aryl, or acyl. Suitable alkyl groups often have 1 to 10 carbon atoms, 1 to 6 carbon atoms, or 1 to 4 carbon atoms. Suitable aryl groups often have 6 to 10 carbon atoms and are often phenyl or phenyl substituted with an alkyl group having 1 to 4 carbon atoms. Suitable acyl groups are often of formula —(CO)$R^{13}$ where $R^{13}$ is an alkyl having 1 to 10 carbon atoms, 1 to 6 carbon atoms, 1 to 4 carbon atoms, 2 carbon atoms, or 1 carbon atom. The acyl is often an acetate group (—(CO)CH$_3$). In Formula (IV), each $R^{12}$ is typically ethylene or propylene. The variable n is at least 1 and can be in a range of 1 to 10, 1 to 6, 1 to 4, or 1 to 3.

Glycols or polyglycols of Formula (IV) have two $R^{11}$ groups equal to hydrogen. Examples of glycols include, but are not limited to, ethylene glycol, propylene glycol, diethylene glycol, dipropylene glycol, triethylene glycol, and tripropylene glycol.

Mono-ether glycols or mono-ether polyglycols of Formula (IV) have a first $R^{11}$ group equal to hydrogen and a second $R^{11}$ group equal to alkyl or aryl. Examples of mono-ether glycols or mono-ether polyglycols include, but are not limited to, ethylene glycol monohexyl ether, ethylene glycol monophenyl ether, propylene glycol monobutyl ether, diethylene glycol monomethyl ether, diethylene glycol monoethyl ether, diethylene glycol monopropyl ether, diethylene glycol monobutyl ether, diethylene glycol monohexyl ether, dipropylene glycol monomethyl ether, dipropylene glycol monoethyl ether, dipropylene glycol monopropyl ether, triethylene glycol monomethyl ether, triethylene glycol monoethyl ether, triethylene glycol monobutyl ether, tripropylene glycol monomethyl ether, and tripropylene glycol monobutyl ether.

Di-ether glycols or di-ether polyglycols of Formula (IV) have two $R^{11}$ groups equal to alkyl or aryl. Examples of di-ether glycols or di-ether polyglycols include, but are not limited to, ethylene glycol dipropyl ether, ethylene glycol dibutyl ether, dipropylene glycol dibutyl ether, diethylene glycol dimethyl ether, diethylene glycol diethyl ether, triethylene glycol dimethyl ether, tetraethylene glycol dimethyl ether, and pentaethylene glycol dimethyl ether.

Ether ester glycols or ether ester polyglycols of Formula (IV) have a first $R^{11}$ group equal to an alkyl or aryl and a second $R^{11}$ group equal to an acyl. Examples of ether ester glycols or ether ester polyglycols include, but are not limited to, ethylene glycol butyl ether acetate, diethylene glycol butyl ether acetate, and diethylene glycol ethyl ether acetate.

Other suitable organic solvents are carbonates of Formula (V).

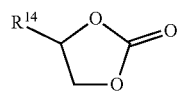

In Formula (V), $R^{14}$ is hydrogen or an alkyl such as an alkyl having 1 to 4 carbon atoms, 1 to 3 carbon atoms, or 1 carbon atom. Examples include ethylene carbonate and propylene carbonate.

Yet other suitable organic solvents are amides of Formula (VI).

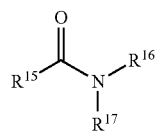

In Formula (VI), group $R^{15}$ is hydrogen, alkyl, or combines with $R^{16}$ to form a five-membered ring including the carbonyl attached to $R^{15}$ and the nitrogen atom attached to $R^{16}$. Group $R^{16}$ is hydrogen, alkyl, or combines with $R^{15}$ to form a five-membered ring including the carbonyl attached to $R^{15}$ and the nitrogen atom attached to $R^{16}$. Group $R^{17}$ is hydrogen or alkyl. Suitable alkyl groups for $R^{15}$, $R^{16}$, and $R^{17}$ have 1 to 6 carbon atoms, 1 to 4 carbon atoms, 1 to 3 carbon atoms, or 1 carbon atom. Examples of amide organic solvents of Formula (VI) include, but are not limited to, formamide, N,N-dimethylformamide, N,N-dimethylacetamide, N,N-diethylacetamide, N-methyl-2-pyrrolidone, and N-ethyl-2-pyrrolidone.

In some casting sols, the only radically polymerizable groups are those that are covalently attached to the silica particles (i.e., those that are part of the surface modified silica particles). These radically polymerizable groups are those that originate from the silane surface modification agent having a radically polymerizable group. In other casting sols, there are additional polymerizable materials that have a polymerizable group that can undergo radical polymerization (e.g., the polymerizable group is free radical polymerizable). In many embodiments, the polymerizable group is an ethylenically unsaturated group such as a (meth) acryloyl group, which is a group of formula —(CO)—CR$^c$=CH$_2$ where R$^c$ is hydrogen or methyl, or a vinyl group, which is a group of formula —CH=CH$_2$ that is not a (meth)acryloyl group. In still other embodiments, the polymerizable group is a thiol group (—SH).

The amount of polymerizable material in the casting sol can depend on the volume fraction and size of the silica particles included in the surface modified silica particles. Typically, enough polymerizable material is added such that the shaped gel article is strong enough to be removed from the mold cavity without breaking. In general, gel compositions can be made at silica volume fractions in a range of 1 to 30 volume percent or in a range of 2 to 30 volume percent. At high volume fractions, it may not be necessary to add any polymerizable material to the casting sol to obtain strong gel compositions (i.e., strong shaped gel articles). As the volume fraction of silica decreases, it may be necessary to add polymerizable material to the casting sol for sufficient gel strength. The size of the silica particles can also influence the amount of polymerizable material that is needed. For the same volume fraction of silica, less polymerizable material may be required for smaller particles than for larger ones. That is, the smaller particles often have higher amounts of covalently attached radically polymerizable groups on the surface. For a given silica particle size, the type of surface modification agent(s) can influence the amount of polymerizable material added. In some cases, if the surface modification composition includes a combination of surface modification agents (i.e., a surface modification agent with a radically polymerizable group in combination with the silane surface modification agent without a radically polymerizable group), more polymerizable material may be needed compared to when the surface modification composition includes only a silane surface modification agent with a radically polymerizable group.

Any suitable polymerizable material can be included in the casting sol. As used herein, however, the polymerizable material does not include those that have a silyl group because such compounds are considered to be a silane surface modification agent having a radically polymerizable group. The polymerizable material is often a polar monomer, a monomer having a plurality of radically polymerizable groups, an alkyl (meth)acrylate, a vinyl-containing monomer where the vinyl group is not a (meth)acryloyl group, a thiol-containing monomer, and mixtures thereof The overall composition of the polymerizable material is often selected so that the polymerized material is soluble in the organic solvent medium. Homogeneity of the organic phase is often preferable to avoid phase separation of the organic material in the gel composition. This tends to result in the formation of smaller and more homogeneous pores (pores with a narrower size distribution) in the gel composition and in the subsequently formed xerogel or aerogel. Further, the overall composition of the polymerizable material can be selected to adjust compatibility with the organic solvent medium and to adjust the strength, flexibility, and uniformity of the gel composition. Still further, the overall composition of the polymerizable material can be selected to adjust the burnout characteristics of the organic material prior to sintering.

The weight ratio of the organic solvent medium to the polymerizable material is usually at least 1. This weight ratio can help ensure that the viscosity of the casting sol and the volume fraction of silica are in a suitable range. The weight ratio is often at least 1.5, at least 2, at least 2.5, or at least 3 and can be up to 10, up to 8, up to 6, or up to 5. For example, the weight ratio is often in a range of 1 to 10, 1 to 8, 1 to 6, 1 to 5, 4 to 4, 1.5 to 6, 2 to 6, or 2 to 4.

In many embodiments, the polymerizable material includes a monomer having a plurality of polymerizable groups. The number of polymerizable groups can be in a range of 2 to 6 or even higher. In many embodiments, the number of polymerizable groups is in a range of 2 to 5 or 2 to 4. The polymerizable groups are typically (meth)acryloyl groups.

Exemplary monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, and neopentylglycol hydroxypivalate diacrylate modified caprolactone.

Exemplary monomers with three or four (meth)acryloyl groups include, but are not limited to, propoxylated glycerin tri(meth)acrylate, trimethylolpropane triacrylate (e.g., commercially available under the trade designation TMPTA-N from Cytec Industries, Inc. (Smyrna, Ga., USA) and under the trade designation SR-351 from Sartomer (Exton, Pa., USA)), pentaerythritol triacrylate (e.g., commercially available under the trade designation SR-444 from Sartomer), ethoxylated (3) trimethylolpropane triacrylate (e.g., commercially available under the trade designation SR-454 from Sartomer), ethoxylated (4) pentaerythritol tetraacrylate (e.g., commercially available under the trade designation SR-494 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), and di-trimethylolpropane tetraacrylate (e.g., commercially available under the trade designation SR-355 from Sartomer).

Exemplary monomers with five or six (meth)acryloyl groups include, but are not limited to, dipentaerythritol pentaacrylate (e.g., commercially available under the trade designation SR-399 from Sartomer) and a hexa-functional urethane acrylate (e.g., commercially available under the trade designation CN975 from Sartomer).

Some polymerizable compositions contain 0 to 100 weight percent of a monomer having a plurality of polymerizable groups based on a total weight of the polymerizable material. For example, the amount can be in a range of 10 to 100 weight percent, 10 to 80 weight percent, 20 to 80 weight percent, 30 to 80 weight percent, 40 to 80 weight percent, 10 to 70 weight percent, 10 to 60 weight percent, 10 to 50 weight percent, or 10 to 40 weight percent. The presence of the monomer having a plurality of polymerizable groups tends to enhance the strength of the gel composition formed when the casting sol is polymerized. Such gel compositions can be easier to remove from the mold without cracking. The amount of the monomer with a plurality of the polymerizable groups can be used to adjust the flexibility and the strength of the gel composition.

In some embodiments, the polymerizable material includes a polar monomer. As used herein, the term "polar monomer" refers to a monomer having a radically polymerizable group and a polar group. The polar group typically contains an acidic group, a hydroxyl group, a primary amido group, a secondary amido group, a tertiary amido group, or an ether group (i.e., a group containing at least one alkyleneoxy-alkylene group of formula —R—O—R— where each R is an alkylene having 1 to 4 carbon atoms).

Suitable polar monomers having an acidic group include, but are not limited to, (meth)acrylic acid, itaconic acid, fumaric acid, crotonic acid, citraconic acid, maleic acid, oleic acid, β-carboxyethyl acrylate, 2-(meth)acrylamidoethanesulfonic acid, 2-(meth)acrylamido-2-methylpropane sulfonic acid, vinylsulfonic acid, and the like. In many embodiments, the polar monomer with an acidic group is (meth)acrylic acid.

Suitable polar monomers having a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), and hydroxyalkyl (meth)acrylamides (e.g., 2-hydroxyethyl (meth)acrylamide or 3-hydroxypropyl (meth)acrylamide), ethoxylated hydroxyethyl (meth)acrylates (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxy-propyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, and N-octyl (meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Exemplary polar monomers with an ether group include, but are not limited to, alkoxylated alkyl (meth)acrylates such as ethoxyethoxyethyl (meth)acrylate, 2-methoxyethyl (meth)acrylate, and 2-ethoxyethyl (meth)acrylate, and poly(alkylene oxide) (meth)acrylates such as poly(ethylene oxide) (meth)acrylates and poly(propylene oxide) (meth)acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

The amount of a polar monomer is often in a range of 0 to 50 weight percent, 0 to 40 weight percent, 0 to 35 weight percent, 0 to 30 weight percent, 5 to 50 weight percent, 5 to 40 weight percent, 5 to 30 weight percent, 10 to 50 weight percent, 10 to 40 weight percent, 10 to 30 weight percent, 15 to 50 weight percent, 15 to 40 weight percent, or 15 to 30 weight percent based on a total weight of the polymerizable material.

In some embodiments, the polymerizable material includes an alkyl (meth)acrylate or a mixture of alkyl (meth)acrylates. Suitable alkyl (meth)acrylates often have an alkyl group with a linear, branched, or cyclic structure. Examples of suitable alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isobornyl (meth)acrylate, isononyl (meth)acrylate, isoamyl (meth)acrylate, 3,3,5-trimethylcyclohexyl (meth)acrylate, n-decyl (meth)acrylate, isodecyl (meth)acrylate, isobornyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylate. In some embodiments, the alkyl (meth)acrylates are a mixture of various isomers having the same number of carbon atoms as described in PCT Patent Application Publication WO 2014/151179 (Colby et al.). For example, an isomer mixture of octyl (meth)acrylate can be used.

The amount of an alkyl (meth)acrylate monomer is often in a range of 0 to 60 weight percent, 0 to 50 weight percent, 0 to 45 weight percent, 0 to 40 weight percent, 5 to 60 weight percent, 5 to 50 weight percent, 5 to 45 weight percent, 5 to 40 weight percent, 10 to 60 weight percent, 10 to 50 weight percent, 10 to 45 weight percent, 10 to 40 weight percent, 15 to 60 weight percent, 15 to 50 weight percent, 15 to 45 weight percent, or 15 to 40 weight percent based on a total weight of the polymerizable material.

The total amount of polymerizable material in the casting sol is in a range of 0 to 40 weight percent based on the total weight of the casting sol. The amount can be at least 1 weight percent, at least 2 weight percent, at least 3 weight percent, at least 5 weight percent, or at least 10 weight percent and up to 35 weight percent, up to 30 weight percent, up to 25 weight percent up to 20 weight percent, up to 15 weight percent, or up to 10 weight percent. In some embodiments, the amount is in a range of 0 to 30 weight percent, 0 to 20 weight percent, 0 to 10 weight percent, 1 to 40 weight percent, 1 to 30 weight percent, 1 to 20 weight percent, 5 to 40 weight percent, 5 to 30 weight percent, 5 to 20 weight percent, 10 to 40 weight percent, or 10 to 30 weight percent based on the total weight of the casting sol.

In some applications, it can be advantageous to minimize the weight ratio of polymerizable material to surface modified silica particles in the casting sol. This tends to reduce the amount of decomposition products of organic material that needs to be burned out prior to formation of the sintered article. On the other hand, having a weight ratio of polymerizable materials to surface modified silica particles up to 5 or more can still result in the production of good sintered articles. The weight ratio of polymerizable material to silica particles is often at least 0.05, at least 0.1, at least 0.15, at least 0.2, at least 0.25, at least 0.3, at least 0.4, or at least 0.5 and can be up to 5 or even higher, up to 4, up to 3, up to 2, up to 1.5, or up to 1. For example, the ratio can be in a range of 0.05 to 5, 0.1 to 5, 0.5 to 5, 0.05 to 3, 0.1 to 3, 0.5 to 3, 0.05 to 2, 0.1 to 2, 0.5 to 2, or 0.5 to 1.5.

The casting sol used to form the gel composition contains an initiator for a radical polymerization reaction (e.g., a free radical polymerization reaction). The radical initiator can be either a thermal initiator or a photoinitiator. In many embodiments, the radical initiator is a photoinitiator and the polymerization reaction is initiated by application of actinic radiation. That is, the radically polymerizable groups are polymerized using a photoinitiator rather than a thermal initiator. Surprisingly, the use of a photoinitiator rather than a thermal initiator tends to result in a more uniform cure throughout the gel composition ensuring uniform shrinkage and crack-free articles in subsequent steps involved in the formation of sintered articles. In addition, the outer surface of the cured part is often more uniform and more defect free when a photoinitiator is used rather than a thermal initiator.

Photoinitiated polymerization reactions often lead to shorter curing times and fewer concerns about competing inhibition reactions compared to thermally initiated polymerization reactions. The curing times can be more easily controlled than with thermal initiated polymerization reactions that must be used with opaque casting sols.

In most embodiments, the photoinitiators are selected to respond to ultraviolet and/or visible radiation. Stated differently, the photoinitiators usually absorb light in a wavelength range of 200 to 600 nanometers, 300 to 600 nanometers, 300 to 450 nanometers, 400 to 500 nanometers, or 410 to 475 nanometers. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Other exemplary photoinitiators are substituted benzophenones such as 1-hydroxycyclohexyl benzophenone (available, for example, under the trade designation "IRGACURE 184" from Ciba Specialty Chemicals Corp., Tarrytown, N.Y.). Still other exemplary photoinitiators are substituted alpha-ketones such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include camphorquinone, bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

Suitable thermal initiators include various azo compound such as those commercially available under the trade designation VAZO from E. I. DuPont de Nemours Co. (Wilmington, Del., USA) including VAZO 67, which is 2,2'-azobis (2-methylbutane nitrile), VAZO 64, which is 2,2'-azobis (isobutyronitrile), VAZO 52, which is 2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa.) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

If a thermal initiator is used, the casting sol is often heated to a temperature of at least 40° C. or at least 50° C. and up to 120° C., up to 100° C., up to 80° C., or up to 60° C. For example, the casting sol can be heated in a range of 40° C. to 80° C., in a range of 40° C. to 70° C., in a range of 40° C. to 60° C., in a range of 50° C. to 80° C., in a range of 50° C. to 70° C., or in a range of 50° C. to 60° C. The temperature is held for any suitable time such as at least 30 minutes or at least 60 minutes.

The radical initiator is typically present in an amount in the range of 0.01 to 5 weight percent based on the weight of the casting sol. For example, the amount of the radical initiator is often at least 0.05 weight percent, at least 0.1 weight percent, at least 0.2 weight percent, or at least 0.5 weight percent. The amount can be up to 4 weight percent, up to 3 weight percent, up to 2.5 weight percent, up to 2 weight percent, or up to 1 weight percent, In some embodiments, the amount of the radical initiator is in a range of 0.05 to 5 weight percent, 0.05 to 4 weight percent, 0.05 to 3 weight percent, 0.05 to 2 weight percent, 0.1 to 5 weight percent, 0.1 to 3 weight percent, 0.1 to 2 weight percent, 0.2 to 5 weight percent, 0.2 to 3 weight percent, 0.2 to 2.5 weight percent, or 0.2 to 2 weight percent based on a total weight of the casting sol.

The casting sol used to form the gel composition can include an optional inhibitor. The inhibitor can help prevent undesirable side reactions and can help moderate the polymerization reaction. The inhibitor is often added prior to evaporation of water and an optional first organic solvent after surface modification of the silica particle with the silane surface modification agent with a radically polymerizable group. The presence of the inhibitor minimizes the extent of premature polymerization reactions during the evaporation step.

Suitable inhibitors are often 4-hydroxy-TEMPO (4-hydroxy-2,1,6,6-tetramethylpiperidinyloxy) or a phenol derivative such as, for example, butylhydroxytoluene or p-methoxyphenol. The inhibitor is often used in an amount in a range of 0 to 1 weight percent based on the weight of the casting sol. For example, the inhibitor can be present in an amount equal to at least 0.001 weight percent, at least 0.005 weight percent, at least 0.01 weight percent. The amount can be up to 1 weight percent, up to 0.5 weight percent, or up to 0.1 weight percent.

Overall, the casting sol that is used to form the gel composition contains (a) 2 to 65 weight percent surface modified silica particles, (b) 0 to 40 weight percent polymerizable material that does not contain a silyl group, (c) 0.01 to 5 weight percent radical initiator, and (d) 30 to 90 weight percent organic solvent medium, wherein each weight percent is based on the total weight of the casting sol. The casting sol includes no more than 50 weight percent silica (which corresponds to no more than 30 volume percent silica).

In some embodiments, the casting sol contains (a) 4 to 45 weight percent surface modified silica particles, (b) 5 to 35 weight percent polymerizable material that does not contain a silyl group, (c) 0.01 to 5 weight percent radical initiator, and (d) 40 to 80 weight percent organic solvent medium, wherein each weight percent is based on the total weight of the casting sol. The casting sol includes no more than 36 weight percent silica (which corresponds to no more than 22 volume percent silica).

In some embodiments, the casting sol contains (a) 10 to 36 weight percent surface modified silica particles, (b) 10 to 30 weight percent polymerizable material that does not contain a silyl group, (c) 0.01 to 5 weight percent radical initiator, and (d) 50 to 70 weight percent organic solvent medium, wherein each weight percent is based on the total weight of the casting sol. The casting sol includes no more than 28 weight percent silica (which corresponds to no more than 17 volume percent silica).

The casting sol can be used to prepare a shaped gel article and then a sintered article. That is, a method of making a sintered article is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) forming a dried shaped gel article by removing the organic solvent medium, (e) removing either the shaped gel article or the dried shaped gel article from the mold cavity, (f) heating the dried shaped gel article to form a sintered article. The sintered article has a shape identical to the mold cavity (except in regions where the mold cavity was overfilled) and to the shaped gel article but reduced in size proportional to an amount of isotropic shrinkage.

The casting sol is placed into a mold cavity prior to curing (i.e., polymerization) to form the gel composition (shaped gel article). Any method of placing the casting sol in the mold cavity can be used. The shaped gel article takes on a shape defined by the mold cavity. Each mold has at least one mold cavity. If a photoinitiator is used, the casting sol is typically exposed to ultraviolet and/or visible radiation while in contact with a surface of the mold cavity. If a thermal initiator is used, the casting sol is typically heated while in contact with a surface of the mold cavity. The polymerizable groups (such as the radically polymerizable groups attached to the silica particles and any other optional polymerizable material) within the casting sol undergoes radical polymerization (e.g., free radical polymerization). Because at least some of the polymerizable groups are attached to the surface of the silica particles, polymerization results in the formation of a three-dimensional gel composition that binds together silica particles. This usually leads to a strong and resilient gel composition. This also can lead to homogeneous gel compositions with small, uniform pore sizes that can be sintered at relatively lower temperatures. The silica particles typically do not phase separate during curing to form the gel composition.

The casting sol often has a high optical transmission due to the small size and non-associated form of the surface modified silica particles. High optical transmission of the casting sol can be desirable in the preparation of transparent or translucent sintered articles. As used herein, "optical transmission" refers to the amount of light that passes through a sample (e.g., a silica sol, a casting sol, a gel composition, or a sintered article) divided by the total amount of light incident upon the sample. The percent optical transmission may be calculated using the equation $$100 \, (I/I_o)$$

where I is the light intensity passing though the sample and $I_o$ is the light intensity incident on the sample. Good transmission through the casting sol helps ensure that adequate curing occurs during the formation of the gel composition with ultraviolet and/or visible radiation and provides a greater depth of cure within the gel composition.

The optical transmission of the casting sol may be determined using an ultraviolet/visible spectrophotometer set, for example, at a wavelength of 420 nanometers or 600 nanometers with a 1 centimeter path length. The optical transmission is a function of the amount of silica particles in the casting sol and the silica particle size. The percent transmission of a casting sol composition containing 20 weight percent silica particles is typically at least 10 percent when measured at 420 nanometers in a 1 centimeter sample cell (i.e., the spectrophotometer has a 1 centimeter path length). In some examples, the percent transmission under these same conditions is at least 15 percent, at least 20 percent, at least 30 percent, at least 40 percent, and at least 50 percent. The percent transmission of a casting sol composition containing 20 weight percent silica particles is typically at least 50 percent when measured at 600 nanometers in a 1 centimeter sample cell. In some examples, the percent transmission under these same conditions is at least 60 percent, at least 70 percent, at least 80 percent, or at least 90 percent or higher. The casting sol is translucent and not opaque. In some embodiments, the cured gel compositions are translucent or transparent. For example, if the average silica particle size is close to 5 nanometers, the casting sol, the gel composition, the aerogel, the xerogel, and the sintered article can be translucent or transparent.

The transmission of the ultraviolet/visible radiation (in the case of a photoinitiator) or the applied heat (in the case of a thermal initiator) should be sufficiently high to form a gel composition that is uniform. The transmission or applied heat should be sufficient to allow polymerization to occur uniformly throughout the mold cavity. That is, percent cure should be uniform or fairly uniform throughout the gel composition formed within the mold cavity.

The casting sol typically has a viscosity that is sufficiently low so that it can effectively fill small, complex features of a mold cavity. In many embodiments, the casting sols have viscosities that are Newtonian or nearly Newtonian. That is, the viscosity is independent of shear rate or has only a slight dependence on shear rate. The viscosity can vary depending on the percent solids of the casting sol, the size of the silica particles, the composition of the organic solvent medium, the presence or absence of optional non-polymerizable surface modification agents, and the composition of the polymerizable material. In some embodiments, the viscosity is at least 2 centipoises, at least 5 centipoises, at least 10 centipoises, at least 25 centipoises, at least 50 centipoises, at least 100 centipoises, at least 150 centipoises, or at least 200 centipoises. The viscosity can be up to 500 centipoises, up to 300 centipoises, up to 200 centipoises, up to 100 centipoises, up to 50 centipoises, up to 30 centipoises, or up to 10 centipoises. For example, the viscosity can be in a range of 2 to 500 centipoises, 2 to 200 centipoises, 2 to 100 centipoises, 2 to 50 centipoises, 2 to 30 centipoises, 2 to 20 centipoises, or 2 to 10 centipoises.

The combination of low viscosity and small particle size of the silica particles advantageously allows the casting sol to be filtered before polymerization. The casting sol is often filtered prior to placement within the mold cavity. Filtering can be beneficial for removal of debris and impurities that can negatively impact the properties of the gel composition and properties of the sintered article such as optical transmission and strength. Suitable filters often retain material having a size greater than 0.22 micrometers, greater than 0.45 micrometers, greater than 1 micrometer, greater than 2 micrometers, or greater than 5 micrometers. Traditional ceramic molding compositions cannot be easily filtered due to particle size, particle association, and/or viscosity.

In some embodiments, the mold has multiple mold cavities or multiple molds with a single mold cavity can be arranged to form a belt, sheet, continuous web or die that can be used in a continuous process of preparing shaped gel articles.

The mold can be constructed of any material or combinations of materials commonly used for a mold. That is, the mold can be fabricated from a metallic material including an alloy, ceramic material, glass, quartz, or polymeric material. Suitable metallic materials include, but are not limited to nickel, titanium, aluminum, chromium, silicon, iron, carbon steel, and stainless steel. Suitable polymeric materials include, but are not limited to, a silicone, polyester, polycarbonate, poly(ether sulfone), poly(methyl methacrylate), polyurethane, polyvinylchloride, polystyrene, polypropylene, or polyethylene. In some cases, the entire mold is constructed of one or more polymeric materials. In other cases, only the surfaces of the mold that are designed to contact the casting sol, such as the surface of the one or more mold cavities, are constructed of one or more polymeric materials. For example, when the mold is made from metal, glass, ceramic, or the like, one or more surfaces of the mold can optionally have a coating of a polymeric material.

The mold having one or more mold cavities can be replicated from a master tool. The master tool can have a pattern that is the inverse of the pattern that is on the working mold in that the master tool can have protrusions that correspond to the cavities on the mold. The master tool can be made of metal, such as nickel or an alloy thereof, or other materials such as polymeric materials or ceramic materials. To make the mold, a polymeric sheet can be heated and placed next to the master tool. The polymeric sheet can then be pushed against the master tool to emboss the polymeric sheet, thereby forming a working mold. It is also possible to extrude or cast one or more polymeric materials onto a master tool to prepare the working mold. Many other types of mold materials, such as metal, can be embossed by a master tool in a similar manner. Disclosures related to forming working molds from master tools include U.S. Pat. No. 5,125,917 (Pieper), U.S. Pat. No. 5,435,816 (Spurgeon), U.S. Pat. No. 5,672,097 (Hoopman), U.S. Pat. No. 5,946,991 (Hoopman), U.S. Pat. No. 5,975,987 (Hoopman), and U.S. Pat. No. 6,129,540 (Hoopman).

The mold cavity can have any desired three-dimensional shape. Some molds have a plurality of uniform mold cavities with the same size and shape. The mold cavity can have a surface that is smooth (i.e., lacking features) or can have features of any desired shape and size. The resulting shaped gel articles can replicate the features of the mold cavity even if the dimensions are quite small. This is possible because of the relatively low viscosity of the casting sol (casting sol) and the use of silica particles having an average particle size no greater than 100 nanometers. For example, the shaped gel article can replicate features of the mold cavity that have a dimension up to 500 micrometers, up to 100 micrometers, less than 50 micrometers, less than 20 micrometers, less than 10 micrometers, less than 5 micrometers, less than 1 micrometer, or less than 0.5 micrometers.

If a photoinitiator is used, the mold cavity has at least one surface that allows transmission of ultraviolet and/or visible radiation to initiate the polymerization of the casting sol within the mold cavity. In some embodiments, this surface is selected to be constructed of a material that will transmit at least 50 percent, at least 60 percent, at least 70 percent, at least 80 percent, at least 90 percent, or at least 95 percent of the incident ultraviolet and/or visible radiation. Higher transmission may be needed as the thickness of the molded part increases. The surface is often glass or a polymeric material such as polyethylene terephthalate, poly(methyl methacrylate), or polycarbonate.

In some cases, the mold cavity is free of a release agent. This can be beneficial because it can help ensure that the contents of the mold stick to the mold walls and maintain the shape of the mold cavity. In other cases, release agents can be applied to the surfaces of the mold cavity to ensure clean release of the shaped gel article from the mold.

The mold cavity, whether coated with mold release agent or not, can be filled with the casting sol. The casting sol can be placed into the mold cavity by any suitable methods. Examples of suitable methods include pumping through a hose, using a knife roll coater, or using a die such as a vacuum slot die. A scraper or leveler bar can be used to force the casting sol into the one or more cavities, and to remove any of the casting sol that does not fit into the mold cavity. Any portion of casting sol that does not fit into the one or more mold cavities can be recycled and used again later, if desired. In some embodiments, it may be desirable to form a shaped gel article that is formed from multiple adjacent mold cavities. That is, it may be desirable to allow the casting sol to cover a region between two mold cavities to form a desired shaped gel article.

Because of its low viscosity, the casting sol can effectively fill small crevices or small features in the mold cavity. These small crevices or features can be filled even at low pressures. The mold cavity can have a smooth surface or can have a complex surface with one or more features. The features can have any desired shape, size, regularity, and complexity. The casting sol can typically flow effectively to cover the surface of the mold cavity regardless of the complexity of the shape of the surface. The casting sol is usually in contact with all surfaces of the mold cavity.

Dissolved oxygen can be removed from the casting sol, either before the casting sol is placed within the mold or while the casting sol is in the mold cavity. This can be achieved by vacuum degassing or purging with an inert gas such as nitrogen or argon. Removing dissolved oxygen can reduce the occurrence of unwanted side reactions, particularly unwanted reactions that involve oxygen. Because such side reactions are not necessarily detrimental to the product, and do not occur in all circumstances, removing dissolved oxygen is not required.

Polymerization of the casting sol occurs upon exposure to ultraviolet and/or visible radiation (if a photoinitiator is used) or upon exposure to heat (if a thermal initiator is used) and results in the formation of a gel composition, which is a polymerized (cured) product of the casting sol. The gel composition is a shaped gel article having a shape that is the same as the mold (e.g., the mold cavity). The gel composition is a solid or semi-solid matrix with liquid entrapped therein. The organic solvent medium in the gel composition often is mainly the second organic solvent that has a boiling point greater than 150° C.

Due to the homogeneous nature of the casting sol and the use of ultraviolet/visible radiation to cure the polymeric material, the resulting gel composition tends to have a homogeneous and crack-free structure. The homogeneous structure has small pores that are fairly uniform in size. This homogeneous structure advantageously leads to low temperature (e.g., less than 1200° C.) isotropic shrinkage during further processing to form a sintered article.

The casting sol typically cures (i.e., polymerizes) with little or no shrinkage. This is beneficial for maintaining the fidelity of the gel composition relative to the mold. Without being bound by theory, it is believed that the low shrinkage may be contributable to the combination of high organic solvent medium concentrations in the gel compositions as well as the bonding of the silica particles together through the polymerized surface modification agent that is attached to the surface of the particles.

Preferably, the gelation process (i.e., the process of forming the gel composition) allows the formation of shaped gel articles of any desired size that can then be processed without inducing crack formation. For example, preferably the gelation process leads to a shaped gel article having a structure that will not collapse when removed from the mold. Preferably, the shaped gel article is stable and sufficiently strong to withstand drying and sintering.

After polymerization, the shaped gel article is treated to remove the organic solvent medium that may be present. This can be referred to as drying the gel composition or the shaped gel article regardless of the method used to remove the organic solvent. The shaped gel article can be removed from the mold prior to drying or, alternatively, drying can occur while the shaped gel article is positioned within the mold and the dried shaped gel article (shaped gel article after drying) can be removed from the mold. The dried shaped gel article is typically an aerogel or xerogel.

In some embodiments, removal of the organic solvent medium occurs by drying the shaped gel article at room temperature (e.g., 20° C. to 25° C.) or at an elevated temperature. Any desired drying temperature up to 200° C. can be used. If the drying temperature is higher, the rate of organic solvent medium removal may be too rapid and cracking can result. The temperature is often no greater than 175° C., no greater than 150° C., no greater than 125° C., or no greater than 100° C. The temperature for drying is usually at least 25° C., at least 50° C., or at least 75° C. A xerogel results from this process of organic solvent removal.

That is, a method of making a xerogel is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) removing the organic solvent medium from the shaped gel article by evaporation to form the xerogel, and (e) removing either the shaped gel article or the xerogel from the mold cavity, wherein the xerogel has a shape identical to the mold cavity (except in regions where the mold cavity was overfilled) and to the shaped gel article but reduced in size proportional to an amount of isotropic shrinkage.

Forming a xerogel can be used for drying shaped gel articles with any dimensions but is most frequently used for the preparation of relatively small sintered articles. As the gel composition dries either at room temperature or at elevated temperatures, the density of the structure increases. Capillary forces pull the structure together resulting in some linear shrinkage such as up to about 35 percent, up to 30 percent, or up to 25 percent. The shrinkage is typically dependent on the amount of silica particles present and the overall composition. The linear shrinkage is often in a range of 5 to 35 percent, 10 to 35 percent, 5 to 30 percent, or 10 to 30 percent. Because the drying typically occurs most rapidly at the outer surfaces, density gradients are often established throughout the structure. Density gradients can lead to the formation of cracks. The likelihood of crack formation increases with the size and the complexity of the shaped gel article and with the complexity of the structure. In some embodiments, xerogels are used to prepare sintered bodies having a longest dimension no greater than about 1 centimeter.

In some embodiments, the xerogels contain some residual organic solvent medium. The residual organic solvent medium can be up to 6 weight percent based on the total weight of the xerogel. For example, the xerogel can contain up to 5 weight percent, up to 4 weight percent, up to 3 weight percent, up to 2 weight percent, or up to 1 weight percent organic solvent medium.

The volume percent silica in the xerogel is often in a range of 1 to 45 volume percent. For example, the volume percent of the silica is often at least 2 volume percent, at least 3 volume percent, at least 4 volume percent or at least 5 volume percent. Xerogels having a lower volume percent silica tend to be quite fragile and may crack during supercritical extraction or subsequent processing. Additionally, if there is too much polymeric material present, the pressure during subsequent heating may be unacceptably high resulting in the formation of cracks. Xerogels with more than 45 volume percent silica content tend to crack during the calcination process when the polymeric material decomposes and vaporizes. It may be more difficult for the decomposition products to escape from the denser structures. The volume percent silica is often up to 40 volume percent, up to 35 volume percent, up to 30 volume percent, up to 25 volume percent, up to 20 volume percent, up to 15 volume percent, or up to 10 volume percent. The volume percent is often in a range of 3 to 45 volume percent, 3 to 40 volume percent, 3 to 35 volume percent, 3 to 30 volume percent, 3 to 25 volume percent, 3 to 20 volume percent, 3 to 15 volume percent, 4 to 40 volume percent, 4 to 20 volume percent, 5 to 40 volume percent, or 5 to 20 volume percent.

If the shaped gel article has fine features that can be easily broken or cracked, it is often preferable to form an aerogel intermediate rather than a xerogel. A shaped gel article of any size and complexity can be dried to an aerogel. An aerogel is formed by drying the shaped gel article under supercritical conditions. A supercritical fluid, such as supercritical carbon dioxide, can be contacted with the shaped gel article in order to remove solvents that are soluble in or miscible with the supercritical fluid. The organic solvent medium can be removed by supercritical carbon dioxide.

That is, a method of making an aerogel is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) removing the organic solvent medium from the shaped gel article by supercritical extraction to form the aerogel, wherein the aerogel has a shape identical to the mold cavity (except in regions where the mold cavity was overfilled) and to the shaped gel article but reduced in size proportional to an amount of isotropic shrinkage, and (e) removing either the shaped gel article or the aerogel from the mold cavity.

There is minimal or no capillary effect for the type of drying used to form an aerogel. The linear shrinkage is often in a range of 0 to 25 percent, 0 to 20 percent, 0 to 15 percent, 5 to 15 percent, or 0 to 10 linear percent. The volume shrinkage is often in a range of 0 to 50 percent, 0 to 40 percent, 0 to 35 percent, 0 to 30 percent, 0 to 25 percent, 10 to 40 percent, or 15 to 40 percent. Both the linear and volume shrinkage are dependent on the percent silica present in the structures as well as the amount and type of polymerizable material and the organic solvent medium composition. The density typically remains uniform throughout the structure. Supercritical extraction is discussed in detail in van Bommel et al., J. Materials Sci., 29, 943-948 (1994), Francis et al., J. Phys. Chem., 58, 1099-1114 (1954), and McHugh et al., Supercritical Fluid Extraction: Principles and Practice, Butterworth-Heinemann, Stoneham, Mass., 1986.

The use of the second organic solvent having a boiling point equal to at least 150° C. and miscible in supercritical carbon dioxide advantageously eliminates the need to soak the shaped gel article in a solvent such as alcohol (e.g., ethanol) to replace water prior to supercritical extraction. This replacement is needed to provide a liquid that is soluble with (can be extracted by) the supercritical fluid. The soaking step often results in the formation of a rough surface on the shaped gel article. The rough surface created from the soaking step may result from residue deposition (e.g., organic residue) during the soaking step. Without the soaking step, the shaped gel article can better retain the original glossy surface it had upon removal from the mold cavity.

Supercritical extraction can remove all or most of the organic solvent medium, including any organic solvent having a boiling point equal to at least 150° C. The removal of the organic solvent results in the formation of pores within the dried structure. Preferably, the pores are sufficiently large to allow gases from the decomposition products of the polymeric material to escape without cracking the structure when the dried structure is further heated to burnout the organic material and to form a sintered article.

In some embodiments, the aerogels contain some residual organic solvent medium such as the second organic solvent with a boiling point equal to at least 150° C. The residual organic solvent medium can be up to 6 weight percent based on the total weight of the aerogel. For example, the aerogel can contain up to 5 weight percent, up to 4 weight percent, up to 3 weight percent, up to 2 weight percent, or up to 1 weight percent organic solvent having a boiling point equal to at least 150° C.

In some embodiments, aerogels have a specific surface area (i.e., a BET specific surface area) in a range of 20 m²/gram to 800 m²/gram or in a range of 20 to 600 m²/gram. For example, the surface area is at least 30 m²/gram, at least 40 m²/gram, at least 50 m²/gram, at least 75 m²/gram, at least 100 m²/gram, at least 125 m²/gram, at least 150 m²/gram, or at least 175 m²/gram. The surface area can be up to 800 m²/gram, up to 600 m²/gram, up to 550 m²/gram, up to 500 m²/gram, up to 450 m²/gram, up to 400 m²/gram, up to 350 m²/gram, up to 300 m²/gram, up to 275 m²/gram, up to 250 m²/gram, up to 225 m²/gram, or up to 200 m²/gram.

The volume percent silica in the aerogel is often in a range of 1 to 35 volume percent. For example, the volume percent of the silica is often at least 2 volume percent, at least 3 volume percent, at least 4 volume percent or at least 5 volume percent. Aerogels having a lower volume percent silica tend to be quite fragile and may crack during supercritical extraction or subsequent processing. Additionally, if there is too much polymeric material present, the pressure during subsequent heating may be unacceptably high resulting in the formation of cracks. Aerogels with more than 35 volume percent silica content tend to crack during the calcination process when the polymeric material decomposes and vaporizes. It may be more difficult for the decomposition products to escape from the denser structures. The volume percent silica is often up to 30 volume percent, up to 25 volume percent, up to 20 volume percent, up to 15 volume percent, or up to 10 volume percent. The volume percent is often in a range of 3 to 35 volume percent, 3 to 30 volume percent, 3 to 25 volume percent, 3 to 20 volume percent, 3 to 15 volume percent, 4 to 35 volume percent, 4 to 20 volume percent, 5 to 35 volume percent, 5 to 30 volume percent, or 5 to 20 volume percent.

After removal of the organic solvent medium, the resulting xerogel or aerogel is heated to remove the polymeric material or any other organic material that may be present and to build strength through densification. The majority of the polymeric material is removed by the time the temperature reaches 600° C. and/or by holding the temperature at 600° C. The rate of temperature increase is usually carefully controlled so that the pressure resulting from the decomposition and vaporization of the organic material does not result in pressures within the structures sufficient to generate cracks. Thermogravimetric analysis and dilatometry can be used to determine the appropriate rate of heating. These techniques track the weight loss and shrinkage that occur at different heating rates. The heating rates in different temperature ranges can be adjusted to maintain a slow and near constant rate of weight loss and shrinkage until the organic material is removed. Careful control of organic removal facilitates the formation of sintered articles with minimal or no cracking.

In some embodiments, the temperature is first increased from about 20° C. to about 200° C. at a moderate rate such as in a range of 10° C./hour to 30° C./hour. This is followed by increasing the temperature to about 400° C., to about 500° C., or to about 600° C. relatively slowly (e.g., at a rate of 1° C./hour to less than 10° C./hour). This slow heating rate facilitates vaporization of the organic material without cracking the structure. The density of the shaped article at this point is often less than 40 percent of theoretical density. For some applications where porosity is desired, no further densification may be necessary.

In some embodiments, the sample is further densified (sintered) to provide an article having a density in a range of 40 percent to 93 percent of theoretical density. Such articles will typically have pores open to the surface and may be suitable for various applications such as, for example, catalysis and filtration. To prepare articles within this density range, the temperature is often raised up to 900° C., up to 950° C., up to 975° C., up to 1000° C., or up to 1025° C. The rate of temperature increase can be constant or can be varied over time. The temperature can be increased to a certain temperature, held at that temperature for a period of time, and then increased further at the same rate or at a different rate. This process can be repeated multiple times, if desired. In some example, the temperature is gradually increased from 600° C. to a temperature in the range of 900° C. to 1025° C. The temperature often can be increased rapidly such as at a rate greater than 50° C./hour (e.g., 50° C./hour to 600° C./hour or 50° C./hour to 100° C./hour). The temperature can be held at any temperature for up to 5 minutes, up to 10 minutes, up to 20 minutes, up to 30 minutes, up to 60 minutes, or up to 120 minutes or even longer. The sintering can occur under atmospheric conditions (no special environmental conditions are required).

If a sintered article having a density greater than 93 percent of the theoretical density (such in a range of 95 to 99.9 percent of theoretical density) is desired, the article is often cooled after being heated sufficiently to achieve a density in a range of 40 to 93 percent of theoretical density. This cooled article optionally can be soaked in an acidic solution such as an aqueous solution of nitric acid. Soaking can be effective in removing undesirable ionic impurities because of the porous nature of the articles at this stage of the process. If ionic impurities are not removed, they can nucleate crystallization of the silica during sintering. Crystallization can lead to opacity, cracking, and warpage in the final article.

More specifically, the cooled article can be soaked in an aqueous solution of 1.4 weight percent nitric acid. This soaking step is often for at least 8 hours, at least 16 hours, or at least 24 hours. After soaking, the article is removed from the nitric acid solution and washed thoroughly with water. The article then can be soaked in water for any desired period of time such as at least 30 minutes, at least 1 hour, at least 2 hours, or at least 4 hours. In some cases the water soak can be up to 24 hours or greater. The soaking in water step can be repeated several times, if desired, by replacing the water with fresh water. The soaking time often depends on the size of the sample.

After soaking, the article is typically dried in an oven to remove the water. For example, the article can be dried by heating in an oven set at a temperature equal to at least 80° C., at least 90° C., or at least 100° C. For example, the temperature can be in a range of 80° C. to 150° C., 90° C. to 150° C., or 90° C. to 125° C. for at least 30 minutes, at least 60 minutes, or at least 120 minutes. After the optional soaking step, the dried article is usually sintered to a density equal to at least 95 percent of the theoretical density. Conditions are selected to avoid and/or minimize crystallization of silica. The presence of crystalline silica can decrease translucency, result in the formation of cracks, and result in warpage or distortion of the shape. The temperature is often raised up to 1200° C., up to 1175° C., up to 1150° C., up to 1125° C., up to 1100° C., up to 1075° C., up to 1050° C., or up to 1025° C. The rate of heating can typically be quite rapid such as at least 100° C./hour, at least 200° C./hour, at least 400° C./hour, or at least 600° C./hour. The temperature can be held for any desired time to produce sintered articles having the desired density. In some embodiments, the temperature is held for at least 1 hour, at least 2 hours, or at least 4 hours. The temperature can be held for 24 hours or even longer, if desired. The density of the dried article increases during the sintering step and the porosity is substantially reduced. The sintering can occur under atmospheric conditions (no special environmental conditions are required). Advantageously, sintering occurs at no greater than 1200° C. This allows the use of less expensive furnaces.

In many embodiments, the sintered article has a density that is at least 99 percent of the theoretical value. For example, the density can be at least 99.2 percent, at least 99.5 percent, at least 99.6 percent, at least 99.7 percent, at least 99.8 percent, at least 99.9 percent, or at least 99.95 percent or even at least 99.99 percent of the theoretical density. As the density approaches the theoretical density, the translucency or transparency of the sintered articles tends to improve. Sintered articles having a density that is at least 99 percent of the theoretical density often appear translucent or transparent to the human eye.

The sintered article usually contains amorphous silica. At least 90 weight percent, at least 92 weight percent, at least 95 weight percent, at least 96 weight percent, at least 97 weight percent, at least 98 weight percent, at least 99 weight percent, at least 99.5 weight percent, at least 99.9 weight percent, or 100 weight percent of the silica is amorphous. The amorphous character allows the sintered article to appear translucent or transparent to the human eye. That is, crystalline material tends to decrease transmission of visible light through the sintered article.

The transmission, absorbance, and reflectance of light through the sintered article is often comparable to that of fused quartz in the visible range of the electromagnetic spectrum above 450 nanometers (e.g., in the range of 450 to 750 nanometers) and in the near infrared range of the electromagnetic spectrum above 750 nanometers (e.g., in the range of 750 to 1650 nanometers). Thus, the sintered articles can be used in many applications where fused quartz is used. The transmission is typically higher when smaller silica particles such as those having an average diameter close to 5 nanometers are used when near theoretical density is not achieved. Additionally, the transmission is typically improved by decreasing porosity (i.e., by sintering to a density closer to theoretical density).

The shape of the sintered article is typically identical to that of the shaped gel article. Compared to the shaped gel article, the sintered article has undergone isotropic size reduction (i.e., isotropic shrinkage). That is, the extent of shrinkage in one direction is within 5 percent, within 2 percent, within 1 percent, or within 0.5 percent of the shrinkage in the other two directions. Stated differently, a net shaped sintered article can be prepared from the shaped gel articles. The shaped gel articles can have complex features that can be retained in the sintered article but with smaller dimensions based on the extent of isotropic shrinkage. That is, net shaped sintered articles can be formed from the shaped gel articles.

The amount of isotropic linear shrinkage between the shaped gel article and the sintered article is often in a range of 30 to 80 percent or in a range of 45 to 55 percent. The amount of isotropic volume shrinkage is often in a range of 70 to 99 percent, 80 to 95 percent, or 85 to 95 percent. These large amounts of isotropic shrinkage result from the relatively low amount of silica particles (1 to 30 volume percent) included in the casting sol used to form the gel composition (shaped gel article). Conventional teaching has been that high volume fractions of the inorganic oxides are needed to obtain fully dense sintered articles. Surprisingly, gel compositions can be obtained from casting sols with a relatively low amount of the silica particles that are sufficiently strong to be removed from molds (even molds having intricate and complex shapes and surfaces), dried, heated to burnout organic matter, and sintered without cracking. It is also surprising that the shape of the sintered articles can match that of the shaped gel article and the mold cavity so well in spite of the large percent shrinkage. The large percent shrinkage can be an advantage for some applications. For example, it allows the manufacture of smaller parts than can be obtained using many other ceramic molding processes.

The isotropic shrinkage tends to lead to the formation of sintered articles that are typically free of cracks and that have a uniform density throughout. Any cracks that form are often associated with cracks that result from the removal of the shaped gel article from the mold cavity rather than cracks that form during formation of the aerogel or xerogel, during burnout of the organic material, or during the sintering process. In some embodiments, particularly for larger articles or for articles with complex features, it may be preferable to form an aerogel rather than a xerogel intermediate.

Sintered articles with any desired size and shape can be prepared. The longest dimension can be up to 1 centimeter, up to 2 centimeters, up to 5 centimeters, or up to 10 centimeters or even longer. The longest dimension can be at least 1 centimeter, at least 2 centimeters, at least 5 centimeters, at least 10 centimeters, at least 20 centimeters, at least 50 centimeters, or at least 100 centimeters.

The sintered articles can have smooth surfaces or surfaces that include various features. The features can have any desired shape, depth, width, length, and complexity. For example, the features can have a longest dimension less than 500 micrometers, less than 100 micrometers, less than 50 micrometers, less than 25 micrometers, less than 10 micrometers, less than 5 micrometers, less than 1 micrometer, or less than 0.5 micrometers. Stated differently, sintered articles having a complex surface or multiple complex surfaces can be formed from a shaped gel article that has undergone isotropic shrinkage.

The sintered articles are net shaped articles formed from the shaped gel articles, which are formed within a mold cavity. The sintered article can often be used without any further milling or processing because they so closely mimic the shape of the shaped gel article, which has the same shape as the mold cavity used in its formation.

The sintered articles are typically strong and translucent or transparent. These properties are the result, for example, of starting with a silica sol that contains colloidal silica particles that are non-associated. These properties are also the result of preparing a gel composition that is homogenous. That is, the density and composition of the gel composition are uniform throughout the shaped gel article. These properties are also the result of preparing a dried gel shaped article (either a xerogel or aerogel) that has small uniform pores throughout. These pores are removed by sintering to form the sintered article. The sintered articles can have a high theoretical density.

Various embodiments are provided that are a shaped gel article, a method of making a xerogel, a method of making an aerogel, a method of making a sintered article, or a sintered article.

Embodiment 1A is a shaped gel article that comprises a polymerized product of a casting sol, wherein the casting sol is positioned within a mold cavity during polymerization and wherein the shaped gel article retains both a size and a shape identical to the mold cavity (except in a region where the mold cavity was overfilled) when removed from the mold cavity. The casting sol contains (a) 2 to 65 weight percent surface modified silica particles, (b) 0 to 40 weight percent polymerizable material that does not contain a silyl group, (c) 0.01 to 5 weight percent radical initiator, and (d) 30 to 90 weight percent organic solvent medium, wherein each weight percent is based on the total weight of the casting sol. The surface modified silica particles include a reaction product of silica particles having an average particle size no greater than 100 nanometers and a surface modification composition comprising a silane surface modification agent having a radically polymerizable group, wherein the surface modified silica particles are 50 to 99 weight percent silica and wherein the casting sol contain no more than 50 weight percent silica. The polymerizable material, the radical initiator, and the surface modification composition are soluble in the organic solvent medium.

Embodiment 2A is the shaped gel article of embodiment 1A, wherein the casting sol comprises 1 to 30 volume percent, 2 to 20 volume percent, or 5 to 15 volume percent silica particles.

Embodiment 3A is the shaped gel article of embodiment 1A or 2A, wherein the casting sol comprises (a) 4 to 45 weight percent surface modified silica particles based on the total weight of the casting sol and wherein the casting sol contains no more than 38 weight percent silica, (b) 5 to 35 weight percent of the polymerizable material based on the total weight of the casting sol, (c) 0.01 to 5 weight percent radical initiator based on the total weight of the casting sol, and (d) 40 to 80 weight percent organic solvent medium based on the total weight of the casting sol.

Embodiment 4A is the shaped gel article of embodiment 3A, wherein the casting sol comprises no more than 23 volume percent silica particles.

Embodiment 5A is the shaped gel article of any one of embodiments 1A to 4A, wherein the casting sol comprises (a) 10 to 36 weight percent surface modified silica particles based on the total weight of the casting sol and wherein the casting sol contains no more than 28 weight percent silica, (b) 10 to 30 weight percent of the polymerizable material based on the total weight of the casting sol, (c) 0.01 to 5 weight percent radical initiator based on the total weight of the casting sol, and (d) 50 to 70 weight percent organic solvent medium based on the total weight of the casting sol.

Embodiment 6A is the shaped gel article of embodiment 5A, wherein the casting sol comprises no more than 17 volume percent silica particles.

Embodiment 7A is the shaped gel article of any one of embodiments 1A to 6A, wherein the silica particles having an average size (longest dimension) up to 90 nanometers, up to 80 nanometers, up to 70 nanometers, up to 60 nanometers, up to 50 nanometers, up to 40 nanometers, up to 30 nanometers, up to 20 nanometers, or up to 10 nanometers.

Embodiment 8A is the shaped gel article of any one of embodiments 1A to 7A, wherein the silica particles are amorphous.

Embodiment 9A is the shaped gel article of any one of embodiments 1A to 8A, wherein the silane surface modification agent with the radically polymerizable group is of Formula (I)

$$CH_2=CR^3-(CO)-R^4-Si(R^1)_x(R^2)_{3-x} \qquad (I)$$

where group $R^1$ is a non-hydrolyzable group, group $R^2$ is hydroxyl or a hydrolyzable group, the variable x is an integer equal to 0, 1, or 2, group $R^3$ is hydrogen or methyl, and group $R^4$ is an alkylene.

Embodiment 10A is the shaped gel article of embodiment 9A, wherein group $R^1$ is alkyl, aryl, or aralkyl and group $R^2$ is alkoxy, alkoxyalkoxy, acyloxy, aryloxy, or halo.

Embodiment 11A is the shaped gel article of any one of embodiments 1A to 8A, wherein the silane surface modification agent with the radically polymerizable group is of Formula (II)

$$CH_2=CH-R^7-Si(R^5)_x(R^6)_{3-x} \qquad (II)$$

where group $R^7$ is single bond, alkylene, arylene, or combination thereof, group $R^5$ is a non-hydrolyzable group, $R^6$ is hydroxyl or a hydrolyzable group, and the variable x is an integer equal to 0, 1, or 2.

Embodiment 12A is the shaped gel article of embodiment 11A wherein group $R^5$ is alkyl, aryl, or aralkyl and group $R^6$ is alkoxy, alkoxyalkoxy, acyloxy, aryloxy, or halo.

Embodiment 13A is the shaped gel article of any one of embodiments 1A to 8A, wherein the silane surface modification agent with the radically polymerizable group is of Formula (III)

$$HS-R^{10}-Si(R^9)_x(R^8)_{3-x} \qquad (III)$$

where group $R^{10}$ is an alkylene, group $R^9$ is a non-hydrolyzable group, group $R^8$ is hydroxyl or a hydrolyzable group, and the variable x is an integer equal to 0, 1, or 2.

Embodiment 14A is the shaped gel article of embodiment 13A, wherein group $R^9$ is alkyl, aryl, or aralkyl and group $R^8$ is alkoxy, alkoxyalkoxy, acyloxy, aryloxy, or halo.

Embodiment 15A is the shaped gel article of any one of embodiments 1A to 14A, wherein the surface modification agent comprises 50 to 100 weight percent of the silane modifier having a radically polymerizable group based on a total weight of the surface modification composition.

Embodiment 16A is the shaped gel article of any one of embodiments 1A to 15A, wherein at least 50 weight percent of the organic solvent medium comprises an organic solvent having a boiling point equal to at least 150° C.

Embodiment 17A is the shaped gel article of embodiment 16A, wherein at least 60 weight percent, at least 70 weight percent, at least 80 weight percent, or at least 90 weight percent of organic solvent medium comprises the organic solvent having a boiling point equal to at least 150° C.

Embodiment 18A is the shaped gel article of any one of embodiments 1A to 17A, wherein a weight ratio of organic solvent medium to polymerizable material is in a range of 1 to 10.

Embodiment 19A is the shaped gel article of any one of embodiments 1A to 18A, wherein the amount of polymerizable material in the casting sol is in a range of 1 to 40 weight percent, 5 to 40 weight percent, or 10 to 40 weight percent.

Embodiment 20A is the shaped gel article of any one of embodiments 1A to 19A, wherein the radical initiator is a photoinitiator.

Embodiment 21A is the shaped gel article of any one of embodiments 1A to 20A, wherein the casting sol is transparent or translucent.

Embodiment 22A is the shaped gel article of any one of embodiments 1A to 21A, wherein the shaped gel article is removable from the mold cavity without cracking.

Embodiment 23A is the shaped gel article of any one of embodiments 1A to 22A, wherein the mold cavity has at least one surface that can transmit actinic radiation in the visible region, ultraviolet region, or both of the electromagnetic spectrum.

Embodiment 1B is an aerogel comprising a product formed by removing by supercritical extraction the organic solvent medium from the shaped gel article of any one of embodiments 1A to 23A.

Embodiment 2B is the aerogel of embodiment 1B, wherein the aerogel is free of cracks.

Embodiment 3B is the aerogel of embodiment 1B or 2B, wherein the aerogel comprises 1 to 35 volume percent silica.

Embodiment 4B is the method of any one of embodiments 1B to 3B, wherein the aerogel has a BET specific surface area in a range of 20 m²/gram to 600 m²/gram.

Embodiment 1C is a method of making an aerogel. The method includes (a) providing a mold having a mold cavity and (b) positioning a casting sol within the mold cavity. The casting sol contains (1) 2 to 65 weight percent surface modified silica particles, (2) 0 to 40 weight percent polymerizable material that does not contain a silyl group, (3) 0.01 to 5 weight percent radical initiator, and (4) 30 to 90 weight percent organic solvent medium, wherein each weight percent is based on the total weight of the casting sol. The surface modified silica particles include a reaction product of silica particles having an average particle size no greater than 100 nanometers and a surface modification composition comprising a silane surface modification agent having a radically polymerizable group, wherein the surface modified silica particles are 50 to 99 weight percent silica and wherein the casting sol contain no more than 50 weight percent silica. The polymerizable material, the radical initiator, and the surface modification composition are soluble in the organic solvent medium. The method further comprises (c) polymerizing the casting sol to form a shaped gel article that is in contact with the mold cavity, (d) removing the organic solvent medium from the shaped gel article by supercritical extraction to form the aerogel, wherein the aerogel has a shape identical to the mold cavity (except in regions where the mold cavity was overfilled) and to the shaped gel article but reduced in size proportional to an amount of isotropic shrinkage, and (e) removing either the shaped gel article or the aerogel from the mold cavity.

Embodiment 2C is the method of embodiment 1C, wherein the casting sol comprises 1 to 30 volume percent, 2 to 20 volume percent, or 5 to 15 volume percent silica particles.

Embodiment 3C is the method of embodiment 1C or 2C, wherein the casting sol comprises (a) 4 to 45 weight percent surface modified silica particles based on the total weight of the casting sol and wherein the casting sol contains no more than 38 weight percent silica, (b) 5 to 35 weight percent of the polymerizable material based on the total weight of the casting sol, (c) 0.01 to 5 weight percent radical initiator based on the total weight of the casting sol, and (d) 40 to 80 weight percent organic solvent medium based on the total weight of the casting sol.

Embodiment 4C is the method of embodiment 3C, wherein the casting sol comprises no more than 23 volume percent silica particles.

Embodiment 5C is the method of any one of embodiments 1C to 4C, wherein the casting sol comprises (a) 10 to 36 weight percent surface modified silica particles based on the total weight of the casting sol and wherein the casting sol contains no more than 28 weight percent silica, (b) 10 to 30 weight percent of the polymerizable material based on the total weight of the casting sol, (c) 0.01 to 5 weight percent radical initiator based on the total weight of the casting sol, and (d) 50 to 70 weight percent organic solvent medium based on the total weight of the casting sol.

Embodiment 6C is the method of embodiment 5C, wherein the casting sol comprises no more than 17 volume percent silica particles.

Embodiment 7C is the method of any one of embodiments 1C to 6C, wherein the silica particles having an average size (longest dimension) up to 90 nanometers, up to 80 nanometers, up to 70 nanometers, up to 60 nanometers, up to 50 nanometers, up to 40 nanometers, up to 30 nanometers, up to 20 nanometers, or up to 10 nanometers.

Embodiment 8C is the method of any one of embodiments 1C to 7C, wherein the silica particles are amorphous.

Embodiment 9C is the method of any one of embodiments 1C to 8C, wherein the silane surface modification agent with the radically polymerizable group is of Formula (I)

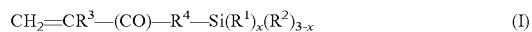
$$CH_2=CR^3-(CO)-R^4-Si(R^1)_x(R^2)_{3-x} \qquad (I)$$

where group $R^1$ is a non-hydrolyzable group, group $R^2$ is hydroxyl or a hydrolyzable group, the variable x is an integer equal to 0, 1, or 2, group $R^3$ is hydrogen or methyl, and group $R^4$ is an alkylene.

Embodiment 10C is the method of embodiment 9C, wherein group $R^1$ is alkyl, aryl, or aralkyl and group $R^2$ is alkoxy, alkoxyalkoxy, acyloxy, aryloxy, or halo.

Embodiment 11C is the method of any one of embodiments 1C to 8C, wherein the silane surface modification agent with the radically polymerizable group is of Formula (II)

$$CH_2=CH-R^7-Si(R^5)_x(R^6)_{3-x} \qquad (II)$$

where group $R^7$ is single bond, alkylene, arylene, or combination thereof, group $R^5$ is a non-hydrolyzable group, $R^6$ is hydroxyl or a hydrolyzable group, and the variable x is an integer equal to 0, 1, or 2.

Embodiment 12C is the method of embodiment 11C wherein group $R^5$ is alkyl, aryl, or aralkyl and group $R^6$ is alkoxy, alkoxyalkoxy, acyloxy, aryloxy, or halo.

Embodiment 13C is the method of any one of embodiments 1C to 8C, wherein the silane surface modification agent with the radically polymerizable group is of Formula (III)

$$HS-R^{10}-Si(R^9)_x(R^8)_{3-x} \qquad (III)$$

where group $R^{10}$ is an alkylene, group $R^9$ is a non-hydrolyzable group, group $R^8$ is hydroxyl or a hydrolyzable group, and the variable x is an integer equal to 0, 1, or 2.

Embodiment 14C is the method of embodiment 13C, wherein group $R^9$ is alkyl, aryl, or aralkyl and group $R^8$ is alkoxy, alkoxyalkoxy, acyloxy, aryloxy, or halo.

Embodiment 15C is the method of any one of embodiments 1C to 14C, wherein the surface modification agent comprises 50 to 100 weight percent of the silane modifier having a radically polymerizable group based on a total weight of the surface modification composition.

Embodiment 16C is the method of any one of embodiments 1C to 15C, wherein at least 50 weight percent of the organic solvent medium comprises an organic solvent having a boiling point equal to at least 150° C.

Embodiment 17C is the method of embodiment 16C, wherein at least 60 weight percent, at least 70 weight percent, at least 80 weight percent, or at least 90 weight percent of organic solvent medium comprises the organic solvent having a boiling point equal to at least 150° C.

Embodiment 18C is the method of any one of embodiments 1C to 17C, wherein a weight ratio of organic solvent medium to polymerizable material is in a range of 1 to 10.

Embodiment 19C is the method of any one of embodiments 1C to 18C, wherein the amount of polymerizable material in the casting sol is in a range of 1 to 40 weight percent, 5 to 40 weight percent, or 10 to 40 weight percent.

Embodiment 20C is the method of any one of embodiments 1C to 19C, wherein the radical initiator is a photoinitiator.

Embodiment 21C is the method of any one of embodiments 1C to 20C, wherein the casting sol is transparent or translucent.

Embodiment 22C is the method of any one of embodiments 1C to 21C, wherein the shaped gel article is removable from the mold cavity without cracking.

Embodiment 23C is the method of any one of embodiments 1C to 22C, wherein the mold cavity has at least one surface that can transmit actinic radiation in the visible region, ultraviolet region, or both of the electromagnetic spectrum.

Embodiment 24C is the method of any one of embodiments 1C to 22C, wherein the aerogel is free of cracks.

Embodiment 25C is the method of any one of embodiments 1C to 24C, wherein the aerogel comprises 1 to 35 volume percent silica.

Embodiment 26C is the method of any one of embodiments 1C to 25C, wherein the aerogel has a BET specific surface area in a range of 20 $m^2$/gram to 600 $m^2$/gram.

Embodiment 1D is a method of making a sintered article. The method includes (a) providing a mold having a mold cavity, (b) positioning a casting sol, which is the same as described above, within the mold cavity. The casting sol contains (1) 2 to 65 weight percent surface modified silica particles, (2) 0 to 40 weight percent polymerizable material that does not contain a silyl group, (3) 0.01 to 5 weight percent radical initiator, and (4) 30 to 90 weight percent organic solvent medium, wherein each weight percent is based on the total weight of the casting sol. The surface modified silica particles include a reaction product of silica particles having an average particle size no greater than 100 nanometers and a surface modification composition comprising a silane surface modification agent having a radically polymerizable group, wherein the surface modified silica particles are 50 to 99 weight percent silica and wherein the casting sol contain no more than 50 weight percent silica. The polymerizable material, the radical initiator, and the surface modification composition are soluble in the organic solvent medium. The method further comprises (c) polymerizing the casting sol to form a shaped gel article that is in contact with the mold cavity, (d) forming a dried shaped gel article by removing the organic solvent medium, (e) removing either the shaped gel article or the dried shaped gel article from the mold cavity, and (f) heating the dried shaped gel article to form a sintered article. The sintered article has a shape identical to the mold cavity (except in regions where the mold cavity was overfilled) and to the shaped gel article but reduced in size proportional to an amount of isotropic shrinkage.

Embodiment 2D is the method of embodiment 1D, wherein the casting sol comprises 1 to 30 volume percent, 2 to 20 volume percent, or 5 to 15 volume percent silica particles.

Embodiment 3D is the method of embodiment 1D or 2D, wherein the casting sol comprises (a) 4 to 45 weight percent surface modified silica particles based on the total weight of the casting sol and wherein the casting sol contains no more than 38 weight percent silica, (b) 5 to 35 weight percent of the polymerizable material based on the total weight of the casting sol, (c) 0.01 to 5 weight percent radical initiator based on the total weight of the casting sol, and (d) 40 to 80 weight percent organic solvent medium based on the total weight of the casting sol.

Embodiment 4D is the method of embodiment 3D, wherein the casting sol comprises no more than 23 volume percent silica particles.

Embodiment 5D is the method of any one of embodiments 1D to 4D, wherein the casting sol comprises (a) 10 to 36 weight percent surface modified silica particles based on the total weight of the casting sol and wherein the casting sol contains no more than 28 weight percent silica, (b) 10 to 30 weight percent of the polymerizable material based on the total weight of the casting sol, (c) 0.01 to 5 weight percent radical initiator based on the total weight of the casting sol, and (d) 50 to 70 weight percent organic solvent medium based on the total weight of the casting sol.

Embodiment 6D is the method of embodiment 5D, wherein the casting sol comprises no more than 17 volume percent silica particles.

Embodiment 7D is the method of any one of embodiments 1D to 6D, wherein the silica particles having an average size (longest dimension) up to 90 nanometers, up to 80 nanometers, up to 70 nanometers, up to 60 nanometers, up to 50 nanometers, up to 40 nanometers, up to 30 nanometers, up to 20 nanometers, or up to 10 nanometers.

Embodiment 8D is the method of any one of embodiments 1D to 7D, wherein the silica particles are amorphous.

Embodiment 9D is the method of any one of embodiments 1D to 8D, wherein the silane surface modification agent with the radically polymerizable group is of Formula (I)

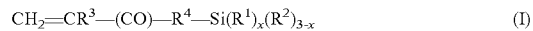

$$CH_2=CR^3-(CO)-R^4-Si(R^1)_x(R^2)_{3-x} \qquad (I)$$

where group $R^1$ is a non-hydrolyzable group, group $R^2$ is hydroxyl or a hydrolyzable group, the variable x is an integer equal to 0, 1, or 2, group $R^3$ is hydrogen or methyl, and group $R^4$ is an alkylene.

Embodiment 10D is the method of embodiment 9D, wherein group $R^1$ is alkyl, aryl, or aralkyl and group $R^2$ is alkoxy, alkoxyalkoxy, acyloxy, aryloxy, or halo.

Embodiment 11D is the method of any one of embodiments 1D to 8D, wherein the silane surface modification agent with the radically polymerizable group is of Formula (II)

$$CH_2=CH-R^7-Si(R^5)_x(R^6)_{3-x} \qquad (II)$$

where group $R^7$ is single bond, alkylene, arylene, or combination thereof, group $R^5$ is a non-hydrolyzable group, $R^6$ is hydroxyl or a hydrolyzable group, and the variable x is an integer equal to 0, 1, or 2.

Embodiment 12D is the method of embodiment 11D wherein group $R^5$ is alkyl, aryl, or aralkyl and group $R^6$ is alkoxy, alkoxyalkoxy, acyloxy, aryloxy, or halo.

Embodiment 13D is the method of any one of embodiments 1D to 8D, wherein the silane surface modification agent with the radically polymerizable group is of Formula (III)

$$HS-R^{10}-Si(R^9)_x(R^8)_{3-x} \qquad (III)$$

where group $R^{10}$ is an alkylene, group $R^9$ is a non-hydrolyzable group, group $R^8$ is hydroxyl or a hydrolyzable group, and the variable x is an integer equal to 0, 1, or 2.

Embodiment 14D is the method of embodiment 13D, wherein group $R^9$ is alkyl, aryl, or aralkyl and group $R^8$ is alkoxy, alkoxyalkoxy, acyloxy, aryloxy, or halo.

Embodiment 15D is the method of any one of embodiments 1D to 14D, wherein the surface modification agent comprises 50 to 100 weight percent of the silane modifier having a radically polymerizable group based on a total weight of the surface modification composition.

Embodiment 16D is the method of any one of embodiments 1D to 15D, wherein at least 50 weight percent of the organic solvent medium comprises an organic solvent having a boiling point equal to at least 150° C.

Embodiment 17D is the method of embodiment 16D, wherein at least 60 weight percent, at least 70 weight percent, at least 80 weight percent, or at least 90 weight percent of organic solvent medium comprises the organic solvent having a boiling point equal to at least 150° C.

Embodiment 18D is the method of any one of embodiments 1D to 17D, wherein a weight ratio of organic solvent medium to polymerizable material is in a range of 1 to 10.

Embodiment 19D is the method of any one of embodiments 1D to 18D, wherein the amount of polymerizable material in the casting sol is in a range of 1 to 40 weight percent, 5 to 40 weight percent, or 10 to 40 weight percent.

Embodiment 20D is the method of any one of embodiments 1D to 19D, wherein the radical initiator is a photoinitiator.

Embodiment 21D is the method of any one of embodiments 1D to 20D, wherein the casting sol is transparent or translucent.

Embodiment 22D is the method of any one of embodiments 1D to 21D, wherein the shaped gel article is removable from the mold cavity without cracking.

Embodiment 23D is the method of any one of embodiments 1D to 22D, wherein the mold cavity has at least one surface that can transmit actinic radiation in the visible region, ultraviolet region, or both of the electromagnetic spectrum.

Embodiment 24D is the method of any one of embodiments 1D to 22D, wherein the aerogel is free of cracks.

Embodiment 25D is the method of any one of embodiments 1D to 24D, wherein the aerogel comprises 1 to 35 volume percent silica.

Embodiment 26D is the method of any one of embodiments 1D to 25D, wherein the aerogel has a BET specific surface area in a range of 20 $m^2$/gram to 600 $m^2$/gram.

Embodiment 27D is the method of any one of embodiments 1D to 26D, wherein the sintered article is free of cracks.

Embodiment 28D is the method of any one of embodiments 1D to 27D, wherein the sintered article has a density in a range of 40 to 93 percent of theoretical density.

Embodiment 29D is the method of any one of embodiments 1D to 28D, wherein the sintered article has a density greater than 95 percent of the theoretical density and wherein the sintered body is transparent to the human eye.

Embodiment 30D is the method of any one of embodiments 1D to 29D, wherein the sintered article has a density greater than 95 percent of the theoretical density and wherein heating the dried shaped gel article to form the sintered article is in a range of 1025° C. to 1200° C.

Embodiment 31D is the method of any one of embodiments 1D to 30D, wherein the silica in the sintered article is at least 90 weight percent amorphous silica.

Embodiment 1E is a sintered article that is prepared using any one of embodiments 1D to 26D. Embodiment 2E is the sintered article of embodiment 1E, wherein the sintered article is free of cracks.

Embodiment 3E is the sintered article of embodiment 1E or 2E, wherein the sintered article has a density in a range of 40 to 93 percent of theoretical density.

Embodiment 4E is the sintered article of any one of embodiments 1E or 2E, wherein the sintered article has a density greater than 95 percent of the theoretical density and wherein the sintered body is transparent or translucent to the human eye.

Embodiments 5E is the sintered article of any one of embodiments 1E or 2E, wherein the sintered article has a density greater than 95 percent of the theoretical density and wherein heating the dried shaped gel article to form the sintered article is in a range of 1025° C. to 1200° C.

Embodiment 6E is the sintered article of any one of embodiments 1E to 5E, wherein the silica in the sintered article is at least 90 weight percent amorphous silica.

EXAMPLES

Materials

| Material name or abbreviation | Description |
|---|---|
| NALCO 2326 | Colloidal silica nanoparticles, nominally 16 weight percent, 5 nm particle size, obtained under trade designation "NALCO 2326" from Nalco Company, Naperville, IL |
| NALCO 2327 | Colloidal silica nanoparticles, 41 weight percent, 20 nm particle size, obtained under trade designation "NALCO 2327" from Nalco Company, Naperville, IL |
| NALCO 2329K | Colloidal silica nanoparticles, nominally 41 weight percent, 75 nm particle size, obtained under trade designation "NALCO 2329K" from Nalco Company, Naperville, IL |
| 1-Methoxy-2-propanol | An alcohol obtained from Aldrich Chemical Company, Milwaukee, WI |
| Diethylene glycol monoethyl ether | Diethylene glycol monoethyl ether obtained from Alfa Aesar, Ward Hill, MA |
| Ethanol | KOPTEC 200 proof ethanol obtained from DLI, King of Prussia, PA |
| "IRGACURE 819" | UV/Vis Initiator available from BASF Corporation under trade designation "IRGACURE 819", Vandalia, IL, USA |
| "SR506" | Isobornyl acrylate obtained from Sartomer Company Inc., Exton, PA, USA, under the trade designation "SR506A" |
| "SR238" | 1,6-Hexanediol diacrylate obtained from Sartomer Company Inc., Exton, PA, under the trade designation "SR238B" |
| "CN975" | Hexafunctional urethane acrylate obtained from Sartomer Company Inc., Exton, PA, under the trade designation "CN975" |
| "SR351" | Trimethylolpropane triacrylate obtained from Sartomer Company Inc., Exton, PA, under the trade designation "SR351" |
| HEAA | N-(2-Hydroxyethyl)acrylamide obtained from Tokyo Chemical Industry Co., LTD., Tokyo, Japan |
| "Octyl acrylate" | Octyl acrylate, prepared as described in Example 4 of PCT Patent Publication No. W014151179 |

| Material name or abbreviation | Description |
|---|---|
| A1230 | Silane surface modifier available under trade designation "SILQUEST A1230" from OSi Specialties - Crompton Corporation, South Charleston, WV |
| 4-Hydroxy-TEMPO | 4-Hydroxy-TEMPO obtained from Aldrich Chemical Company, Milwaukee, WI |
| 3-(methacryloyloxy)-propyltrimethoxysilane | 3-(methacryloyloxy)propyltrimethoxysilane obtained from Alfa Aesar, Ward Hill, MA |

Methods

Method for Measuring Oxide Content

The oxide (silica) content of exemplary samples was measured via thermal gravimetric analysis (obtained under the trade designation "TGA Q500" from TA Instruments, New Castle, Del.). The sample (about 50 mg) was loaded into the TGA. The temperature was ramped at a rate of 20° C. per minute to 200° C., held at 200° C. (isotherm) for 20 minutes, and ramped again at a rate of 20° C. per minute to 900° C. The oxide content of the sample was calculated as the weight of the final residue after heating to 900° C. divided by the initial weight of sample, expressed as a percentage. The oxide content of the surface modified silica particles was calculated as the weight of the final residue after heating to 900° C. divided by the sample weight after the isotherm at 200° C., expressed as a percentage.

Method for Determining Viscosity

The viscosity was measured using a Brookfield Cone and Plate Viscometer (Model Number DV II+) available from Brookfield Engineering Laboratories, Middleboro, Mass., USA). The measurements were obtained using spindle CP-42. The instrument was calibrated with Brookfield Fluid I, which gave a measured viscosity of 5.71 centipoises (cp) at 192 1/sec (50 RPM) and temperature of 17.6° C. The compositions were placed in the measurement chamber. Measurements were made at 3-4 different RPM (revolutions per minute). The measured viscosity was not affected much by the shear rate. The shear rate was calculated as 3.84 multiplied by the RPM. The viscosity values reported are for the minimum shear rate where the torque was in range.

Method for Determining Light Transmission (percent T)

The light transmission of exemplary casting sols without photoinitiator was measured using a Perkin Elmer Lambda 35 UV/VIS Spectrometer (available from Perkin Elmer Inc. Waltham, Mass.). The transmission was measured in a 10 mm quartz cuvette, with a water-filled 10 mm quartz cuvette as the reference.

Method for Measuring Refractive Index

The refractive index was measured with an Atago DR-A1 Abe refractometer (available from Atago Co. LTD. Japan).

Method for Measuring Optical Properties

The exemplary articles were measured as free standing films in the front sample position (Total Hemispherical Transmittance, THT) and again in the rear sample position (Total Hemispherical Reflectance, THR). Measurements were made using a Perkin Elmer Lambda 1050 spectrophotometer fitted with a PELA-1002 integrating sphere accessory (available from Perkin Elmer Inc. Waltham, Mass.). This sphere was 150 mm (6 inches) in diameter and complied with ASTM methods E903, D1003, E308, et al. as published in "ASTM Standards on Color and Appearance Measurement", Third Edition, ASTM, 1991.

Lambda 1050 Experimental Parameters were set as follows:

| | |
|---|---|
| UV-Vis Integration: | 0.56 sec/pt |
| Data Interval: | 2 nm |
| Slit Width: | 5 nm |
| Mode: | percent Transmission; percent Reflectance Data was recorded from 1700 nm to 200 nm. |

Method for Measuring Archimedes' Density

The density of a sintered article was measured by the Archimedes technique. The measurements were made on a precision balance (identified as "AE 160" obtained from Mettler Instrument Corp., Hightstown, N.J.) using a density determination kit (identified as "ME 33360" obtained from Mettler Instrument Corp., Hightstown, N.J.). In this procedure, the article was first weighed in air (A), then immersed in water and weighed (B). The water was distilled and deionized. One drop of a wetting agent (obtained under trade designation "TERGITOL-TMN-6" from Dow Chemical Co., Danbury, Conn.) was added to 250 mL of water. The density was calculated using the formula $\rho=(A/(A-B))*\rho_0$, where $p_o$ is the density of water. The relative density ($p_{rel}$) was calculated by reference to the theoretical density ($\rho_t$) of the material, $\rho_{rel}=(\rho/\rho_t)*100$.

Method for X-Ray Diffraction A flat silica article was placed in a Rigaku 600 X-ray diffractometer (obtained from Rigaku Americas, The Woodland, Tex.). A scan from 3 degrees to 80 degrees was performed at 1.5 degrees/min with a step size of 0.1 degree, a filament voltage of 40 kV, and a filament current of 15 mA.

Method for Filtration of Casting Sol

The casting sol was filtered using a 20 mL syringe and a 1.0 micron glass fiber membrane filter (ACRODISC 25 mm syringe filter, obtained from Pall Life Sciences, Ann Arbor, Mich.).

Method for Curing Casting Sol—Procedure A

A casting sol placed in the desired mold was positioned under an LED array to cure (polymerize). The diodes were spaced 8 mm apart in a 10×10 array. The diodes had a wavelength of 450 nm. The diodes were 17 mm above the top of the mold construction. The casting sol was irradiated for the desired amount of time.

Method for Curing Casting Sol—Procedure B

A casting sol placed in the desired mold was positioned in an 8-bulb light curing chamber (i.e., light box) to cure (polymerize). The 8-bulb light box had inside dimensions of 500.3 cm×304.8 cm×247.65 cm and contained two banks of four T8 florescent bulbs. Each bulb was 457 mm long, 15 watt (Coral Sun Actinic Blue 420 item # CL-18 available from Zoo Med Laboratories, Inc., San Luis Obispo, Calif., USA). The bulbs had peak emission at 420 nm. The bulbs were positioned side by side, 50.8 mm apart (center to center). The casting sol was positioned on a glass plate between the two light banks (the plate was 190.5 mm below the top light bank and 76.2 mm above the bottom bank) and irradiated for the desired amount of time.

Method for Supercritical Extraction of Gels

The supercritical extraction was performed using a 10-L laboratory-scale supercritical fluid extractor unit designed by and obtained from Thar Process, Inc., Pittsburgh, Pa. The $SiO_2$-based shaped gels were mounted in a stainless steel rack. Sufficient ethanol was added to the 10-L extractor vessel to cover the gels (about 3500-6500 mL). The stainless steel rack containing the wet $SiO_2$-based gels was loaded into the 10-L extractor so that the wet gels were completely immersed in the liquid ethanol inside the jacketed extractor vessel, which was heated and maintained at 60° C. After the extractor vessel lid was sealed in place, liquid carbon dioxide was pumped by a chilled piston pump (set point: −8.0° C.) through a heat exchanger to heat the $CO_2$ to 60° C. and into the 10-L extractor vessel until an internal pressure of 13.3 MPa was reached. At these conditions, carbon dioxide is supercritical. Once the extractor operating conditions of 13.3 MPa and 60° C. were met, a needle valve regulated the pressure inside the extractor vessel by opening and closing to allow the extractor effluent to pass through a heat exchanger to cool the effluent to 30° C. and into a 5-L cyclone separator vessel that was maintained at room temperature and a pressure less than 5.5 MPa. Supercritical carbon dioxide ($scCO_2$) was pumped continuously through the 10-L extractor vessel for 8 hours from the time the operating conditions were achieved. After the 8-hour extraction cycle, the extractor vessel was slowly vented into the cyclone separator over 16 hours from 13.3 MPa to atmospheric pressure at 60° C. before the lid was opened and the stainless steel rack containing the dried aerogels was removed. The dry aerogels were removed from their stainless steel rack and weighed.

Method for Sintering—I

A dried gel article was placed in an alumina crucible. The crucible was covered with an alumina plate. Both the crucible and the alumina plate were cleaned with ethanol and dried with a flow of nitrogen prior to use. The gel article was then heated in air according to the following schedule:
1—Heat from 20° C. to 220° C. at 18° C./hour rate,
2—Heat from 220° C. to 244° C. at 1° C./hour rate,
3—Heat from 244° C. to 400° C. at 6° C./hour rate,
4—Heat from 400° C. to 1020° C. at 60° C./hour rate,
5—Cool from 1020° C. to 20° C. at 120° C./hour rate.

Method for Sintering—II

A gel article previously heated according to the Method for Sintering—I was placed in an alumina crucible. The crucible was covered with an alumina plate. Both the crucible and the alumina plate were cleaned with ethanol and dried with a flow of nitrogen prior to use. The gel article was then sintered in air according to the following schedule:
1—Heat from 20° C. to 1000° C. at 600° C./hour rate,
2—Heat from 1000° C. to 1105° C. at 120° C./hour rate,
3—Hold at 1105° C. for 2 hours,
4—Cool down from 1105° C. to 20° C. at 600° C./hour rate.

Method for Preventing Silica Crystallization

Crystallization of sintered silica articles was prevented by always conducting experiments in a clean environment, and rinsing and blow drying mold surfaces and containers prior to use. Furthermore, not allowing the casting sol or gel to come in contact with materials that could cause the nucleation of crystals during sintering was essential for obtaining an amorphous sintered silica article. These guidelines were followed for the preparation and processing of all exemplary casting sols, gel articles, and sintered articles.

Preparative Example 1

Preparation of N-(3-triethoxysilylpropyl) methoxyethoxyethyl carbamate (PEG2TES)

PEG2TES was prepared as follows: A 250 ml round-bottomed flask equipped with a magnetic stir bar was charged with diethylene glycol methyl ether (35 grams) and methyl ethyl ketone (77 grams) followed by rotary evaporation of a substantial portion of the solvent mix to remove water. 3-(Triethoxysilyl)propylisocyanate (68.60 grams) was charged to the flask. Dibutyltin dilaurate (approx. 3 mg) was added and the mixture stirred. The reaction proceeded with a mild exotherm. The reaction was run for approximately 16 hours at which time infrared spectroscopy showed no isocyanate. The remainder of the solvent and alcohol were removed via rotary evaporation at 90° C. to yield 104.46 grams of PEG2TES as a somewhat viscous fluid.

Example 1

Methoxy propanol (450.00 grams), 4-hydroxy-TEMPO (5 drops of a 5 weight percent solution in water), and 3-(trimethoxysilyl)propyl methacrylate (28.12 grams) were combined in a 1-L beaker. NALCO 2326 (400.00 grams, 16.20 weight percent solids) was charged to a jar. The contents of the beaker were added to the jar while stirring. This procedure was repeated five times. Each jar was sealed with a lid and placed in an oven at 85° C. for 16 hours. The contents of the five jars and diethylene glycol monoethyl ether (290.63 grams) were charged to a 12-L flask and concentrated via rotary evaporation. The mixture was passed through a 1 micron filter as described above. The resulting mixture contained 44.84 weight percent oxide.

10.66 grams of the above mixture were charged to a vial and combined with N-(2-hydroxyethyl)acrylamide (0.66 gram), octyl acrylate (1.38 grams), trimethylolpropane triacrylate ("SR351") (1.22 grams), a hexafunctional urethane arylate ("CN975") (0.61 gram), and diethylene glycol monoethyl ether (9.27 grams). IRGACURE 819 (0.36 gram) was added to the vial and dissolved in the mixture to prepare the casting sol. The casting sol was passed through a 1 micron filter as described above in Method for Filtration of Casting Sol. A similar casting sol was measured to have a viscosity of 19.5 centipoises (cp) at 15.36 1/sec. The casting sol contained 19.79 weight percent oxide (approximately 10.1 volume percent) and 58.87 weight percent solvent.

The above casting sol was charged to a mold cavity. The mold cavity was formed by clamping together a structured metal bottom, a polytetrafluomethylene ring (inner diameter of 25 mm×outer diameter of 29 mm×thickness of 2.26 mm), and a 3.3 mm thick acrylic plate. The acrylic plate contained two port holes that acted as the casting sol inlet and air vent. This eliminated bubble entrapment during casting sol charging. Once the cavity was filled, the construction was cured as described above in Method for Curing Casting Sol—Procedure A. Curing time was 23 seconds. This process was repeated 10 times to make a set of 10 shaped gel articles.

The resulting shaped gels replicated the mold features, felt dry, and were robust to handling when removed from the mold. These shaped gels were then dried using the Method for Supercritical Extraction of Gels described above to form shaped aerogels. The shaped aerogels were crack-free after drying (except for one sample that was damaged during molding). These shaped aerogels were heated according to the Method for Sintering—I described above. The shaped articles remained crack-free after this heating step. These shaped articles were sintered according to the Method for Sintering—II described above. The resulting sintered amorphous silica articles were crack-free, transparent and replicated the mold features precisely.

A study of the dimensional tolerances of these 10 shaped sintered articles was done as follows. The diagonal measurements of 8.3 mm article and 18 mm mold, considered "macro" features, were taken using a Nikon Measuring Microscope MM-60 (obtained from Nikon Metrology, Inc., Brighton, Mich.) coupled with a Metronics Quadra Check 200 Digital Readout (obtained from Vision Engineering Inc., Orange, Calif.). FIG. 1 shows the diagonal measurements (H and I) used for shrinkage determinations.

The diagonal measurements of macro features on the Example 1 silica articles (also referred to as sintered articles or sintered silica articles) and the mold were conducted by placing them on the microscope stage. Using the 50× objective, the first reference point was found and the digital readout was zeroed. The stage was moved to the next reference point for the measurement and the length was recorded from the digital readout. This was repeated for all other measurements.

The average mold length, article length and diagonal shrinkage $(-((Length_{article}-Length_{mold})/Length_{mold})*100)$ values in the (H) and (I) dimensions of the 10 Example 1 sintered silica articles are given in Table 1, below.

TABLE 1

| Diagonal Dimension | Mold Length (mm) | Article Length (mm) | Shrinkage (percent) | Standard Deviation |
|---|---|---|---|---|
| H | 18.187 | 8.362 | 54.02 | 0.04 |
| I | 18.185 | 8.362 | 54.02 | 0.06 |

Surface micro features were also measured on these 10 shaped sintered articles. Features less than 1 mm were considered "micro" features. The micro features were measured as an indicator of the material and process capability to replicate the micro-features of the mold surface. Tooling marks running parallel to the length of the V-grooves were in the sub-micron size (ranged from 0.2 µm to 0.3 µm).

Figure 2:
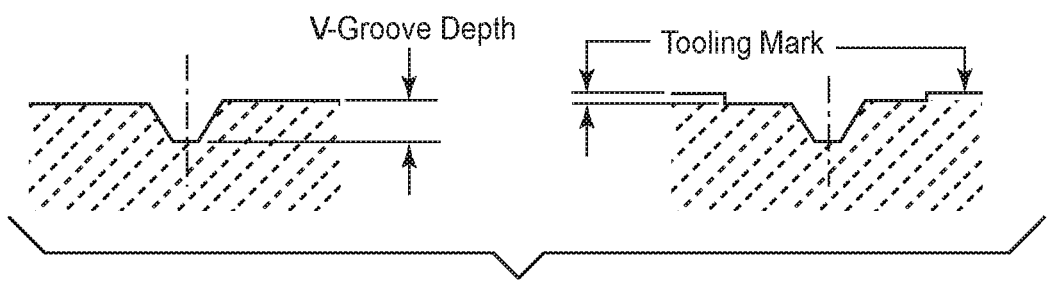
FIG. 2 shows two schematic diagrams indicating where the dimensions of the micro-features of an article were measured.

FIG. 2 shows two schematic diagrams indicating where the dimensions of the micro-features of an article were measured. Surface micro-features were characterized using a Keyence VK-X110 Shape Measurement Laser Microscope (obtained from Keyence Corporation of America, Itasca, Ill., USA).

Figure 3:
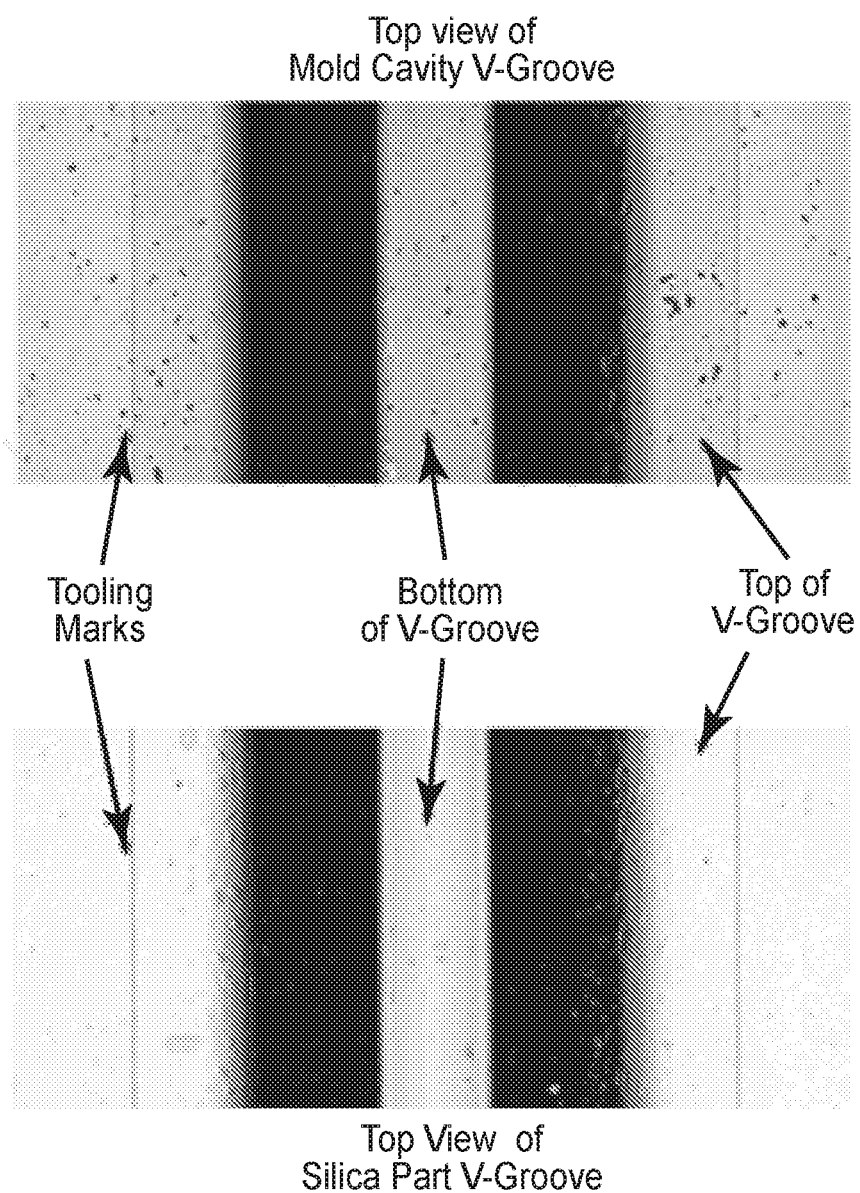
FIG. 3 shows photographs of an example mold and an example sintered article formed using the mold. The scale of the photographs are not the same.

FIG. 3 shows photographs of Example 1 mold and the resulting shaped sintered article prepared using the mold. The two photographs taken for FIG. 3 were not at the same scale. Both the sub millimeter V-groove geometry and the sub-micron tooling marks are well replicated. Precise replication of the mold surface, including tool path marks (very small tooling marks created from the mold cavity tool path) were confirmed by observing the tool and the silica articles. The tooling path of the Example 1 silica article was 0.00002 mm.

The dimensional analysis of Example 1 articles indicated that the materials and process of the invention could yield net shape parts with macro geometries greater than 1 mm as well as micro geometries (less than 1 mm) eliminating the need for any post-grinding finishing.

Example 2

Methoxy propanol (450.00 grams), 4-hydroxy-TEMPO (5 drops of a 5 weight percent solution in water), and 3-(trimethoxysilyl)propyl methacrylate (28.12 grams) were combined in a 1-L beaker. NALCO 2326 (400.00 grams, 16.20 weight percent solids) was charged to a jar. The contents of the beaker were added to the jar while stirring. This procedure was repeated four more times. Each jar was sealed with a lid and placed in an oven at 85° C. for 16 hours. The contents of the five jars and diethylene glycol monoethyl ether (290.63 grams) were charged to a 12-L flask and concentrated via rotary evaporation. The mixture was passed through a 1 micron filter as described above. The resulting mixture contained 44.84 weight percent oxide.

10.00 grams of the above mixture were charged to a vial and combined with N-(2-hydroxyethyl)acrylamide (0.67 gram), octyl acrylate (1.28 grams), 1,6-hexanediol diacrylate ("SR238") (0.84 gram), trimethylolpropane triacrylate ("SR351") (0.13 gram), a hexafunctional urethane acrylate ("CN975") (0.85 gram), and diethylene glycol monoethyl ether (8.39 grams). IRGACURE 819 (0.493 gram) was added to the vial and dissolved in the mixture to prepare the casting sol. The casting sol was passed through a 1 micron filter as described above in Method for Filtration of Casting Sol. A similar casting sol was measured to have a viscosity of 19.5 cp at 15.36 1/sec. The casting sol contained 19.79 weight percent oxide (approximately 10.1 volume percent) and 57.54 weight percent solvent.

The above casting sol was charged to a mold cavity. The mold cavity was formed by clamping together a silicon wafer, a polycarbonate ring (inner diameter of 25.17 mm×thickness of 2.54 mm), and a 3.3 mm thick acrylic plate. The acrylic plate contained two port holes that acted as the casting sol inlet and air vent. This eliminated bubble entrapment during casting sol charging. Once the cavity was filled the construction was cured as described above in Method for Curing Casting Sol—Procedure A. Curing time was 25 seconds. Two articles were prepared in this way.

The resulting shaped gels replicated the mold features, felt dry and were robust to handling when removed from the mold. These shaped gels were then dried using the Method for Supercritical Extraction of Gels described above to form shaped aerogels. The shaped aerogels were crack-free after drying. These aerogels were heated according to the Method for Sintering—I described above except the samples were laid on quartz rods in the alumina crucible. The resulting shaped articles remained crack-free. Then, the crack-free articles were sintered according to the Method for Sintering—II described above except a sintering temperature of 1095° C. was used and the samples were laid on quartz rods in the alumina crucible. The shaped, sintered articles were not fully dense. Then, the sintered articles, laid on quartz rods in the alumina crucible, were sintered further to 1105° C. The resulting sintered, amorphous silica articles were fully dense (2.20 and 2.21 g/cc respectively as determined by using the Method for Measuring Archimedes' Density described above), crack-free, and transparent.

Figure 4A:
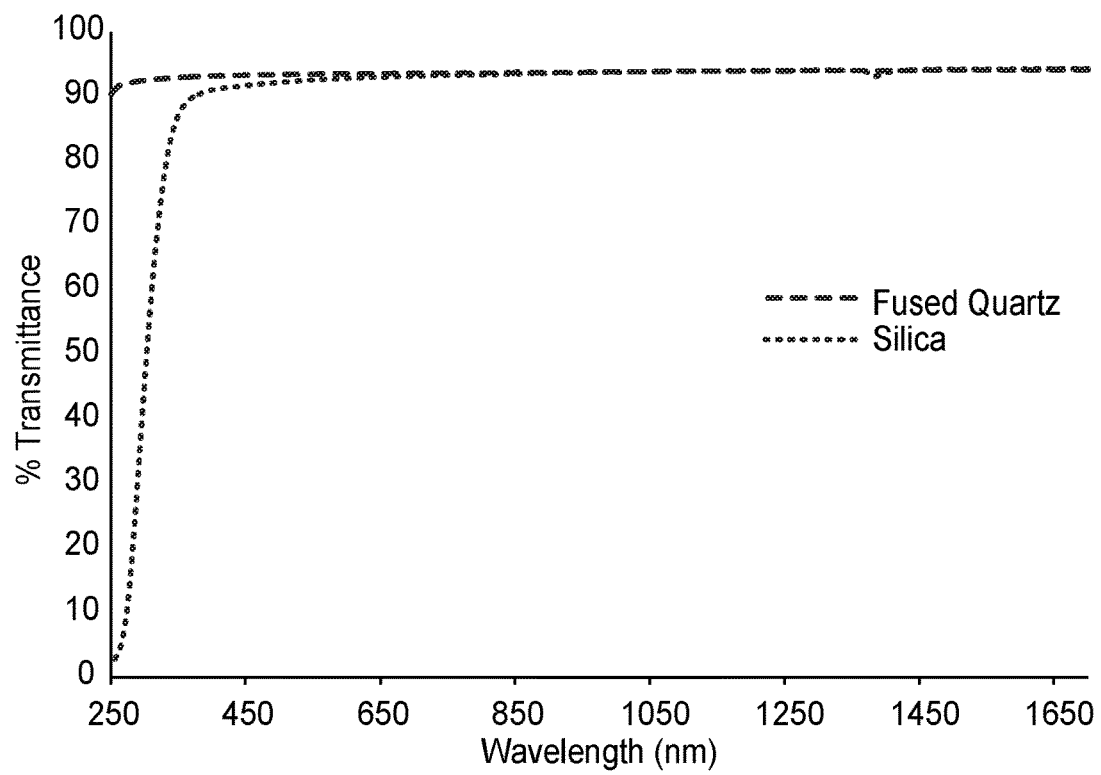
FIG. 4A are plots of percent transmittance versus wavelength (250 to 1650 nm) for an example sintered article (referred to as "Silica", Example 2) compared to fused quartz.
Figure 4B:
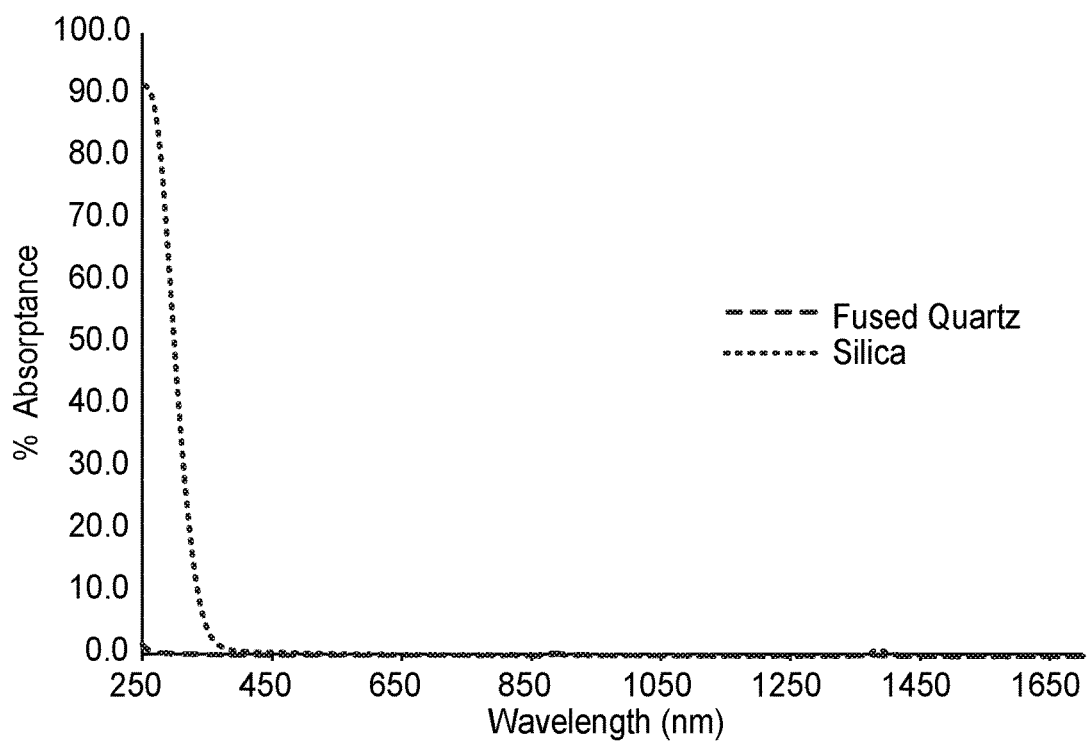
FIG. 4B are plots of percent absorbance versus wavelength (250 to 1650 nm) for an example sintered article (referred to as "Silica", Example 2) compared to fused quartz.
Figure 4C:
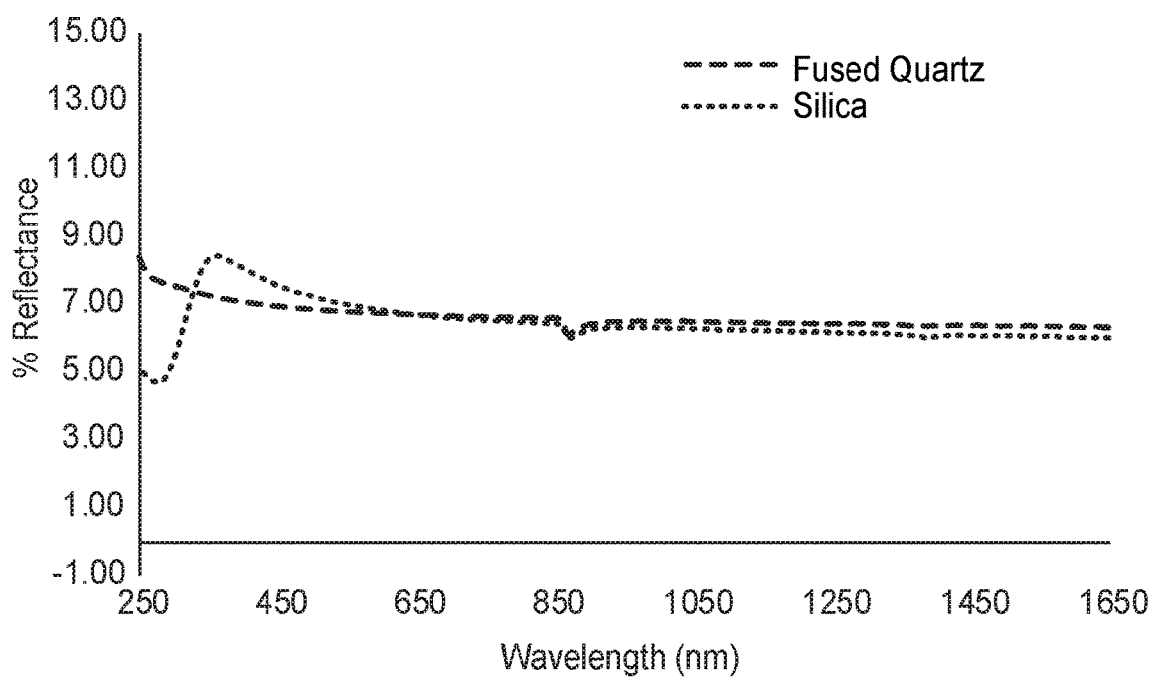
FIG. 4C are plots of percent reflectance versus wavelength (250 to 1650 nm) for an example sintered article (referred to as "Silica", Example 2) compared to fused quartz.
Figure 4D:
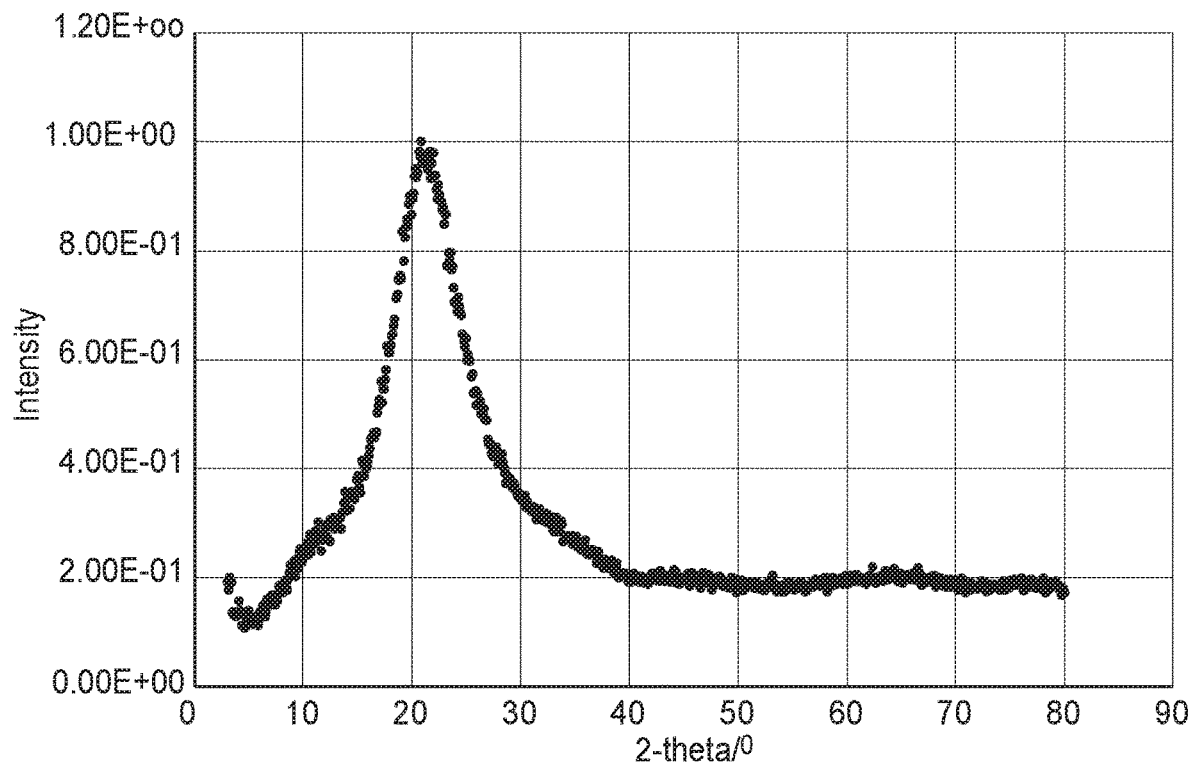
FIG. 4D is an x-ray diffraction scan for an example sintered article (Example 2).

The optical properties were measured for one of the sintered articles according to the Method for Measuring Optical Properties described above. The sintered article had a thickness of about 1.4 mm. The results are shown in FIG. 4A-4C. A plot of percent transmittance versus wavelength (250 to 1650 nm) for the sintered article of Example 2 compared to fused quartz is shown in FIG. 4A; a plot of percent absorptance versus wavelength (250 to 1650 nm) for the sintered article of Example 2 compared to fused quartz is shown in FIG. 4B; and a plot of percent reflectance versus wavelength (250 to 1650 nm) for a sintered article of Example 2 compared to fused quartz is shown in FIG. 4C. A second sintered article was analyzed by X-ray diffraction using the Method for X-Ray Diffraction described above to determine phases present. The scan showed no reflections indicative of crystalline silica or any other crystalline phases. The sintered article was amorphous silica. The XRD scan of the sintered article of Example 2 is shown in FIG. 4D.

Example 3

Methoxy propanol (450.00 grams), 4-hydroxy-TEMPO (5 drops of a 5 weight percent solution in water), and 3-(trimethoxysilyl)propyl methacrylate (28.02 grams) were combined in a 1-L beaker. NALCO 2326 (400.00 grams, 16.14 weight percent solids) was charged to a jar. The contents of the beaker were added to the jar while stirring. This procedure was repeated nine more times. Each jar was sealed with a lid and placed in an oven at 85° C. for 16 hours. The contents of the ten jars and diethylene glycol monoethyl ether (656.72 grams) were charged to a 16-L flask and concentrated via rotary evaporation. The mixture was passed through a 1 micron filter as described above. The resulting mixture contained 42.73 weight percent oxide.

46.54 grams of the above mixture were charged to a vial and combined with N-(2-hydroxyethyl)acrylamide (2.84 grams), octyl acrylate (5.75 grams), trimethylolpropane triacrylate ("SR351") (5.07 grams), a hexafunctional urethane acrylate ("CN975") (2.53 grams), and diethylene glycol monoethyl ether (36.48 grams). IRGACURE 819 (1.42 grams) was dissolved in the resulting mixture (94.51 grams) to prepare the casting sol. The casting sol was passed through a 1 micron filter as described above in Method for Filtration of Casting Sol. The viscosity of the casting sol was 19.5 cp at 15.36 1/sec. The casting sol contained 19.75 weight percent oxide (approximately 10.1 volume percent) and 58.74 weight percent solvent.

Figure 5:
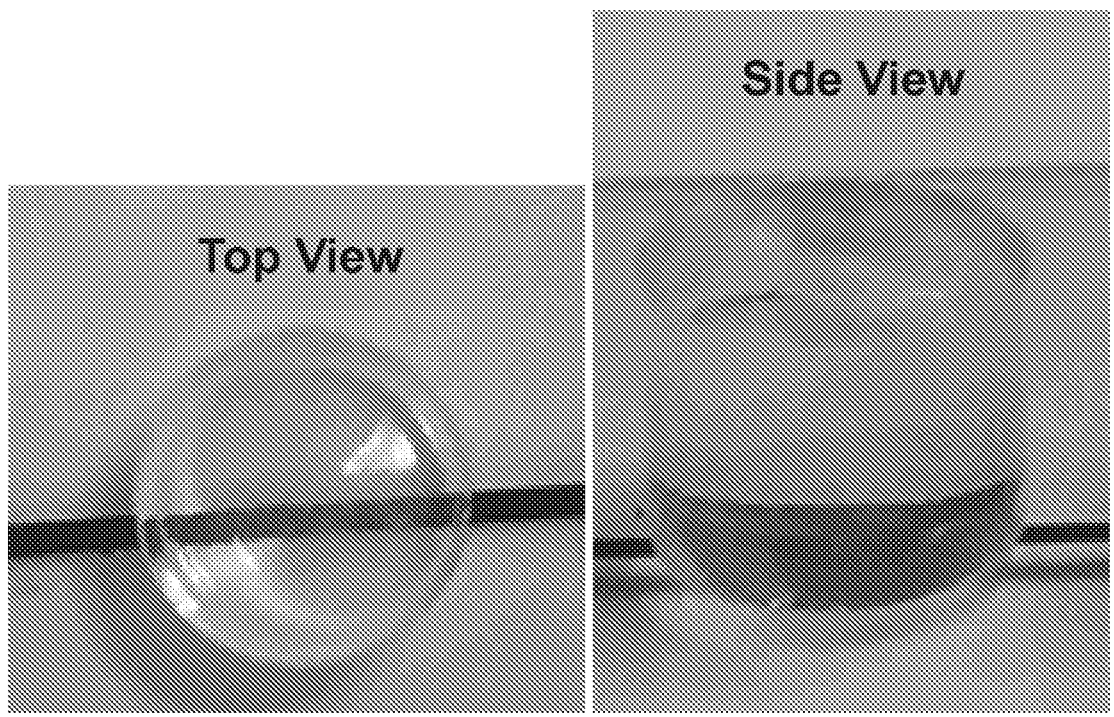
FIG. 5 are photographs (top view and side view) of a sintered article in the shape of a cylinder (approximately 6 mm height and 7.45 mm diameter) prepared from a casting sol with 10 volume percent silica having an average particle size of 5 nanometers (Example 3).

Two gel discs were molded from the above casting sol in a cylindrical polypropylene mold (15.9 mm diameter). For the first sample, the casting sol (approximately 0.8 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. For the second sample, the casting sol (approximately 2.4 mL) was pipetted into another cylindrical polypropylene mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting gels were free of cracks and the surfaces felt dry. The gels were then dried using the Method for Supercritical Extraction of Gels described above to form aerogels. The aerogels were crack-free. These aerogels were heated according to the Method for Sintering—I described above. The resulting articles remained crack-free after this heating step. The crack-free articles were sintered according to the Method for Sintering—II described above. The resulting sintered, amorphous silica articles were fully dense (2.20 g/cc as determined by using the Method for Measuring Archimedes' Density described above), crack-free, and transparent. The larger (i.e., second) Example 3 article was approximately 6.0 mm high×7.45 mm in diameter. Photographic images (top view and side view) of sintered article of Example 3 are shown in FIG. 5.

The larger sample (approximately 6.0 mm high×7.45 mm in diameter) was sintered a second time using the Method for Sintering-II described above, except the peak temperature was 1125° C. with a 2 hour soak at that temperature. The sample partially crystallized during this process and shattered.

Example 4

Methoxy propanol (450.00 grams), 4-hydroxy-TEMPO (5 drops of a 5 weight percent solution in water), 3-cyanopropyltriethoxysilane (13.05 grams), and 3-(trimethoxysilyl) propyl methacrylate (13.99 grams) were combined in a 1-L beaker. NALCO 2326 (400.00 grams, 16.12 weight percent solids) was charged to a jar. The contents of the beaker were added to the jar while stirring. This procedure was repeated two more times. Each jar was sealed with a lid and placed in an oven at 85° C. for 16 hours. The contents of the three jars were concentrated via rotary evaporation in a 1000 mL round-bottom flask. Diethylene glycol monoethyl ether (213.70 grams) was charged to the flask and the mixture was concentrated further via rotary evaporation. The mixture was passed through a 1 micron filter as described above. The resulting mixture contained 41.81 weight percent oxide.

12.52 grams of the above sol were charged to a vial and combined with N-(2-hydroxyethyl)acrylamide (1.85 grams), isobornyl acrylate ("SR506") (1.03 grams), trimethylolpropane triacrylate ("SR351") (0.89 gram), a hexafunctional urethane acrylate ("CN975") (1.04 grams), and diethylene glycol monoethyl ether (10.20 grams). IRGACURE 819 (0.0683 gram) was added to the vial and dissolved in the mixture to prepare the casting sol. The casting sol was passed through a 1 micron filter as described above in Method for Filtration of Casting Sol. The casting sol contained 18.96 weight percent oxide (approximately 9.8 volume percent) and 59.43 weight percent solvent.

Two gel discs were molded from the above casting sol in cylindrical polypropylene molds (15.9 mm diameter). For both samples, the casting sol (approximately 0.7 mL per sample) was pipetted into the mold, and the mold was sealed leaving no space between the sol and the walls of the mold. The sealed molds were placed in a light box and cured according to Method for Curing Casting Sol—Procedure B above. The cure time was 8 minutes. The resulting shaped gel articles were free of cracks. The first gel was dried using the Method for Supercritical Extraction of Gels described above to form an aerogel. The aerogel was crack-free. The second gel was placed standing on its side on a nylon mesh in a Pyrex dish, and was dried under ambient conditions for 34 days to form a xerogel. The two dried gel articles were then were heated according to the Method for Sintering—I described above. The articles remained crack-free after this heating step and they were translucent. The crack-free articles were sintered according to the Method for Sintering-II described above, except the peak temperature was 1045° C. The resulting sintered articles were both fully dense (2.19 g/cc as determined by using the Method for Measuring Archimedes' Density described above), crack free, and transparent. The first article made by the aerogel route had a final diameter of 7.35 mm, corresponding to a shrinkage ($-(($Length$_{article}$-Length$_{mold}$)/Length$_{mold}$)*100$) of 53.8 percent. The second article made by the xerogel route had a final diameter of 7.36 mm, corresponding to a shrinkage ($-(($Length$_{article}$-Length$_{mold}$)/Length$_{mold}$)*100$) of 53.7 percent.

Example 5

Three casting sols were prepared without photoinitiator using silica nanoparticles having average nanoparticle sizes of 5 nm, 20 nm, and 75 nm, respectively, as described below.

5 nm Silica Casting Sol

Methoxy propanol (450.00 grams), 4-hydroxy-TEMPO (5 drops of a 5 weight percent solution in water), and 3-(trimethoxysilyl)propyl methacrylate (28.02 grams) were combined in a 1-L beaker. NALCO 2326 (400.00 grams, 16.14 weight percent solids) was charged to a jar. The contents of the beaker were added to the jar while stirring. This procedure was repeated nine more times. Each jar was sealed with a lid and placed in an oven at 85° C. for 16 hours. The contents of the ten jars and diethylene glycol monoethyl ether (656.72 grams) were charged to a 16-L flask and concentrated via rotary evaporation. The mixture was passed through a 1 micron filter as described above. The resulting mixture contained 42.73 weight percent oxide.

The above mixture (46.54 grams) was charged to a vial and combined with N-(2-hydroxyethyl)acrylamide (2.84 grams), octyl acrylate (5.75 grams), trimethylolpropane triacrylate ("SR351") (5.07 grams), a hexafunctional urethane acrylate ("CN975") (2.53 grams), and diethylene glycol monoethyl ether (36.48 grams) to prepare the casting sol. The casting sol was passed through a 1 micron filter as described above in Method for Filtration of Casting Sol. The casting sol contained 20.04 weight percent oxide (approximately 10.2 volume percent) and 59.62 weight percent solvent. A mixture of all of the components of the casting sol except the surface modified silica particles and the photoinitiator had a refractive index of 1.4353, as measured according to the Method for Measuring Refractive Index described above.

20 nm Silica Casting Sol

Methoxy propanol (160.00 grams), 4-hydroxy-TEMPO (2 drops of a 5 weight percent solution in water), and 3-(trimethoxysilyl)propyl methacrylate (9.14 grams) were combined in a 1-L beaker. NALCO 2327 (142.00 grams, 41.90 weight percent solids) was charged to a jar. The contents of the beaker were added to the jar while stirring. The jar was sealed with a lid and placed in an oven at 85° C. for 16 hours. The contents of the jar and diethylene glycol monoethyl ether (59.47 grams) were charged to a 500 mL flask and concentrated via rotary evaporation. The mixture was passed through a 1 micron filter as described above. The resulting mixture contained 45.07 weight percent oxide.

The above sol (10.11 grams) was charged to a vial and combined with N-(2-hydroxyethyl)acrylamide (0.75 gram), octyl acrylate (1.52 grams), trimethylolpropane triacrylate ("SR351") (1.34 grams), a hexafunctional urethane acrylate ("CN975") (0.67 gram), and diethylene glycol monoethyl ether (8.20 grams). The casting sol was passed through a 1 micron filter as described above in Method for Filtration of Casting Sol. The casting sol contained 20.18 weight percent oxide (approximately 10.2 volume percent) and 58.99 weight percent solvent. A mixture of all of the components of the casting sol except the surface modified silica particles and the photoinitiator had a refractive index of 1.4363, as measured according to the Method for Measuring Refractive Index described above.

75 nm Silica Casting Sol

Methoxy propanol (450.00 grams), 4-hydroxy-TEMPO (5 drops of a 5 weight percent solution in water), and 3-(trimethoxysilyl)propyl methacrylate (6.02 grams) were combined in a 1-L beaker. NALCO 2329K (400.00 grams, 40.47 weight percent solids) was charged to a 32 ounce (0.95 L) jar. The contents of the beaker were added to the jar while stirring. The jar was sealed with a lid and placed in an oven at 85° C. for 16 hours. The contents of the jar and diethylene glycol monoethyl ether (128.05 grams) were charged to a 1000 mL round-bottom flask and concentrated via rotary evaporation. The resulting mixture contained 47.91 weight percent oxide.

The above mixture (12.92 grams) was charged to a vial and combined with N-(2-hydroxyethyl)acrylamide (1.11 grams), octyl acrylate (2.21 grams), trimethylolpropane triacrylate ("SR351") (1.49 grams), a hexafunctional urethane acrylate ("CN975") (1.48 grams), and diethylene glycol monoethyl ether (11.73 grams) to prepare the casting sol. The casting sol was passed through a 1 micron filter as described above in Method for Filtration of Casting Sol. The casting sol contained 20.00 weight percent oxide (approximately 10.2 volume percent) and 59.04 weight percent solvent. A mixture of all of the components of the casting sol except the surface modified silica particles and the photoinitiator had a refractive index of 1.4368, as measured according to the Method for Measuring Refractive Index described above.

Figure 6:
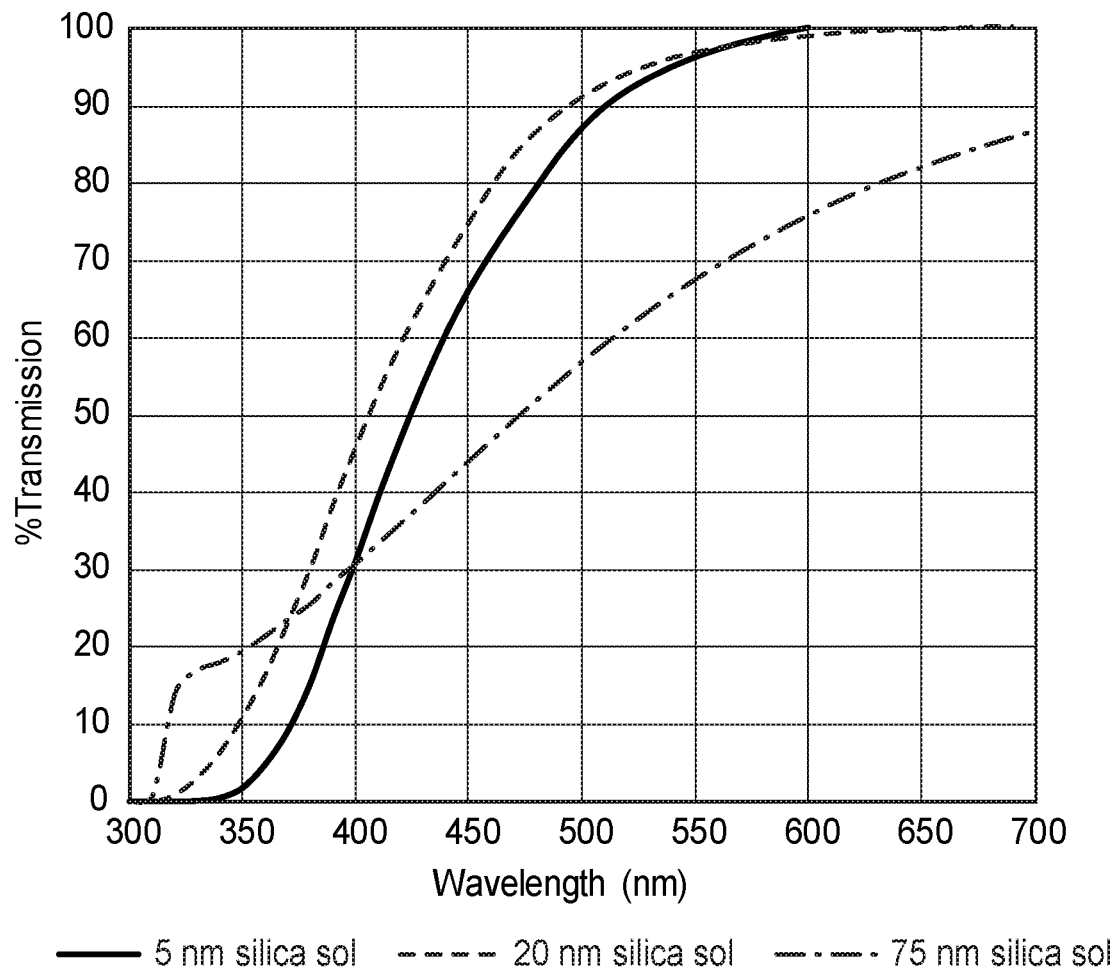
FIG. 6 are plots of percent transmission versus wavelength (300 to 700 nm) for casting sols containing silica particles having an average size of 5 nanometers, 20 nanometers, or 75 nanometers (Example 5).

The UV-Visible transmission was measured using the Method for Determining Light Transmission (percent T) described above. FIG. 6 are plots of percent transmission versus wavelength (300-700 nm) for Example 5 casting sols containing silica nanoparticles having an average size of 5 nanometers, 20 nanometers, or 75 nanometers.

Example 6

Methoxy propanol (160.00 grams), 4-hydroxy-TEMPO (2 drops of a 5 weight percent solution in water), and 3-(trimethoxysilyl)propyl methacrylate (9.14 grams) were combined in a 1-L beaker. NALCO 2327 (142.00 grams, 41.90 weight percent solids) was charged to a jar. The contents of the beaker were added to the jar while stirring. The jar was sealed with a lid and placed in an oven at 85° C. for 16 hours. The contents of the jar and diethylene glycol monoethyl ether (59.47 grams) were charged to a 500 mL round-bottom flask and concentrated via rotary evaporation. The mixture was passed through a 1 micron filter. The resulting mixture contained 45.07 weight percent oxide.

The above mixture (10.11 grams) was charged to a vial and combined with N-(2-hydroxyethyl)acrylamide (0.75 gram), octyl acrylate (1.52 grams), trimethylolpropane triacrylate ("SR351") (1.34 grams), a hexafunctional urethane acrylate ("CN975") (0.67 gram), and diethylene glycol monoethyl ether (8.20 grams). IRGACURE 819 (0.27 gram) was dissolved in the resulting mixture (17.91 grams) to prepare the casting sol. The casting sol was passed through a 1 micron filter as described above in Method for Filtration of Casting Sol. A similar casting sol was measured to have a viscosity of 18.3 cp at 15.36 1/sec. The sol contained 19.88 weight percent oxide (approximately 10.1 volume percent) and 58.11 weight percent solvent.

Figure 7:
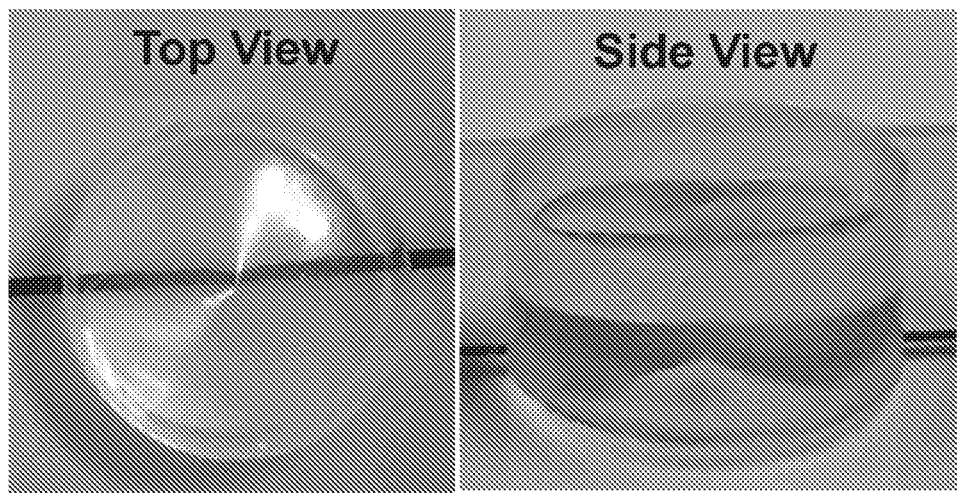
FIG. 7 are photographs (top view and side view) of a sintered article in the shape of a cylinder (approximately 7 mm height and 13.51 mm diameter) prepared from a casting sol with 10 volume percent silica having an average particle size of 20 nanometers (Example 6).

A first gel disc was molded from the above casting sol in a cylindrical polypropylene mold (15.9 mm diameter). The casting sol (approximately 0.8 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. A second gel disc was molded from the above casting sol in a larger cylindrical polypropylene mold (29 mm diameter). The casting sol (approximately 8 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. The two shaped gels were then dried using the Method for Supercritical Extraction of Gels described above to form shaped aerogels. The shaped aerogels were crack-free. The dry shaped aerogels were heated according to the Method for Sintering—I described above. The resulting articles remained crack-free after this heating step. The crack-free articles were sintered according to the Method for Sintering—II described above. The resulting sintered, amorphous silica articles were fully dense (2.20 g/cc as determined by using the Method for Measuring Archimedes' Density described above), crack-free, and transparent. The first (smaller) sample had a final diameter of 7.39 mm, corresponding to a shrinkage (-((Length$_{article}$-Length$_{mold}$)/Length$_{mold}$)*100) of 53.5 percent. The second (larger) sample measured approximately 7 mm high×13.51 mm in diameter, corresponding to a shrinkage of (-((Length$_{article}$-Length$_{mold}$)/Length$_{mold}$)*100) of 53.4 percent. FIG. 7 is an image of this larger sample.

The second (larger) sample (approximately 7.0 mm high× 13.51 mm in diameter) was sintered for a second time according to the Method for Sintering—II described above, except that this time the peak temperature was 1125° C. with a 2 hour soak at that temperature. The resulting article was crack-free, fully dense (2.20 g/cc as determined by using the Method for Measuring Archimedes' Density described above) and amorphous. The clarity of the article was decreased slightly with sintering at the increased temperature.

Example 7

Methoxy propanol (450.00 grams), 4-hydroxy-TEMPO (5 drops of a 5 weight percent solution in water), and 3-(trimethoxysilyl)propyl methacrylate (6.02 grams) were combined in a 1-L beaker. NALCO 2329K (400.00 grams, 40.47 weight percent solids) was charged to a 32 ounce (0.95 L) jar. The contents of the beaker were added to the jar while stirring. The jar was sealed with a lid and placed in an oven at 85° C. for 16 hours. The contents of the jar and diethylene glycol monoethyl ether (128.05 grams) were charged to a 1000 mL round-bottom flask and concentrated via rotary evaporation. The resulting mixture contained 47.91 weight percent oxide.

The above mixture (12.92 grams) was charged to a vial and combined with N-(2-hydroxyethyl)acrylamide (1.11 grams), octyl acrylate (2.21 grams), trimethylolpropane triacrylate ("SR351") (1.49 grams), a hexafunctional urethane acrylate ("CN975") (1.48 grams), and diethylene glycol monoethyl ether (11.73 grams). IRGACURE 819 (0.38 gram) was dissolved in the resulting mixture (26.29 grams) to prepare the casting sol. The casting sol was passed through a 1 micron filter as described above in Method for Filtration of Casting Sol. The casting sol contained 19.72 weight percent oxide (approximately 10.1 volume percent) and 58.19 weight percent solvent.

Figure 8:
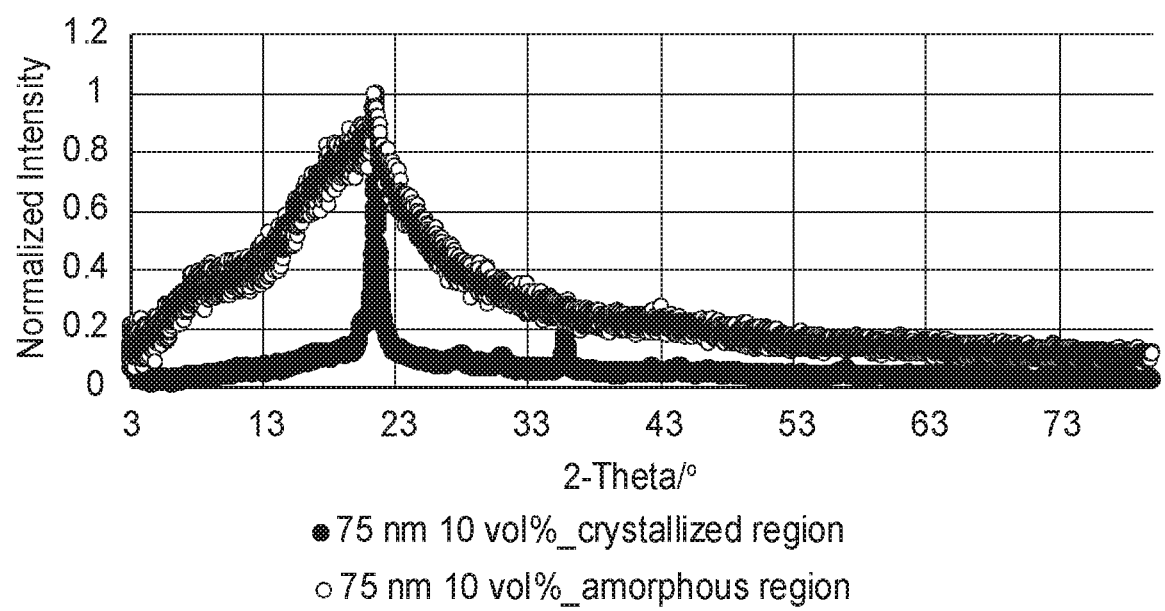
FIG. 8 shows x-ray diffraction scans of amorphous and crystalline regions of a sintered article (Example 7).

A gel disc was molded from the above casting sol in a cylindrical polypropylene mold (15.9 mm diameter). The casting sol (approximately 0.8 mL) was pipetted into the mold, and the mold was sealed leaving no space between the casting sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. The shaped gel was then dried using the Method for Supercritical Extraction of Gels described above to form a shaped aerogel. The aerogel was crack-free. The dry aerogel was heated according to the Method for Sintering—I described above. The resulting article remained crack-free, but was white and opaque. The crack-free article was sintered according to the Method for Sintering—II described above. The resulting sintered article was half transparent and half cracked and crystallized (density=2.24 g/cc as determined by using the Method for Measuring Archimedes' Density described above). FIG. 8 shows the x-ray diffraction patterns for the amorphous and crystallized regions of the sintered article of Example 7.

A second gel disc was made according to the above procedures except the disc was soaked in acid prior to the 1105° C. sintering step described in the Method for Sintering—II as follows: A solution of 2 weight percent nitric acid was prepared. 12.5 grams of the solution was added to a 50 mL glass jar and the gel disc was placed in the solution. The gel disc was soaked for 1 hour. The weight of the gel disk increased from 0.1900 gram to 0.3031 gram when wet. This corresponds to a pore volume fraction 0.5669. The gel disc was removed and placed in a 50 mL glass jar (with 40 grams deionized water). The contents were stirred slowly for 1 hour. The disc was removed and placed back in the nitric acid solution. It was stirred slowly for 24 hours. The disc was then removed and placed in a 50 mL jar (40 grams of deionized water) and stirred slowly for 5 days. This soaking step was done to remove impurities that promote crystallization during the sintering step. The resulting sintered article was not fully dense (2.03 g/cc as determined by using the Method for Measuring Archimedes' Density described above), crack-free, and transparent in a small area, but mostly glassy white in appearance. This indicated the article was not fully dense.

The article above was sintered for a second time according to the Method for Sintering—II described above, except the peak temperature was 1125° C. with a 2 hour soak at that temperature. The article was crack-free, half glassy white and half transparent, with a density of 2.04 g/cc as measured by the Method for Measuring Archimedes' Density described above. This indicated the article was still not fully dense.

Figure 9A:
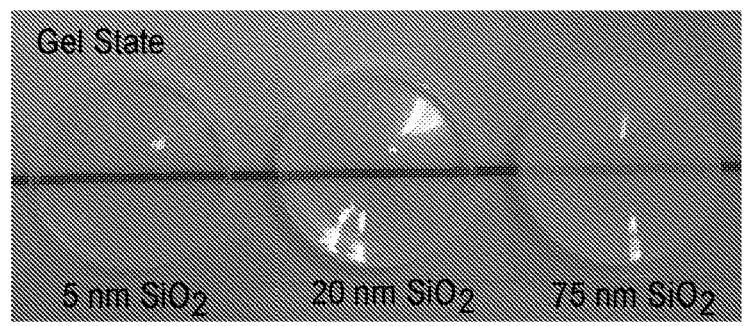
FIG. 9A is a photograph of shaped gel articles that were prepared from casting sols 10 volume percent silica having an average particle size of 5 nanometers (Example 3), 20 nanometers (Example 6), or 75 nanometers (Example 7).
Figure 9B:
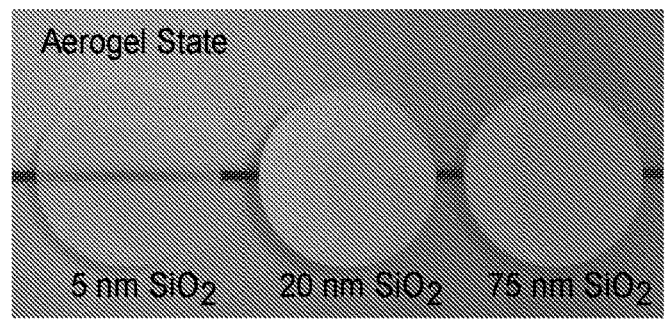
FIG. 9B is a photograph of aerogels that were prepared from the shaped gel articles shown in FIG. 9A.
Figure 9C:
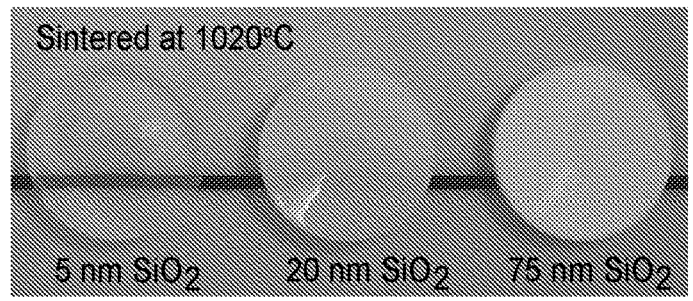
FIG. 9C is a photograph of sintered articles formed at 1020° C. from the aerogels of FIG. 9B.
Figure 9D:
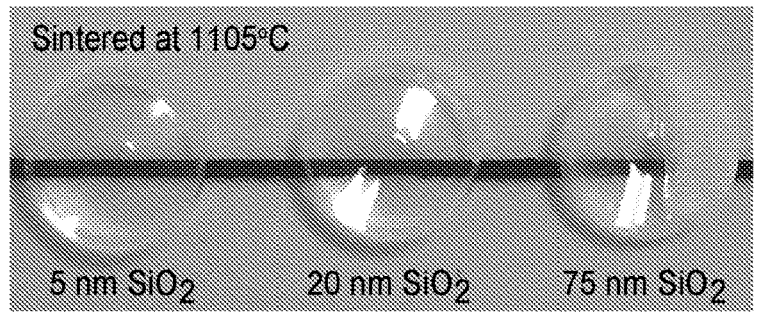
FIG. 9D is a photograph of sintered articles formed at 1105° C. from the sintered articles of FIG. 9C.

FIG. 9A is a photograph of shaped gel articles that were prepared from casting sols having 10 volume percent silica having an average particle size of 5 nm (Example 3), 20 nm (Example 6), and 75 nm (Example 7). FIG. 9B is a photograph of aerogels that were prepared from the shaped gel articles shown in FIG. 9A. FIG. 9C is a photograph of articles heated at 1020° C. from the aerogels of FIG. 9B. FIG. 9D is a photograph of sintered articles formed at 1105° C. from the sintered articles of FIG. 9C.

Example 8

Methoxy propanol (450.00 grams), 4-hydroxy-TEMPO (5 drops of a 5 weight percent solution in water), and 3-(trimethoxysilyl)propyl methacrylate (6.02 grams) were combined in a 1-L beaker. NALCO 2329K (400.00 grams, 40.47 weight percent solids) was charged to a 32 ounce (0.95 L) jar. The contents of the beaker were added to the jar while stirring. The jar was sealed with a lid and placed in an oven at 85° C. for 16 hours. The contents of the jar and diethylene glycol monoethyl ether (128.05 grams) were charged to a 1000 mL round-bottom flask and concentrated via rotary evaporation. The resulting mixture contained 47.91 weight percent oxide.

11.34 grams of the above mixture were charged to a vial and combined with N-(2-hydroxyethyl)acrylamide (0.45 gram), octyl acrylate (0.90 gram), trimethylolpropane triacrylate ("SR351") (0.61 gram), a hexafunctional urethane acrylate ("CN975") (0.60 gram), and diethylene glycol monoethyl ether (1.32 grams). IRGACURE 819 (0.1955 gram) was added to the vial and dissolved in the mixture to prepare the casting sol. The casting sol was passed through a 1 micron filter as described above in Method for Filtration of Casting Sol. The casting sol contained 35.23 weight percent oxide (approximately 20 volume percent) and 45.79 weight percent solvent.

A gel disc was molded from the above casting sol in a cylindrical polypropylene mold (15.9 mm diameter). The casting sol (approximately 0.7 ml) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. The shaped gel was then dried using the Method for Supercritical Extraction of Gels described above to form a shaped aerogel. The aerogel was crack-free. The dry aerogel was heated according to the Method for Sintering—I described above. The resulting article remained crack-free, but was white and opaque. The crack-free article was sintered according to the Method for Sintering—II described above. The resulting sintered article was white, opaque, crystallized (as determined by the Method for X-Ray Diffraction described above) and contained a crack (density=2.31 g/cc as measured by the Method for Measuring Archimedes' Density described above).

Figure 10:
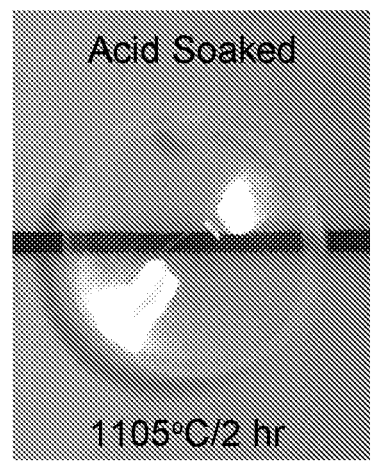
FIG. 10 is a photograph of a sintered article that was acid soaked prior to sintering at 1105° C.; it was prepared from a casting sol containing 20 volume percent silica having an average particle size of 75 nanometers (Example 8).

A second gel disc was made according to the above procedures except the disc was soaked in acid prior to the 1105° C. sintering step described in the Method for Sintering—II as follows. A solution of 2 weight percent nitric acid was prepared. 12.5 grams of the solution was added to a 50 mL glass jar and the disc was placed in the liquid. The disc was soaked for 1 hour. The weight increased from 0.3024 gram to 0.3920 gram when wet. This corresponds to a pore volume fraction 0.3945. The gel disc was removed and placed in a 50 mL glass jar (with 40 grams deionized water). The contents were stirred slowly for 1 hour. The disc was removed and placed back in the nitric acid solution. It was stirred slowly for 24 hours. The disc was then removed and placed in a 50 mL jar (40 grams of deionized water) and stirred slowly for 5 days. This soaking step was done to remove impurities that promote crystallization during the sintering step. The resulting sintered amorphous silica article was dense (2.18 g/cc as measured by the Method for Measuring Archimedes' Density described above), crack-free, and transparent. The sample had a final diameter of 9.28 mm, corresponding to a shrinkage (-((Length$_{article}$-Length$_{mold}$)/Length$_{mold}$)*100) of 41.6 percent. FIG. 10 is a photograph of an acid-soaked sintered article of Example 8.

The sample above was sintered for a second time according to the Method for Sintering—II described above, except the peak temperature was 1125° C. with a 2 hour soak at that temperature. The article was crack-free, white, opaque, and crystallized (as determined using the Method for X-Ray Diffraction described above), with a density of 2.29 g/cc (as measured by the Method for Measuring Archimedes' Density described above) after sintering at the increased temperature.

Example 9

Methoxy propanol (450.00 grams), 4-hydroxy-TEMPO (5 drops of a 5 weight percent solution in water), and 3-(trimethoxysilyl)propyl methacrylate (28.02 grams) were combined in a 1-L beaker. NALCO 2326 (400.00 grams, 16.14 weight percent solids) was charged to a jar. The contents of the beaker were added to the jar while stirring. This procedure was repeated nine more times. Each jar was sealed with a lid and placed in an oven at 85° C. for 16 hours. The contents of the ten jars and diethylene glycol monoethyl ether (656.72 grams) were charged to a 16-L flask and concentrated via rotary evaporation. The mixture was passed through a 1 micron filter as described above. The resulting mixture contained 42.73 weight percent oxide.

The above mixture was used to prepare three casting sols with approximately 2.5, 5.0, and 7.5 volume percent oxide as described below.

2.5 Volume Percent Casting Sol:

To prepare the first casting sol, 1.053 grams of the above mixture were charged to a vial and combined with N-(2-hydroxyethyl)acrylamide (0.305 gram), octyl acrylate (0.619 gram), trimethylolpropane triacrylate ("SR351") (0.545 gram), a hexafunctional urethane acrylate ("CN975") (0.272 gram), diethylene glycol monoethyl ether (2.655 grams), and ethanol (1.428 grams). IRGACURE 819 (0.0479 gram) was dissolved in diethylene glycol monoethyl ether (1.117 grams) and added to the vial. The resulting casting sol was passed through a 1 micron filter as described above in Method for Filtration of Casting Sol. The casting sol contained 5.59 weight percent oxide (approximately 2.7 volume percent) and 71.04 weight percent solvent.

5.0 Volume Percent Casting Sol:

To prepare the second casting sol, 2.057 grams of the above mixture were charged to a vial and combined with N-(2-hydroxyethyl)acrylamide (0.296 gram), octyl acrylate (0.573 gram), trimethylolpropane triacrylate ("SR351") (0.505 gram), a hexafunctional urethane acrylate ("CN975") (0.252 gram), diethylene glycol monoethyl ether (1.891 grams), and ethanol (1.400 grams). IRGACURE 819 (0.0468 gram) was dissolved in diethylene glycol monoethyl ether (1.091 grams) and added to the vial. The resulting casting sol was passed through a 1 micron filter as described above in Method for Filtration of Casting Sol. The casting sol contained 10.83 weight percent oxide (approximately 5.3 volume percent) and 66.37 weight percent solvent.

7.5 Volume Percent Casting Sol:

To prepare the third casting sol, 3.0685 grams of the above mixture were charged to a vial and combined with N-(2-hydroxyethyl)acrylamide (0.2656 gram), octyl acrylate (0.5406 gram), trimethylolpropane triacrylate ("SR351") (0.476 gram), a hexafunctional urethane acrylate ("CN975") (0.2376 gram), diethylene glycol monoethyl ether (1.19 grams), and ethanol (1.393 grams). IRGACURE 819 (0.047 gram) was dissolved in diethylene glycol monoethyl ether (1.0925 grams) and added to the vial. The resulting casting sol was passed through a 1 micron filter as described above in Method for Filtration of Casting Sol. The casting sol contained 15.78 weight percent oxide (approximately 7.9 volume percent) and 62.21 weight percent solvent.

A gel disc was molded from each of the above casting sols in a cylindrical polypropylene mold (15.9 mm diameter). The casting sols (approximately 0.7 mL) were pipetted into the molds, and the molds were sealed leaving no space between the sol and the walls of the mold. The sealed molds were placed in a light box and cured according to the Method for Curing Casting Sol—Procedure B above. The cure time was 6 minutes. The resulting shaped gels were free of cracks and the surfaces felt dry. The shaped gels were dried using the Method for Supercritical Extraction of Gels described above to form shaped aerogels. The aerogels were crack-free. The dried aerogels were heated according to the Method for Sintering—I described above. The resulting articles remained crack-free. The crack-free articles were sintered according to the Method for Sintering—II described above. The resulting sintered amorphous silica articles were crack-free. The sintered article made from 2.7 volume percent casting sol was bluish in color, indicating that it was not fully dense. Its density was measured to be 1.95 g/cc as measured by the Method for Measuring Archimedes' Density described above. The sintered article made from the 5.3 volume percent casting sol was fully dense (2.21 g/cc as measured by the Method for Measuring Archimedes' Density described above), crack-free, and transparent. The sintered article had a final diameter of 5.98 mm, corresponding to a shrinkage $(-((Length_{article}-Length_{mold})/Length_{mold})*100)$ of 62.4 percent. The sintered article made from 7.9 volume percent casting sol was fully dense (2.20 g/cc as measured by the Method for Measuring Archimedes' Density described above), crack-free, and transparent. The sintered article had a final diameter of 6.83 mm, corresponding to a shrinkage $(-((Length_{article}-Length_{mold})/Length_{mold})*100$ of 57.0 percent.

The sintered silica article prepared from the 2.5 volume percent casting sol prepared as described above was sintered for a second time according to the Method for Sintering—II described above, except the temperature was increased to 1125° C. with a two hour hold at that temperature. The resulting sintered amorphous silica article was transparent, crack-free and fully dense (2.21 g/cc as measured by the Method for Measuring Archimedes' Density described above). The article had a final diameter of 4.75 mm, corresponding to a shrinkage $(-((Length_{article}-Length_{mold})/Length_{mold})*100$ of 70.1 percent.

Figure 11A:
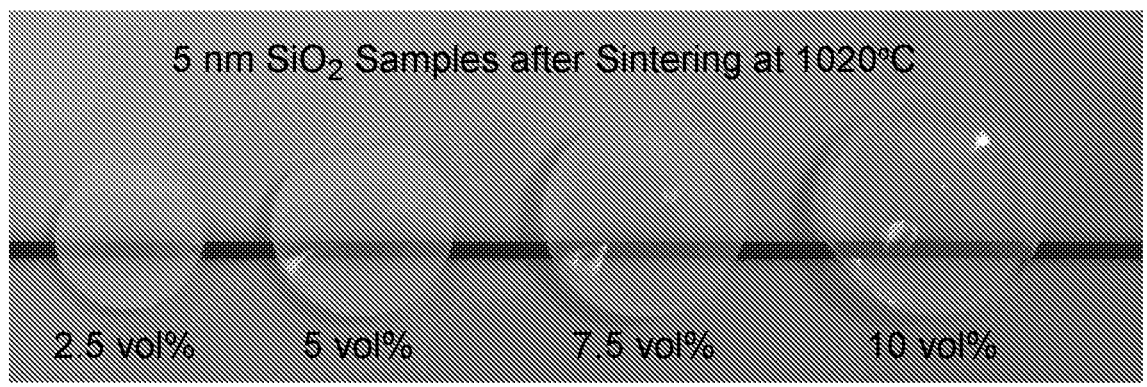
FIG. 11A is a photograph of sintered articles formed at 1020° C. from casting sols containing 2.5 volume percent, 5 volume percent, 7.5 volume percent, or 10 volume percent silica having an average particle size of 5 nanometers (Example 9).
Figure 11B:
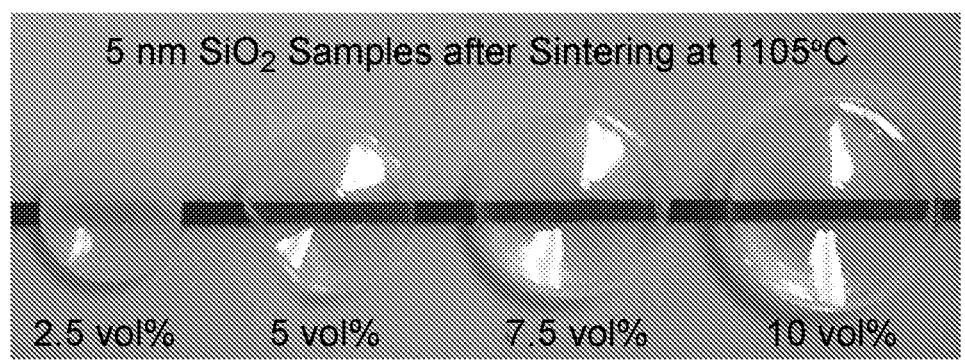
FIG. 11B is a photograph of sintered articles formed at 1105° C. from the sintered articles of FIG. 11A.

FIG. 11A is a photograph of the articles of Example 9 after heating to 1020° C. prepared from casting sols with 2.5, 5, 7.5 and 10 volume percent 5 nm silica. FIG. 11B is a photograph of sintered articles formed at 1105° C. from the articles pictured in FIG. 11A.

Example 10

Methoxy propanol (450.00 grams), 4-hydroxy-TEMPO (5 drops of a 5 weight percent solution in water), and 3-(trimethoxysilyl)propyl methacrylate (28.02 grams) were combined in a 1-L beaker. NALCO 2326 (400.00 grams, 16.14 weight percent solids) was charged to a jar. The contents of the beaker were added to the jar while stirring. This procedure was repeated nine more times. Each jar was sealed with a lid and placed in an oven at 85° C. for 16 hours. The contents of the ten jars and diethylene glycol monoethyl ether (656.72 grams) were charged to a 16-L flask and concentrated via rotary evaporation. The mixture was passed through a 1 micron filter as described above. The resulting mixture contained 42.73 weight percent oxide.

5.2738 grams of the above mixture were charged to a vial and combined with N-(2-hydroxyethyl)acrylamide (1.0155 grams), octyl acrylate (1.0081 grams), and diethylene glycol monoethyl ether (3.8702 grams). IRGACURE 819 (0.1689 gram) was added to the vial and dissolved in the mixture to prepare the casting sol. The casting sol was passed through a 1 micron filter as described above in Method for Filtration of Casting Sol. The casting sol contained 19.88 weight percent oxide (approximately 10.1 volume percent) and 56.80 weight percent solvent.

A gel disc was molded from the above casting sol in a cylindrical polypropylene mold (15.9 mm diameter). The casting sol (approximately 0.6 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was clear, well-formed and the surfaces felt dry.

Comparative Example A

Methoxy propanol (225.00 grams) and A1230 (28.10 grams) were combined in a 1-L beaker. NALCO 2326 (200.00 grams, 16.20 weight percent solids) was charged to a 16 ounce (0.47 L) jar. The contents of the beaker were added to the jar while stirring. The jar was sealed with a lid and placed in an oven at 85° C. for 16 hours. Approximately half of the contents of the jar (200.00 grams) and diethylene glycol monoethyl ether (17.55 grams) were charged to a 500 mL round bottom flask and concentrated via rotary evaporation. The resulting mixture contained 33.93 weight percent oxide.

10.2225 grams of the above mixture were charged to a vial and combined with N-(2-hydroxyethyl)acrylamide (0.6031 gram), octyl acrylate (1.2251 grams), trimethylolpropane triacrylate ("SR351") (1.0793 grams), a hexafunctional urethane acrylate ("CN975") (0.5385 gram), and diethylene glycol monoethyl ether (3.8163 grams). IRGACURE 819 (0.2604 gram) was added to the vial and dissolved in the mixture to prepare the casting sol. The casting sol was passed through a 1 micron filter as described above in Method for Filtration of Casting Sol. The casting sol contained 19.55 weight percent oxide (approximately 10.1 volume percent) and 44.63 weight percent solvent.

A gel disc was molded from the above casting sol in a cylindrical polypropylene mold (15.9 mm diameter). The casting sol (approximately 0.6 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was soft and easily damaged on removal from the mold. The gel was slightly translucent and whitish in color. The surfaces felt dry. The shaped gel was dried using the Method for Supercritical Extraction of Gels described above to form a shaped aerogel. The aerogel was crack-free, but white and opaque. The dried aerogel was heated according to the Method for Sintering—I described above. The resulting article was white, opaque and cracked. The cracked article was sintered according to the Method for Sintering—II described above. The resulting sintered article was not fully dense (2.10 g/cc as measured by the Method for Measuring Archimedes' Density described above, which may be an error in measurement due to the cracked nature of the article), cracked, white and opaque.

Figure 12A:
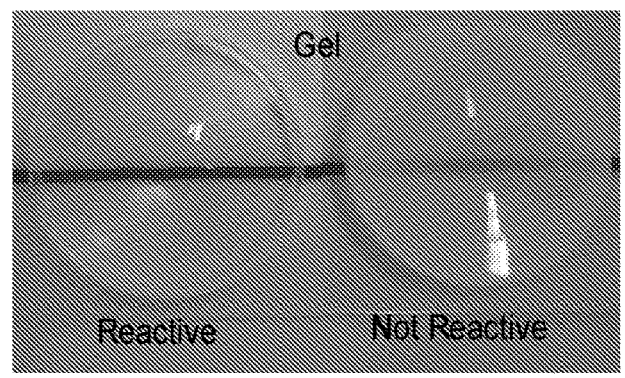
FIG. 12A is a photograph of shaped gel articles formed with (labelled "reactive") and without (labelled "not reactive") a silane surface modifier having a radically polymerizable group.
Figure 12B:
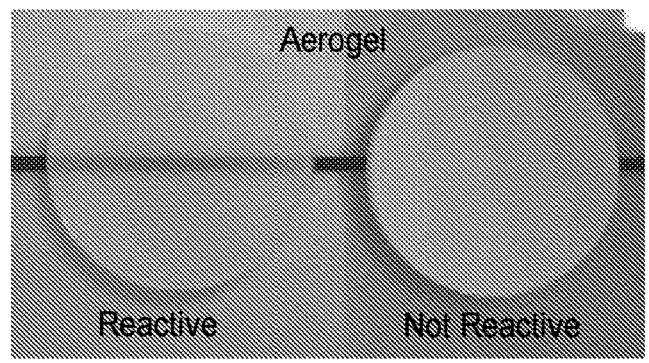
FIG. 12B is a photograph of aerogels formed from the shaped gel articles of FIG. 12A.
Figure 12C:
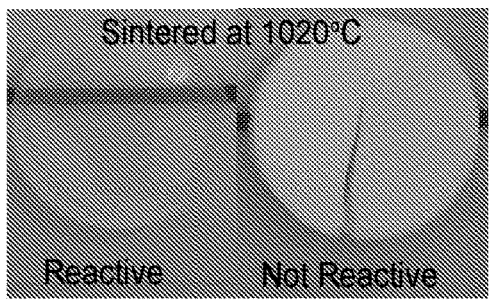
FIG. 12C is a photograph of sintered articles formed at 1020° C. from the aerogels of FIG. 12B.
Figure 12D:
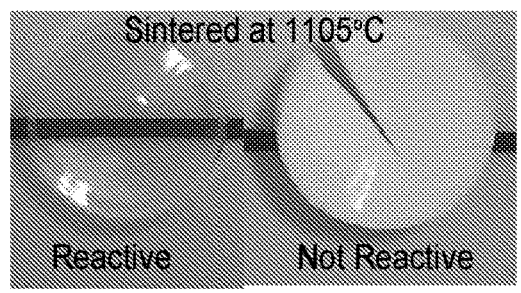
FIG. 12D is a photograph of sintered articles formed at 1105° C. from the sintered articles of FIG. 12C.

FIG. 12A is a photograph of shaped gel articles of Example 3 (marked "reactive") and Comparative Example A (marked "not reactive"). FIG. 12B is a photograph of aerogels formed from the shaped gel articles of FIG. 12A. FIG. 12C is a photograph of sintered articles formed from the aerogels of FIG. 12B by sintering at 1020° C. FIG. 12D is a photograph of sintered articles at 1105° C. from the articles of FIG. 12C.

Example 11

Methoxy propanol (450.00 grams), 4-hydroxy-TEMPO (5 drops of a 5 weight percent solution in water), and 3-(trimethoxysilyl)propyl methacrylate (28.12 grams) were combined in a 1-L beaker. NALCO 2326 (400.00 grams, 16.20 weight percent solids) was charged to a jar. The contents of the beaker were added to the jar while stirring. This procedure was repeated four more times. Each jar was sealed with a lid and placed in an oven at 85° C. for 16 hours. The contents of the five jars and diethylene glycol monoethyl ether (290.63 grams) were charged to a 12-L flask and concentrated via rotary evaporation. The mixture was passed through a 1 micron filter as described above. The resulting mixture contained 44.84 weight percent oxide.

To prepare the casting sol, 43.36 grams of the above mixture were charged to a jar and combined with N-(2-hydroxyethyl)acrylamide (2.86 grams), octyl acrylate (5.54 grams), 1,6-hexanediol diacrylate ("SR238") (3.63 grams), trimethylolpropane triacrylate ("SR351") (0.58 gram), a hexafunctional urethane acrylate ("CN975") (3.71 grams), and diethylene glycol monoethyl ether (36.43 grams). IRGACURE 819 (2.14 grams) was added to the jar and dissolved in the mixture. The casting sol was passed through a 1 micron filter as described above in Method for Filtration of Casting Sol. The casting sol contained 19.79 weight percent oxide (approximately 10.1 volume percent) and 57.59 weight percent solvent.

Figure 13:
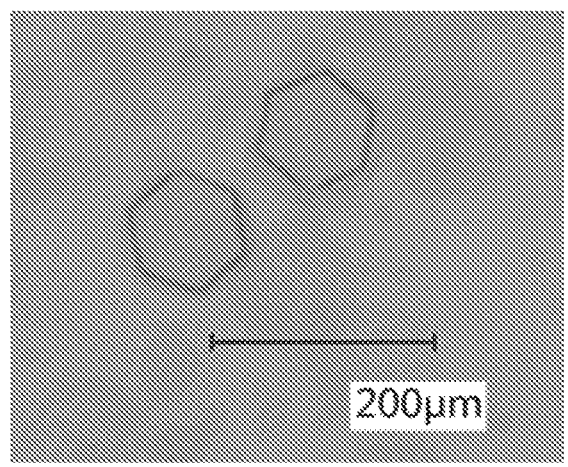
FIG. 13 is a photograph of an example xerogel (Example 11).

A polypropylene mold was used to form articles. The mold consisted of a film with an array of hexagonal cylinder shaped cavities (hex diameter 130 μm/height 29 μm/bearing area 22 percent). The mold was washed with ethanol and dried. The mold was adhered to a glass plate (10.16 cm×10.16 cm×0.63 cm) with double stick scotch tape. The casting sol was placed on the mold via pipet. Then a PET (polyethylene terephthalate) film (50 micron thickness) and a glass plate (10.16 cm×10.16 cm×0.63 cm) were placed on the mold and squeezed together to distribute the sol over the mold and into the cylinders. The assembly was clamped together using four small "C" clamps (6 cm). The mold assembly was cured using the 450nm LED array described in Method for Curing Casting Sol—Procedure A above. The distance between the light and the mold assembly was 35 mm. The mold assembly was irradiated for 46 seconds. The top glass plate and PET film were removed, and the mold was placed in an oven at 75° C. (15 minutes) to dry the cured gel articles. The resulting shaped xerogels were removed from the mold. The individual hexagonal xerogels were ~108 microns in diameter. FIG. 13 is a photograph of xerogels of Example 11.

The shaped xerogels were heated according to the Method for Sintering—I described above followed by sintering according to the Method for Sintering—II described above. The resulting sintered articles were transparent and around 63 microns in diameter.

Comparative Example B

Methoxy propanol (450.00 grams) and phenyltrimethoxy silane (22.40 grams) were combined in a 1-L beaker. NALCO 2326 (400.00 grams, 16.14 weight percent solids) was charged to a jar. The contents of the beaker were added to the jar while stirring. The jar was sealed with a lid and placed in an oven at 85° C. for 16 hours. The above sol (383.79 grams) and diethylene glycol monoethyl ether (23.98 grams) were charged to a 500 mL round bottom flask and concentrated via rotary evaporation. The resulting mixture contained 48.84 weight percent oxide.

The above mixture (5.024 grams) was charged to a vial and combined with N-(2-hydroxyethyl)acrylamide (1.78 grams), octyl acrylate (3.53 grams), trimethylolpropane triacrylate ("SR351") (2.389 grams), a hexafunctional urethane acrylate ("CN975") (2.366 grams), and diethylene glycol monoethyl ether (29.96 grams). IRGACURE 819 (0.7399 gram) was dissolved in the resulting mixture (45.77 grams) to prepare the casting sol. The casting sol was passed through a 1 micron filter as described above in Method for Filtration of Casting Sol. The viscosity of the casting sol was 7.68 cp at 38.4 1/sec. The casting sol contained 5.33 weight percent oxide (approximately 2.5 volume percent) and 70.34 weight percent solvent.

A gel disc was molded from the above casting sol in a cylindrical polypropylene mold (15.9 mm diameter). The casting sol (approximately 0.7 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. The gel was dried using the Method for Supercritical Extraction of Gels described above to form an aerogel. The resulting aerogel was crack-free, white, and opaque. The aerogel was then heated according to the Method for Sintering—I described above, resulting in an article that was crack free, white, and opaque. The article was sintered according to the Method for Sintering—II described above. The resulting sintered article was white and opaque, with a diameter of 6.19 mm.

Example 12

Methoxy propanol (225.00 grams), 4-hydroxy-TEMPO (2 drops of a 5 weight percent solution in water), 3-(trimethoxysilyl)propyl methacrylate (3.53 grams), and PEG2TES (15.65 grams) were combined in a 1-L beaker. NALCO 2326 (200.00 grams, 16.22 weight percent solids) was charged to a jar. The contents of the beaker were added to the jar while stirring. The jar was sealed with a lid and placed in an oven at 85° C. for 16 hours. The above sol (330.87 grams) and diethylene glycol monoethyl ether (24.02 grams) were charged to a 500 mL round bottom flask and concentrated via rotary evaporation. The resulting mixture contained 44.84 weight percent oxide.

The above mixture (30.00 grams) was charged to a vial and combined with N-(2-hydroxyethyl)acrylamide (2.32 grams), octyl acrylate (4.60 grams), trimethylolpropane triacrylate ("SR351") (3.11 grams), a hexafunctional urethane acrylate ("CN975") (3.07 grams), and diethylene glycol monoethyl ether (24.45 grams). IRGACURE 819 (1.009 grams) was dissolved in the resulting mixture (68.57 grams) to prepare the casting sol. The casting sol was passed through a 1 micron filter as described above in Method for Filtration of Casting Sol. The viscosity of the casting sol was 18.15 cp at 15.36 1/sec. The casting sol contained 19.62 weight percent oxide (approximately 10.1 volume percent) and 54.67 weight percent solvent.

A gel disc was molded from the above casting sol in a cylindrical polypropylene mold (15.9 mm diameter). The casting sol (approximately 0.7 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. A second gel disc was molded from the above casting sol in a cylindrical polypropylene mold (15.9 mm diameter).

The casting sol (approximately 2.5 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry.

Example 13

Methoxy propanol (225.00 grams), 4-hydroxy-TEMPO (1 drop of a 5 weight percent solution in water), 3-(trimethoxysilyl)propyl methacrylate (1.41 grams), and PEG2TES (18.77 grams) were combined in a 1-L beaker. NALCO 2326 (200.00 grams, 16.22 weight percent solids) was charged to a jar. The contents of the beaker were added to the jar while stirring. The jar was sealed with a lid and placed in an oven at 85° C. for 16 hours. The above sol (323.97 grams) and diethylene glycol monoethyl ether (24.00 grams) were charged to a 500 mL round bottom flask and concentrated via rotary evaporation. The resulting mixture contained 41.72 weight percent oxide.

The above mixture (30.00 grams) was charged to a vial and combined with N-(2-hydroxyethyl)acrylamide (2.23 grams), octyl acrylate (4.43 grams), trimethylolpropane triacrylate ("SR351") (2.99 grams), a hexafunctional urethane acrylate ("CN975") (2.96 grams), and diethylene glycol monoethyl ether (20.53 grams). IRGACURE 819 (0.938 gram) was dissolved in the resulting mixture (64.09 grams) to prepare the casting sol. The casting sol was passed through a 1 micron filter as described above in Method for Filtration of Casting Sol. The viscosity of the casting sol was 18.75 cp at 15.36 1/sec. The casting sol contained 19.52 weight percent oxide (approximately 10.1 volume percent) and 54.02 weight percent solvent.

A gel disc was molded from the above casting sol in a cylindrical polypropylene mold (15.9 mm diameter). The casting sol (approximately 0.7 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. A second gel disc was molded from the above casting sol in a cylindrical polypropylene mold (15.9 mm diameter). The casting sol (approximately 2.5 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry.

Example 14

Methoxy propanol (450.00 grams), 4-hydroxy-TEMPO (5 drops of a 5 weight percent solution in water), and 3-(trimethoxysilyl)propyl methacrylate (28.02 grams) were combined in a 1-L beaker. NALCO 2326 (400.00 grams, 16.14 weight percent solids) was charged to a jar. The contents of the beaker were added to the jar while stirring. This procedure was repeated nine more times. Each jar was sealed with a lid and placed in an oven at 85° C. for 16 hours. The contents of the ten jars and diethylene glycol monoethyl ether (656.72 grams) were charged to a 16-L flask and concentrated via rotary evaporation. The mixture was passed through a 1 micron filter as described above. The resulting mixture contained 42.73 weight percent oxide.

To prepare the casting sol, 40.00 grams of the above mixture were charged to a vial and combined with N-(2-hydroxyethyl)acrylamide (0.79 gram), octyl acrylate (1.57 grams), trimethylolpropane triacrylate ("SR351") (1.38 grams), and a hexafunctional urethane acrylate ("CN975") (0.69 gram). IRGACURE 819 (0.59 gram) was added to the vial and dissolved in the mixture. The resulting casting sol was passed through a 1 micron filter as described in Method for Filtration of Casting Sol. The viscosity of the casting sol was 197.4 cp at 3.84 1/sec. The casting sol contained 37.96 weight percent oxide (approximately 21.9 volume percent) and 43.28 weight percent solvent.

The casting sol (approximately 2.5 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. The gel was dried using the Method for Supercritical Extraction of Gels described above to form a shaped aerogel. The aerogel was crack free and highly translucent. The aerogel was then heated according to the Method for Sintering—I, resulting in an article that was crack-free and highly translucent.

Example 15

Methoxy propanol (450.00 grams), 4-hydroxy-TEMPO (5 drops of a 5 weight percent solution in water), and 3-(trimethoxysilyl)propyl methacrylate (28.02 grams) were combined in a 1-L beaker. NALCO 2326 (400.00 grams, 16.14 weight percent solids) was charged to a jar. The contents of the beaker were added to the jar while stirring. This procedure was repeated nine more times. Each jar was sealed with a lid and placed in an oven at 85° C. for 16 hours. The contents of the ten jars and diethylene glycol monoethyl ether (656.72 grams) were charged to a 16-L flask and concentrated via rotary evaporation. The mixture was passed through a 1 micron filter as described above. The resulting mixture contained 42.73 weight percent oxide.

To prepare the casting sol, 29.99 grams of the above mixture were charged to a vial. IRGACURE 819 (0.39 gram) was added to the vial and dissolved in the mixture. The resulting casting sol was passed through a 1 micron filter as described in Method for Filtration of Casting Sol. The viscosity of the casting sol was 406.8 cp at 3.84 1/sec. The casting sol contained 42.18 weight percent oxide (approximately 25 volume percent) and 48.10 weight percent solvent.

A gel disc was molded from the above casting sol in a cylindrical polypropylene mold (15.9 mm diameter). The casting sol (approximately 2 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry.

Example 16

Methoxy propanol (450.00 grams), 4-hydroxy-TEMPO (5 drops of a 5 weight percent solution in water), and 3-(trimethoxysilyl)propyl methacrylate (5.98 grams) were combined in a 1-L beaker. NALCO 2329K (400.00 grams, 40.32 weight percent solids) was charged to a 32 ounce (0.95 L) jar. The contents of the beaker were added to the jar while stirring. The jar was sealed with a lid and placed in an oven at 85° C. for 16 hours. The contents of the jar were concentrated (41.96 weight percent SiO2) via rotary evaporation. The concentrated mixture (56.27 grams), diethylene glycol monoethyl ether (12.66 grams), octyl acrylate (2.66 grams), trimethylolpropane triacrylate ("SR351") (1.79 grams), hexafunctional urethane acrylate ("CN975") (1.78 grams), and 4-hydroxy-TEMPO (0.05 gram of a 5 weight percent solution in water) were charged to a 250 mL round-bottom flask and concentrated via rotary evaporation to a final weight of 43.48 grams. IRGACURE 819 (0.56 gram) was dissolved in diethylene glycol monoethyl ether (4.74 grams) and added to the above mixture. The resulting casting sol was passed through a 1 micron filter as described in Method for Filtration of Casting Sol. The viscosity of the casting sol was 94.2 cp at 3.84 1/sec. The casting sol contained 48.4 weight percent oxide (approximately 29.2 volume percent) and 36.16 weight percent solvent.

A gel disc was molded from the above casting sol in a cylindrical polypropylene mold (15.9 mm diameter). The casting sol (approximately 0.7 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. The gel was dried using the Method for Supercritical Extraction of Gels described above to form a shaped aerogel. The aerogel was crack free, white and opaque. The aerogel was then heated according to the Method for Sintering—I, resulting in an article that was crack-free, white and opaque.

Example 17

Methoxy propanol (450.00 grams), 4-hydroxy-TEMPO (5 drops of a 5 weight percent solution in water), and 3-(trimethoxysilyl)propyl methacrylate (28.12 grams) were combined in a 1-L beaker. NALCO 2326 (400.00 grams, 16.20 weight percent solids) was charged to a jar. The contents of the beaker were added to the jar while stirring. This procedure was repeated five times. Each jar was sealed with a lid and placed in an oven at 85° C. for 16 hours. The contents of the five jars and diethylene glycol monoethyl ether (290.63 grams) were charged to a 12-L flask and concentrated via rotary evaporation. The mixture was passed through a 1 micron filter as described above. The resulting mixture contained 44.84 weight percent oxide.

To prepare the casting sol, 3.1534 grams of the above mixture were charged to a vial and combined with trimethylolpropane triacrylate ("SR351") (0.8813 grams) and diethylene glycol monoethyl ether (3.0685 grams). IRGACURE 819 (0.1131 gram) was added to the vial and dissolved in the mixture. The resulting casting sol was passed through a 1 micron filter as described in Method for Filtration of Casting Sol. The casting sol contained 19.59 weight percent oxide (approximately 10.1 volume percent) and 62.83 weight percent solvent.

A gel disc was molded from the above casting sol in a cylindrical polypropylene mold (15.9 mm diameter). The casting sol (approximately 1 mL) was pipetted into the mold, and the mold was sealed leaving no space between the sol and the walls of the mold. The sealed mold was placed under the LED array described in Method for Curing Casting Sol—Procedure A to cure, with the diodes 13 mm above the top of the mold. The cure time was 30 seconds. The resulting shaped gel was free of cracks and the surfaces felt dry. The gel was dried using the Method for Supercritical Extraction of Gels described above to form a shaped aerogel. The aerogel was crack free. The aerogel was then heated according to the Method for Sintering—I, resulting in an article that was crack-free. The article was sintered according to the Method for Sintering—II described above. The resulting sintered amorphous silica article was crack-free and transparent.

What is claimed is:

1. A shaped gel article comprising a polymerized product of a casting sol, wherein the casting sol is positioned within a mold cavity during polymerization and wherein the shaped gel article retains both a size and a shape identical to the mold cavity (except in a region where the mold cavity was overfilled) when removed from the mold cavity, the casting sol comprising:
    a) 2 to 65 weight percent surface modified silica particles based on a total weight of the casting sol, wherein the surface modified silica particles comprise a reaction product of silica particles having an average particle size no greater than 100 nanometers and a surface modification agent composition comprising a silane modification agent having a radically polymerizable group and wherein the surface modified silica particles are 50 to 99 weight percent silica and wherein the casting sol contains no more than 50 weight percent silica;
    b) 0 to 40 weight percent polymerizable material based on the total weight of the casting sol, wherein the polymerizable material does not contain a silyl group;
    c) 0.01 to 5 weight percent radical initiator based on the total weight of the casting sol; and
    d) 30 to 90 weight percent organic solvent medium based on the total weight of the casting sol, wherein the surface modification agent composition, the polymerizable material, and the radical initiator are soluble in the organic solvent medium.

2. The shaped gel article of claim 1, wherein the casting sol comprises:
    a) 4 to 45 weight percent surface modified silica particles based on the total weight of the casting sol and wherein the casting sol contains no more than 38 weight percent silica;
    b) 5 to 35 weight percent of the polymerizable material based on the total weight of the casting sol;
    c) 0.01 to 5 weight percent radical initiator based on the total weight of the casting sol; and
    d) 40 to 80 weight percent organic solvent medium based on the total weight of the casting sol.

3. The shaped gel article of claim 1, wherein the casting sol comprises:
    a) 10 to 36 weight percent surface modified silica particles based on the total weight of the casting sol and wherein the casting sol contains no more than 28 weight percent silica;
    b) 10 to 30 weight percent of the polymerizable material based on the total weight of the casting sol;
    c) 0.01 to 5 weight percent radical initiator based on the total weight of the casting sol; and
    d) 50 to 70 weight percent organic solvent medium based on the total weight of the casting sol.

4. The shaped gel article of claim 1, wherein at least 50 weight percent of the organic solvent medium comprises an organic solvent having a boiling point equal to at least 150° C.

5. The shaped gel article of claim 1, wherein the surface modification agent composition further comprises a silane surface modification that is free of a radically polymerizable group.

6. The shaped gel article of claim 1, wherein the shaped gel article is removable from the mold cavity without breaking or cracking.

7. The shaped gel article of claim 1, wherein the radical initiator is a photoinitiator and wherein the mold cavity has at least one surface that can transmit actinic radiation in the visible region, ultraviolet region, or both of the electromagnetic spectrum.

8. The shaped gel article of claim 1, wherein the amount of polymerizable material is in a range of 5 to 40 weight percent based on the total weight of the casting sol.

9. An aerogel comprising a product formed by removing by supercritical extraction the organic solvent medium from the shaped gel article of claim 1.

10. A method of making a sintered article, the method comprising:
 a) providing a mold having a mold cavity;
 b) positioning a casting sol within the mold cavity, the casting sol comprising:
  1) 2 to 65 weight percent surface modified silica particles based on a total weight of the casting sol, wherein the surface modified silica particles comprise a reaction product of silica particles having an average particle size no greater than 100 nanometers and a surface modification agent composition comprising a silane modification agent having a radically polymerizable group and wherein the surface modified silica particles are 50 to 99 weight percent silica and wherein the casting sol contains no more than 50 weight percent silica;
  2) 0 to 40 weight percent of a polymerizable material based on the total weight of the casting sol, wherein the polymerizable material does not contain a silyl group;
  3) 0.01 to 5 weight percent radical initiator based on the total weight of the casting sol; and
  4) 30 to 90 weight percent organic solvent medium based on the total weight of the casting sol, wherein the surface modification agent composition, the polymerizable material, and the radical initiator are soluble in the organic solvent medium;
 c) polymerizing the casting sol to form a shaped gel article that is in contact with the mold cavity;
 (d) forming a dried shaped gel article by removing the organic solvent medium;
 (e) removing either the shaped gel article or the dried shaped gel article from the mold cavity; and
 (f) heating the dried shaped gel article to form a sintered article, wherein the sintered article has a shape identical to the mold cavity (except in regions where the mold cavity was overfilled) and to the shaped gel article but reduced in size proportional to an amount of isotropic shrinkage.

11. The method of claim 10, wherein the sintered article has a density in a range of 40 to 93 percent of theoretical density.

12. The method of claim 10, wherein the sintered article has a density greater than 95 percent of the theoretical density and wherein the sintered body is translucent or transparent to the human eye.

13. The method of claim 10, wherein the sintered article has a density greater than 95 percent of the theoretical density and wherein heating the dried shaped gel article to form the sintered article is in a range of 1025° C. to 1200° C.

14. The method of claim 10, wherein the silica in the sintered article is at least 90 weight percent amorphous silica.

15. A sintered article formed by a method of claim 10.

* * * * *